(12) United States Patent
Qaderi et al.

(10) Patent No.: US 12,281,984 B1
(45) Date of Patent: Apr. 22, 2025

(54) OPTICAL MEASUREMENTS

(71) Applicant: Pacific Light & Hologram, Inc., San Gabriel, CA (US)

(72) Inventors: Kamran Qaderi, San Gabriel, CA (US); David Joseph Harper, Ames, IA (US); Jonathan Seamus Blackley, South Pasadena, CA (US)

(73) Assignee: Pacific Light & Hologram, Inc., San Gabriel, CA (US)

( * ) Notice: Subject to any disclaimer, the term of this patent is extended or adjusted under 35 U.S.C. 154(b) by 0 days.

(21) Appl. No.: 18/966,467

(22) Filed: Dec. 3, 2024

Related U.S. Application Data

(60) Provisional application No. 63/613,622, filed on Dec. 21, 2023.

(51) Int. Cl.
*G01N 21/45* (2006.01)
*G01B 11/26* (2006.01)

(52) U.S. Cl.
CPC ............. *G01N 21/45* (2013.01); *G01B 11/26* (2013.01); *G01N 2201/0633* (2013.01)

(58) Field of Classification Search
CPC .......... G01N 21/45; G01N 2201/0633; G01B 11/26; G03H 1/2202; G03H 1/0005; G03H 1/2205; G03H 1/2286; G03H 1/2294; G03H 1/268; G03H 2001/0088; G03H 2001/2215; G03H 2001/2221; G03H 2223/20; G03H 2223/22; G03H 2223/23; G03H 2223/24; G03H 1/0408; G03H 1/0808; G03H 2001/0439; G03H 2001/2207; G03H 2001/221; G03H 2001/2226;

(Continued)

(56) References Cited

U.S. PATENT DOCUMENTS 4,586,780 A 5/1986 Chern et al.
5,016,950 A 5/1991 Smith
(Continued)

FOREIGN PATENT DOCUMENTS

CN 101226325 A 7/2008
CN 101241603 A 8/2008
(Continued)

OTHER PUBLICATIONS

[No Author Listed], "Google definition of integrated," Nov. 11, 2024, retrieved from Google.com, 3 pages (Year: 2024).

(Continued)

*Primary Examiner* — Isiaka O Akanbi
(74) *Attorney, Agent, or Firm* — Fish & Richardson P.C.

(57) ABSTRACT

Methods, apparatus, devices, subsystems, and systems for optical measurements are provided, e.g., precise measurement of a geometry of an element such as an angle of an object, a refractive index of a substance, or surface roughness of an uneven surface. In one aspect, a method includes: illuminating light on an object having a first surface extending along a first direction and a second surface extending along a second direction different from the first direction, capturing an interference pattern between a first light beam reflected from the first surface and a second light beam reflected from the second surface, and determining an angle between the first direction and the second direction based on a result of Fourier transform of the captured interference pattern.

30 Claims, 38 Drawing Sheets

(58) Field of Classification Search
CPC ... G03H 2001/2263; G03H 2001/2284; G03H 2001/303; G03H 2210/45; G03H 2223/15; G03H 2223/16; G03H 2223/17; G03H 2225/22; G02B 5/1814; G02B 5/3025; G02B 27/0103; G02B 27/0927; G02B 27/30; G02B 27/4205; G02B 30/10; G02B 30/40; G02B 30/52; G02B 5/3083; G02B 5/32; G02B 30/56; G02B 5/203; G02B 27/283; G02B 2027/0178; G02B 27/0172; G02B 27/1086; G02B 30/33; G02F 1/13306; G02F 1/133514; G02F 1/133528; G06T 19/006; H04N 13/275; H04N 13/30; H04N 13/346
USPC .......................................................... 356/517
See application file for complete search history.

(56) References Cited

U.S. PATENT DOCUMENTS

| | | |
|---|---|---|
| 5,144,288 A | 9/1992 | Hamada |
| 5,347,375 A | 9/1994 | Saito |
| 5,668,648 A | 9/1997 | Saito |
| 5,719,600 A | 2/1998 | Alcorn |
| 5,753,349 A | 5/1998 | Boswell |
| 5,825,448 A | 10/1998 | Bos et al. |
| 6,256,120 B1 | 7/2001 | Suzuki |
| 6,288,803 B1 | 9/2001 | Hattori et al. |
| 6,580,388 B1 | 6/2003 | Stoyanov |
| 6,606,095 B1 | 8/2003 | Lengyel |
| 7,103,099 B1 | 9/2006 | Paz |
| 7,277,209 B1 | 10/2007 | Grossetie |
| 7,660,039 B2 | 2/2010 | Santoro et al. |
| 7,837,361 B2 | 11/2010 | Santoro et al. |
| 8,047,673 B2 | 11/2011 | Santoro |
| 8,218,211 B2 | 7/2012 | Kroll |
| 8,233,204 B1 | 7/2012 | Robbins et al. |
| 8,400,696 B2 | 3/2013 | Ikeda |
| 8,786,925 B2 | 7/2014 | Hart et al. |
| 8,976,081 B2 | 3/2015 | Rao |
| 9,270,978 B2 | 2/2016 | Li |
| 9,515,099 B2 | 12/2016 | Kwon |
| 9,710,957 B2 | 7/2017 | Berghoff |
| 9,715,215 B2 | 7/2017 | Christmas et al. |
| 9,946,224 B2 | 4/2018 | Kroll et al. |
| 9,959,808 B2 | 5/2018 | Sun |
| 9,990,877 B2 | 6/2018 | Kim |
| 10,098,565 B2 | 10/2018 | Brannan |
| 10,156,725 B2 | 12/2018 | TeKolste et al. |
| 10,379,496 B2 | 8/2019 | Onural |
| 10,445,556 B2 | 10/2019 | Vilenskii et al. |
| 10,475,370 B2 | 11/2019 | Spitzer |
| 10,534,209 B1 | 1/2020 | Fu |
| 10,712,667 B2 | 7/2020 | Oemrawsingh et al. |
| 10,853,999 B2 | 12/2020 | Blackley |
| 10,854,000 B2 | 12/2020 | Blackley |
| 10,867,439 B2 | 12/2020 | Blackley |
| 10,878,622 B2 | 12/2020 | Blackley |
| 10,878,623 B2 | 12/2020 | Blackley |
| 10,884,240 B2 | 1/2021 | Song et al. |
| 10,902,673 B2 | 1/2021 | Blackley |
| 10,909,756 B2 | 2/2021 | Blackley |
| 10,964,103 B2 | 3/2021 | Blackley |
| 10,969,740 B2 | 4/2021 | Shi et al. |
| 11,204,540 B2 | 12/2021 | Popovich et al. |
| 11,347,185 B2 | 5/2022 | Qaderi et al. |
| 11,360,429 B2 | 6/2022 | Qaderi et al. |
| 11,360,430 B2 | 6/2022 | Qaderi et al. |
| 11,360,431 B2 | 6/2022 | Qaderi et al. |
| 11,378,917 B2 | 7/2022 | Qaderi et al. |
| 11,410,384 B2 | 8/2022 | Blackley et al. |
| 11,415,937 B2 | 8/2022 | Qaderi et al. |
| 11,762,333 B2 | 9/2023 | Qaderi et al. |
| 11,900,842 B1 | 2/2024 | Blackley et al. |
| 11,953,856 B2 | 4/2024 | Song et al. |
| 11,995,769 B2 | 5/2024 | Blackley et al. |
| 12,170,038 B2 | 12/2024 | Blackley et al. |
| 2001/0024177 A1 | 9/2001 | Popovich |
| 2002/0180720 A1 | 12/2002 | Ishiyama |
| 2003/0081154 A1 | 5/2003 | Coleman et al. |
| 2003/0090599 A1 | 5/2003 | Ochiai et al. |
| 2003/0151809 A1 | 8/2003 | Takahashi |
| 2004/0004586 A1 | 1/2004 | Endo et al. |
| 2004/0066547 A1 | 4/2004 | Parker et al. |
| 2004/0094699 A1 | 5/2004 | Goto et al. |
| 2004/0105091 A1 | 6/2004 | Zaidi et al. |
| 2005/0078374 A1 | 4/2005 | Taira et al. |
| 2005/0122454 A1 | 6/2005 | Sharp |
| 2006/0078113 A1 | 4/2006 | Javidi et al. |
| 2006/0139711 A1 | 6/2006 | Leister et al. |
| 2006/0239171 A1 | 10/2006 | Ooi et al. |
| 2006/0279528 A1 | 12/2006 | Schobben |
| 2007/0024999 A1 | 2/2007 | Crossland |
| 2007/0242325 A1 | 10/2007 | Kitamura |
| 2007/0257943 A1 | 11/2007 | Miller |
| 2007/0285438 A1 | 12/2007 | Kanowitz |
| 2008/0037131 A1 | 2/2008 | Steenblik et al. |
| 2008/0247128 A1 | 10/2008 | Khoo |
| 2008/0297390 A1 | 12/2008 | Ko et al. |
| 2008/0300478 A1 | 12/2008 | Zuhars et al. |
| 2009/0015922 A1 | 1/2009 | St. Hilaire |
| 2009/0128562 A1 | 5/2009 | McCombe |
| 2009/0303597 A1 | 12/2009 | Miyawaki et al. |
| 2010/0033781 A1 | 2/2010 | Leister |
| 2010/0085642 A1 | 4/2010 | Drinkwater |
| 2010/0149139 A1 | 6/2010 | Kroll |
| 2010/0157399 A1 | 6/2010 | Kroll |
| 2010/0207851 A1 | 8/2010 | Cok et al. |
| 2010/0238528 A1 | 9/2010 | Govil et al. |
| 2010/0328433 A1 | 12/2010 | Li |
| 2010/0328759 A1 | 12/2010 | Kirkby et al. |
| 2011/0002020 A1 | 1/2011 | Khan |
| 2011/0050655 A1* | 3/2011 | Mukawa ............ G02B 27/017 345/204 |
| 2011/0157667 A1 | 6/2011 | Lacoste |
| 2012/0008181 A1 | 1/2012 | Cable |
| 2012/0218481 A1* | 8/2012 | Popovich ............ G02B 5/1819 349/11 |
| 2012/0236415 A1 | 9/2012 | Nagano et al. |
| 2013/0022222 A1 | 1/2013 | Zschau |
| 2013/0100513 A1 | 4/2013 | Choi et al. |
| 2013/0101253 A1 | 4/2013 | Popovich et al. |
| 2013/0135290 A1 | 5/2013 | Davidson |
| 2013/0208508 A1 | 8/2013 | Nichol et al. |
| 2013/0268357 A1 | 10/2013 | Heath |
| 2013/0271731 A1 | 10/2013 | Popovich et al. |
| 2013/0278631 A1 | 10/2013 | Border |
| 2013/0306627 A1 | 11/2013 | Libman |
| 2014/0064655 A1 | 3/2014 | Nguyen et al. |
| 2014/0071539 A1 | 3/2014 | Gao |
| 2014/0222884 A1 | 8/2014 | Gupta |
| 2014/0240342 A1 | 8/2014 | Xu et al. |
| 2014/0240843 A1 | 8/2014 | Kollin et al. |
| 2014/0300966 A1 | 10/2014 | Travers et al. |
| 2014/0354697 A1 | 12/2014 | Endisch |
| 2014/0358002 A1 | 12/2014 | Daoura |
| 2015/0123964 A1 | 5/2015 | Lee et al. |
| 2015/0277378 A1 | 10/2015 | Smithwick |
| 2015/0325035 A1 | 11/2015 | Howell |
| 2015/0355597 A1 | 12/2015 | Schwerdtner |
| 2015/0378080 A1 | 12/2015 | Georgiou |
| 2016/0055778 A1 | 2/2016 | Kim |
| 2016/0077338 A1 | 3/2016 | Robbins et al. |
| 2016/0077367 A1 | 3/2016 | Lo et al. |
| 2016/0078683 A1 | 3/2016 | Sudol |
| 2016/0104750 A1 | 4/2016 | Jinta et al. |
| 2016/0147000 A1 | 5/2016 | Yoon |
| 2016/0147003 A1* | 5/2016 | Morozov ............ G02B 27/10 362/613 |
| 2016/0157828 A1 | 6/2016 | Sumi |
| 2016/0161914 A1 | 6/2016 | Onural |
| 2016/0223987 A1 | 8/2016 | Park et al. |
| 2016/0291544 A1 | 10/2016 | Kroll et al. |

(56) References Cited

U.S. PATENT DOCUMENTS

| | | |
|---|---|---|
| 2016/0291545 A1 | 10/2016 | Fan et al. |
| 2016/0336484 A1 | 11/2016 | McGroddy |
| 2016/0349508 A1 | 12/2016 | Horikawa |
| 2016/0379606 A1 | 12/2016 | Kollin et al. |
| 2017/0038727 A1 | 2/2017 | Kim |
| 2017/0160547 A1 | 6/2017 | Webster et al. |
| 2017/0248825 A1 | 8/2017 | Georgiou et al. |
| 2017/0269767 A1 | 9/2017 | Yang |
| 2017/0293259 A1 | 10/2017 | Ochiai |
| 2017/0308988 A1 | 10/2017 | Li |
| 2017/0322414 A1 | 11/2017 | Ishii |
| 2017/0323125 A1 | 11/2017 | Yang |
| 2017/0351944 A1 | 12/2017 | Yang |
| 2018/0024289 A1 | 1/2018 | Fattal |
| 2018/0039072 A1 | 2/2018 | Okumura |
| 2018/0130251 A1 | 5/2018 | Berghoff |
| 2018/0196390 A1 | 7/2018 | Collin |
| 2018/0231789 A1 | 8/2018 | Ng |
| 2018/0253869 A1 | 9/2018 | Yumer |
| 2018/0275350 A1 | 9/2018 | Oh |
| 2018/0284460 A1 | 10/2018 | Cheng et al. |
| 2018/0364641 A1 | 12/2018 | Park |
| 2019/0004478 A1 | 1/2019 | Gelman et al. |
| 2019/0008388 A1 | 1/2019 | Ando |
| 2019/0014319 A1 | 1/2019 | Jannard |
| 2019/0028674 A1 | 1/2019 | Smits |
| 2019/0101866 A1 | 4/2019 | Georgiou |
| 2019/0113802 A1 | 4/2019 | Won et al. |
| 2019/0121196 A1 | 4/2019 | Kumar |
| 2019/0121291 A1 | 4/2019 | Leister |
| 2019/0155033 A1 | 5/2019 | Gelman et al. |
| 2019/0196400 A1 | 6/2019 | Chang |
| 2019/0212557 A1* | 7/2019 | Waldern .............. G02B 6/005 |
| 2019/0243142 A1 | 8/2019 | TeKolste et al. |
| 2019/0285897 A1 | 9/2019 | Topliss |
| 2019/0324991 A1 | 10/2019 | Lehtinen et al. |
| 2019/0361396 A1 | 11/2019 | Christmas |
| 2020/0050145 A1 | 2/2020 | Kim et al. |
| 2020/0264560 A1 | 8/2020 | Chen |
| 2020/0271949 A1 | 8/2020 | Colin |
| 2020/0272098 A1 | 8/2020 | Colin et al. |
| 2020/0273236 A1 | 8/2020 | Colin |
| 2020/0273242 A1 | 8/2020 | Colin |
| 2020/0275081 A1 | 8/2020 | Colin |
| 2020/0275082 A1 | 8/2020 | Colin |
| 2020/0275088 A1 | 8/2020 | Colin |
| 2020/0278498 A1 | 9/2020 | Schultz et al. |
| 2020/0278543 A1 | 9/2020 | Shultz et al. |
| 2020/0280715 A1 | 9/2020 | Colin |
| 2020/0309944 A1 | 10/2020 | Thoresen et al. |
| 2020/0341194 A1* | 10/2020 | Waldern .............. G02F 1/13342 |
| 2020/0363641 A1 | 11/2020 | Noguchi |
| 2020/0393680 A1 | 12/2020 | Hogstedt et al. |
| 2021/0209846 A1 | 7/2021 | Blackley |
| 2021/0216163 A1 | 7/2021 | Wang et al. |
| 2021/0264849 A1 | 8/2021 | Suzuki |
| 2021/0294003 A1 | 9/2021 | Roehrig et al. |
| 2021/0373493 A1 | 12/2021 | Song et al. |
| 2021/0397128 A1 | 12/2021 | Hirose et al. |
| 2022/0028334 A1 | 1/2022 | Park et al. |
| 2022/0050298 A1 | 2/2022 | Klug et al. |
| 2022/0058356 A1 | 2/2022 | Yamamoto et al. |
| 2022/0082886 A1 | 3/2022 | Qaderi et al. |
| 2022/0082998 A1 | 3/2022 | Qaderi et al. |
| 2022/0083000 A1 | 3/2022 | Qaderi et al. |
| 2022/0083001 A1 | 3/2022 | Qaderi et al. |
| 2022/0083002 A1 | 3/2022 | Qaderi et al. |
| 2022/0083003 A1 | 3/2022 | Qaderi et al. |
| 2022/0083006 A1 | 3/2022 | Qaderi et al. |
| 2022/0084226 A1 | 3/2022 | Uludag |
| 2022/0086419 A1* | 3/2022 | Qaderi .................... G03H 1/02 |
| 2022/0101597 A1 | 3/2022 | Panneer et al. |
| 2022/0350369 A1 | 11/2022 | Xu et al. |
| 2022/0366647 A1 | 11/2022 | Blackley et al. |
| 2023/0006027 A1 | 1/2023 | Liu |
| 2023/0104826 A1 | 4/2023 | Gu |
| 2023/0113022 A1 | 4/2023 | Blackley et al. |
| 2023/0123926 A1 | 4/2023 | Hasegawa |
| 2023/0124694 A1 | 4/2023 | Haskin et al. |
| 2023/0142054 A1* | 5/2023 | Qaderi ................ G03H 1/0005 359/23 |
| 2023/0213767 A1 | 7/2023 | Grant et al. |
| 2023/0221818 A1 | 7/2023 | Ozbas et al. |
| 2023/0273678 A1* | 8/2023 | Border ............... G02B 27/0189 345/156 |
| 2024/0379003 A1 | 11/2024 | Blackley et al. |
| 2024/0379031 A1 | 11/2024 | Blackley et al. |
| 2024/0394977 A1 | 11/2024 | Blackley et al. |
| 2025/0029526 A1 | 1/2025 | Blackley et al. |
| 2025/0029527 A1 | 1/2025 | Blackley et al. |
| 2025/0029528 A1 | 1/2025 | Blackley et al. |
| 2025/0029529 A1 | 1/2025 | Qaderi et al. |
| 2025/0029530 A1 | 1/2025 | Blackley et al. |
| 2025/0029531 A1 | 1/2025 | Blackley et al. |
| 2025/0029532 A1 | 1/2025 | Blackley et al. |
| 2025/0029533 A1 | 1/2025 | Qaderi et al. |
| 2025/0029534 A1 | 1/2025 | Blackley et al. |
| 2025/0037625 A1 | 1/2025 | Qaderi et al. |
| 2025/0037626 A1 | 1/2025 | Qaderi et al. |

FOREIGN PATENT DOCUMENTS

| | | |
|---|---|---|
| CN | 103471528 A | 12/2013 |
| CN | 103760676 A | 4/2014 |
| CN | 104466007 A | 3/2015 |
| CN | 104776865 A | 7/2015 |
| CN | 109564403 A | 4/2019 |
| CN | 113866984 A | 12/2021 |
| CN | 114019715 A | 2/2022 |
| EP | 3690505 A1 | 8/2020 |
| JP | 2010-503035 A | 1/2010 |
| JP | 2011-513786 A | 4/2011 |
| JP | 2013-050566 A | 3/2013 |
| JP | 2013-524270 A | 6/2013 |
| JP | 2013-540278 A | 10/2013 |
| JP | 2015064593 A | 4/2015 |
| JP | 2016-042036 A | 3/2016 |
| JP | 2017-097370 A | 6/2017 |
| KR | 1020140063528 A | 5/2014 |
| KR | 1020170015884 A | 2/2017 |
| TW | 201833680 A | 9/2018 |
| WO | WO 2008/138984 A2 | 11/2008 |
| WO | WO 2011/121130 A2 | 10/2011 |
| WO | WO 2017/120320 A1 | 7/2017 |
| WO | WO 2017/198713 A2 | 11/2017 |
| WO | WO 2019/143729 A1 | 7/2019 |
| WO | WO 2022/060733 A1 | 3/2022 |
| WO | WO 2022/060734 A1 | 3/2022 |

OTHER PUBLICATIONS

Castaneda et al., "Fourier Analysis Applied to the Characterisation of Optical Wedges with Small Angles," United Nations Educational Scientific and Cultural Organization and International Atomic Energy Agency, May 1999, 11 pages.

Chapter II Amendment for corresponding PCT Appl No. PCT/US19/13857, dated Aug. 15, 2019.

Gopinathan et al., "A Projection System for Real World Three-Dimensional Objects Using Spatial Light Modulators," Journal of Display Technology, Jun. 2008, 4(2):254-261.

Ichikawa et al., "Realistic expression for full-parallax computer-generated holograms with the ray-tracing method," Optical Society of America, Nov. 16, 2012, 9 pages.

Ichikawa et al., "Proceedings of Spie; Realistic 3D image reconstruction in CGH with Fourier transform optical system," Proc. SPIE 8644, Practical Holography XXVII: Materials and Applications, Mar. 1, 2013, 10 pages.

Nishitsuji et al., "An interactive holographic projection system that uses a hand-drawn interface with a consumer CPU," Scientific Reports, Jan. 2021, 11:147, 10 pages.

(56) References Cited

OTHER PUBLICATIONS

Russell, "Regular and Irregular Signal Resampling," Thesis for the degree of Doctor of Philosophy, Massachusetts Institute of Technology, Jun. 2002, 110 pages.

Ryle et al., "Real world objects: capturing using in-line digital holography, Projecting using spatial light modulators," Proceedings of SPIE—The International Society for Optical Engineering, Aug. 2-6, 2009, San Diego, CA, USA, 7442, 8 pages.

Smith, "A Pixel is Not a Little Square, a Pixel is not a Little Square, a Pixel is Not a Little Square! (and a Voxel is Not a Little Cube)," Microsoft Technical Memo 6, Jul. 1995, 11 pages.

Tien et al., "The measurement of surface roughness of optical thin films based on fast Fourier transform," Thin Solid Films, Apr. 2009, 517(2009):5110-5115.

Wang et al., "Holographic capture and projection system of real object based on tunable zoom lens," PhotoniX, Mar. 2020, 6(1), 15 pages.

Yepes et al., "Dynamic Digital Holography for recording and reconstruction of 3D images using optoelectronic devices," Journal of Microwaves, Optoelectronics and Electromagnetic Applications, Sep. 2017, 16(3):797-811.

Yepes et al., "Dynamic Digital Holography for recording and reconstruction of 3D images using optoelectronic devices," Journal of Microwaves, Optoelectronics and Electromagnetic Applications, Sep. 2017, 16(3):801-815.

Zhang et al., "Elimination of a zero-order beam induced by a pixelated spatial light modulator for holographic projection," Applied Optics, Oct. 2009, 48(30):5834-5841.

\* cited by examiner

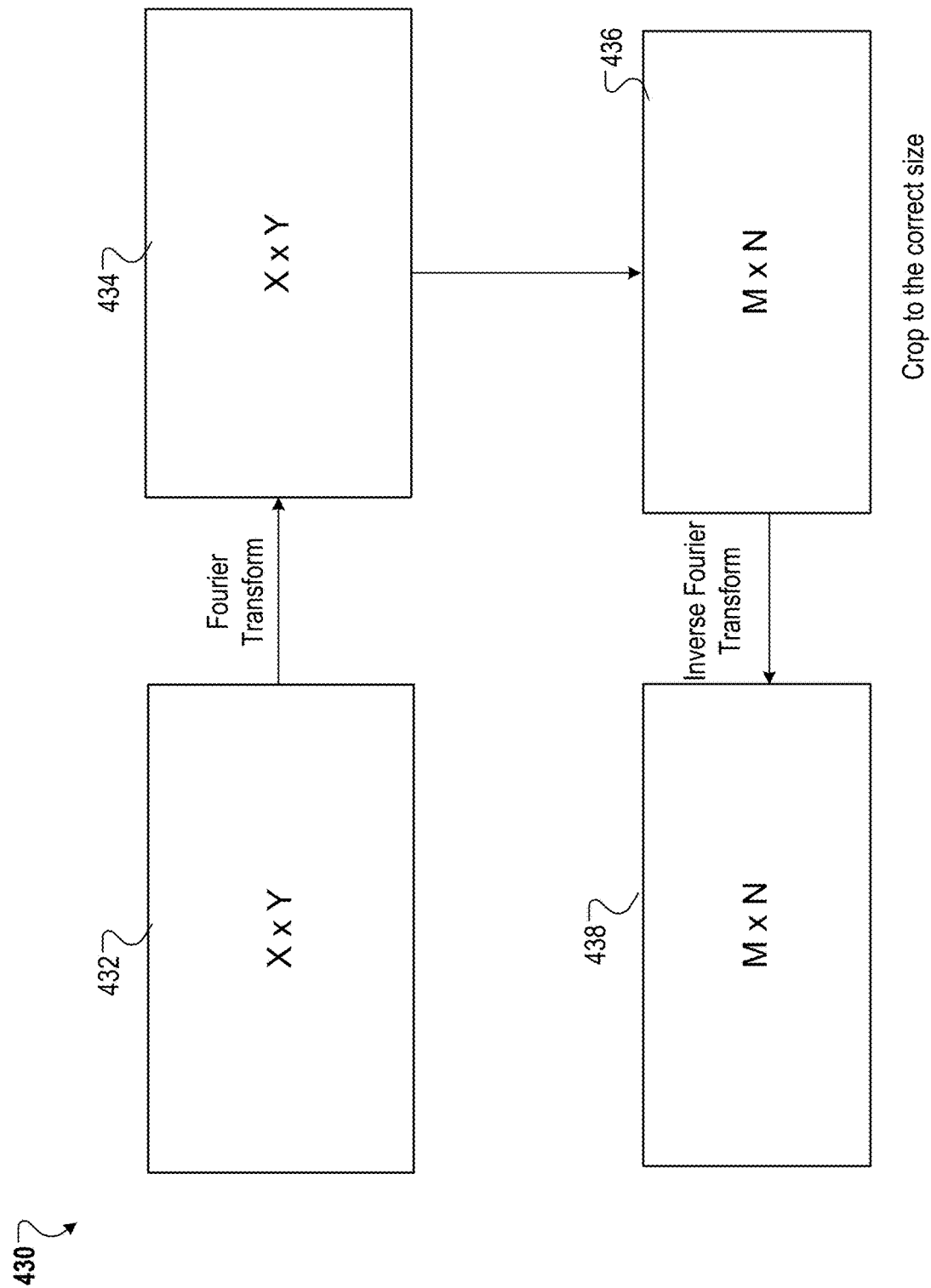

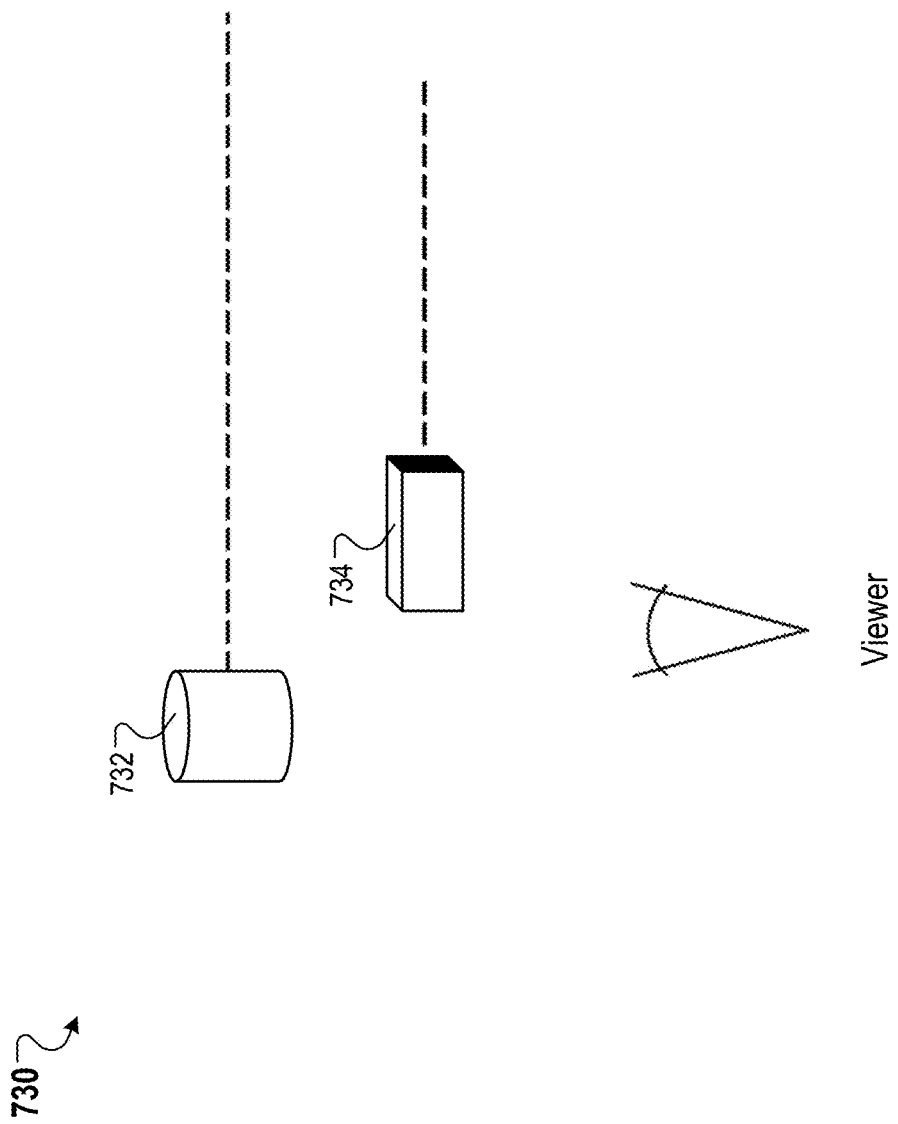

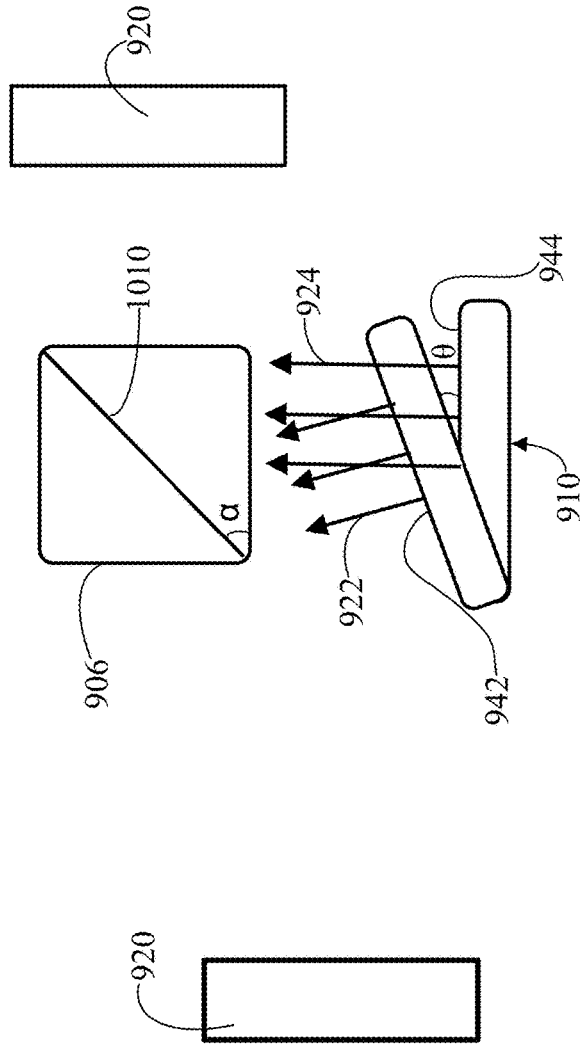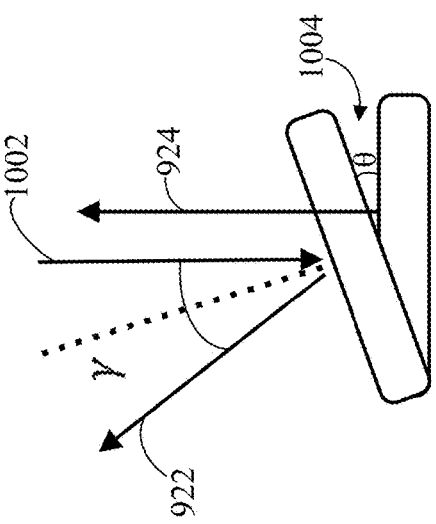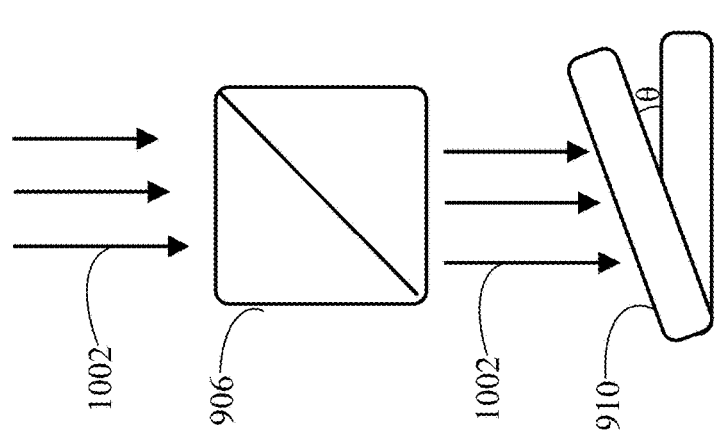
FIG. 10B
FIG. 10C
FIG. 10A

OPTICAL MEASUREMENTS

CROSS-REFERENCE TO RELATED APPLICATIONS

This application claims priority to U.S. Provisional Patent Application Ser. No. 63/613,622 filed on Dec. 21, 2023, the entire content of which is hereby incorporated by reference.

TECHNICAL FIELD

This disclosure relates to optical measurements.

BACKGROUND

Precise measurements of parameters, e.g., angles, distances, and refractive index of substances, are important in optics. For example, cost effective measurement of refractive indices is possible using wedged cells, but the precision is limited by measurement of angles of the wedge cells.

SUMMARY

The present disclosure describes methods, apparatus, devices, subsystems and systems for optical measurements, e.g., precise measurement of a geometry of an element such as an angle of an object, a refractive index of a substance or a medium, or surface roughness of an uneven surface.

One aspect of the present disclosure features a method including: illuminating light on an object having a first surface extending along a first direction and a second surface extending along a second direction, the second direction being different from the first direction; capturing an interference pattern between a first light beam reflected from the first surface and a second light beam reflected from the second surface; and determining an angle between the first direction and the second direction based on a result of Fourier transform of the captured interference pattern.

In some implementations, the object has a first planar layer and a second planar layer that intersect with an intersection angle. The first planar layer includes the first surface, and the second planar layer includes the second surface. The light is illuminated on the first surface and the second surface sequentially to generate the first light beam reflected from the first surface and the second light beam reflected from the second surface.

In some implementations, capturing the interference pattern between the first light beam and the second light beam includes: directly capturing the interference pattern on an active area of an optical sensor.

In some implementations, the method includes: determining a spatial period of fringes of the interference pattern based on the result of Fourier transform of the captured interference pattern and a pixel size of the active area of the optical sensor.

In some implementations, determining the angle between the first direction and the second direction includes: determining the angle between the first direction and the second direction based on the spatial period of the fringes of the captured interference pattern.

In some implementations, the result of Fourier transform of the captured interference pattern includes an image of Fourier transform of the captured interference pattern. Determining the spatial period of the fringes of the captured interference pattern includes: determining coordinates of localized peaks of brightness in Fourier space, the localized peaks corresponding to sinusoidal variations of the fringes of the interference pattern; determining a distance between corresponding coordinates of two adjacent localized peaks; and determining the spatial period of the fringes based on the distance and the pixel size of the active area of the optical sensor.

In some implementations, the angle is determined according to an expression as follows:

$$\Lambda = \lambda/2 \sin(\arcsin(n \sin(2\theta)/2)),$$

where $\theta$ represents the angle, $\Lambda$ represents the spatial period of the fringes, $\lambda$ represents a wavelength of the light, and n represents a refractive index of a medium in a space between the first surface and the second surface.

In some implementations, determining the angle between the first direction and the second direction includes: determining the angle when a first medium having a first refractive index is filled in a space between the first surface and the second surface, the first refractive index being known. The method further includes: filling a second medium in the space between the first surface and the second surface, the second medium having a second refractive index; capturing a second interference pattern between the first light beam reflected from the first surface and the second light beam reflected from the second surface; and determining the second refractive index based on the angle between the first direction and the second direction and a second result of Fourier transform of the captured second interference pattern.

In some implementations, the light is first polarized light having a first polarized state. The method includes: illuminating second polarized light on the object that is filled with the second medium, the second polarized light having a second polarized state different from the first polarized state, the second medium having: i) the second refractive index with the first polarized light illuminating on the second medium and ii) a third refractive index with the second polarized light illuminating on the second medium; capturing a third interference pattern between the first light reflected from the first surface and the second light reflected from the second surface; and determining the third refractive index of the second medium based on the angle between the first direction and the second direction and a third result of Fourier transform of the captured third interference pattern.

In some implementations, the method includes (i) for each light beam of a plurality of light beams with a respective wavelength of a plurality of wavelengths, illuminating the light beam with the respective wavelength on the object that is filled with the second medium; (ii) capturing a corresponding interference pattern corresponding to the light beam; (iii) determining a refractive index of the second medium corresponding to the respective wavelength based on the angle between the first direction and the second direction and a corresponding result of Fourier transform of the captured corresponding interference pattern for the light beam; and (iv) determining a dispersion of the second medium based on refractive indices of the second medium corresponding to the plurality of wavelengths.

Another aspect of the present disclosure features a system including: an optical system configured to guide light onto an object having a first surface extending along a first direction and a second surface extending along a second direction, the second direction being different from the first direction; an optical sensor configured to capture an interference pattern between a first light beam reflected from the first surface and a second light beam reflected from the second surface; and a computing system configured to determine an angle between the first direction and the second direction based on a result of Fourier transform of the captured interference pattern.

In some implementations, the object has a first planar layer and a second planar layer that intersect with an intersection angle. The first planar layer includes the first surface. The second planar layer includes the second surface. The light is guided on the first surface and the second surface sequentially to generate the first light beam reflected from the first surface and the second light beam reflected from the second surface.

In some implementations, the optical system includes: a beam splitter; a light source configured to emit the light; and a collimator configured to collimate the light from the light source and guide the light onto the beam splitter. The beam splitter is arranged in a path of the first light beam and the second light beam and configured to reflect the first light beam and the second light beam onto the optical sensor.

In some implementations, the optical system further includes a mask having an aperture and positioned in the path of the light between the beam splitter and the object, the mask being configured to guide the light onto a selected portion of the object through the aperture.

In some implementations, the computing system is configured to: determine a spatial period of fringes of the interference pattern based on the result of Fourier transform of the captured interference pattern and a pixel size of an active area of the optical sensor, and determine the angle between the first direction and the second direction based on the spatial period of the fringes of the captured interference pattern.

In some implementations, the result of Fourier transform of the captured interference pattern includes an image of Fourier transform of the captured interference pattern. The computing system is configured to: determine coordinates of localized peaks of brightness in Fourier space, the localized peaks corresponding to sinusoidal variations of the fringes of the interference pattern; determine a distance between corresponding coordinates of two adjacent localized peaks; and determine the spatial period of the fringes based on the distance and the pixel size of the active area of the optical sensor.

In some implementations, the angle is determined according to an expression as follows:

$$\Lambda = \lambda / 2 \sin(\arcsin(n \sin(2\theta)/2),$$

where $\theta$ represents the angle, $\Lambda$ represents the spatial period of the fringes, $\lambda$ represents a wavelength of the light, and n represents a refractive index of a medium in a space between the first surface and the second surface.

In some implementations, the system is configured to determine the angle of the object when the object is filled with a first medium having a first refractive index in a space between the first surface and the second surface, the first refractive index being known. The optical sensor is configured to capture a second interference pattern when the object is filled with a second medium in the space between the first surface and the second surface, the second medium having a second refractive index. The computing system is configured to determine the second refractive index of the second medium based on the angle between the first direction and the second direction and a second result of Fourier transform of the captured second interference pattern.

In some implementations, the light is first polarized light having a first polarized state. The optical system is configured to guide second polarized light on the object that is filled with the second medium. The second polarized light has a second polarized state different from the first polarized state. The second medium has: i) the second refractive index with the first polarized light illuminating on the second medium and ii) a third refractive index with the second polarized light illuminating on the second medium. The optical sensor is configured to capture a third interference pattern between the first light reflected from the first surface and the second light reflected from the second surface. The computing system is configured to determine the third refractive index of the second medium based on the angle between the first direction and the second direction and a third result of Fourier transform of the captured third interference pattern.

In some implementations, for each light beam of a plurality of light beams with a respective wavelength of a plurality of wavelengths, the optical system is configured to guide the light beam with the respective wavelength on the object that is filled with the second medium. The optical sensor is configured to capturing a corresponding interference pattern corresponding to the light beam. The computing system is configured to determine a refractive index of the second medium corresponding to the respective wavelength based on the angle between the first direction and the second direction and a corresponding result of Fourier transform of the captured corresponding interference pattern for the light beam. The computing system is configured to determine a dispersion of the second medium based on refractive indices of the second medium corresponding to the plurality of wavelengths.

Another aspect of the present disclosure features a method including: illuminating light through a reference pane onto an uneven surface of an object; capturing an interference pattern between first light beam reflected from a surface of the reference pane and second light beam reflected from the uneven surface; and determining a surface profile of the uneven surface of the object based on a result of Fourier transform of the captured interference pattern.

In some implementations, the method includes guiding the light onto a portion of the uneven surface of the object through an aperture. The Fourier transform of the captured interference pattern corresponds to a shape of the aperture.

In some implementations, the method includes guiding the light onto different portions of the uneven surface of the object through a plurality of apertures. Each of the plurality of apertures is corresponding to a respective portion of the different portions of the uneven surface. At least two of the plurality of apertures have different shapes, and the result of Fourier transform of the captured interference pattern includes a plurality of images. Each image of the Fourier transform of the captured interference pattern is corresponding to a respective aperture of the plurality of apertures and a corresponding portion of the different portions of the uneven surface associated with the respective aperture of the plurality of apertures.

In some implementations, capturing the interference pattern between the first light beam and the second light beam includes: configuring the first light beam and the second light beam by a pair of lens to form the interference pattern on an active area of an optical sensor.

In some implementations, the result of Fourier transform of the captured interference pattern includes a Fourier transform of a main order of the captured interference pattern. Determining the surface profile of the uneven surface of the object based on the result of Fourier transform of the captured interference pattern includes: performing a first inverse Fourier transform on the Fourier transform of the main order of the captured interference pattern to obtain information of a first electric field for forming the interference pattern; performing a second inverse Fourier transform on the information of the first electric field to obtain information of a second electric field of the light reflected from the uneven surface; and determining the surface profile of the uneven surface of the object based on the information of the second electric field.

In some implementations, the surface profile of the uneven surface of the object is determined according to an expression as below:

$$s(x,y)=E_{real}+iE_{imag}, \Delta\varphi_s(x,y)=\arctan(E_{imag}/E_{real}),$$

$$h(x, y) = \frac{\Delta\varphi_s(x, y)\lambda}{2\pi n},$$

where s(x, y) represents the second electric field of the reflected light from the uneven surface, $E_{real}$ and $E_{imag}$ represent a real part and an imaginary part of the electric field s(x,y), $\Delta\varphi_s(x, y)$ represents phase information of s(x, y), h(x, y) represents a surface height function of the surface profile of the uneven surface, $\lambda$ represents a wavelength of the light, and n represents a refractive index of the object.

Another aspect of the present disclosure features a system including: an optical system configured to guide light through a reference pane onto an uneven surface of an object; an optical sensor configured to capture an interference pattern between a first light beam reflected from a surface of the reference pane and a second light beam reflected from the uneven surface; and a computing system configured to determine a surface profile of the uneven surface of the object based on a result of Fourier transform of the captured interference pattern.

In some implementations, optical system includes: a beam splitter; a light source configured to emit the light; and a collimator configured to collimate the light from the light source and guide the light onto the beam splitter. The beam splitter is arranged in a path of the first light beam and the second light beam and configured to guide the first light beam and the second light beam to the optical sensor. The reference pane is arranged between the beam splitter and the object.

In some implementations, the optical system further includes a pair of lenses sequentially positioned downstream the beam splitter and upstream the optical sensor. The pair of lenses are configured to configure the first light beam and the second light beam to form the interference pattern on the optical sensor.

In some implementations, the optical system further includes a mask having one or more apertures arranged between the reference pane and the uneven surface of the object. Each of the one or more apertures corresponds to a respective portion of the uneven surface.

In some implementations, the result of Fourier transform of the captured interference pattern includes a Fourier transform of a main order of the captured interference pattern. The computing system is configured to: perform a first inverse Fourier transform on the Fourier transform of the main order of the captured interference pattern to obtain information of a first electric field for forming the interference pattern; perform a second inverse Fourier transform on the information of the first electric field to obtain information of a second electric field of the light reflected from the uneven surface; and determine the surface profile of the uneven surface of the object based on the information of the second electric field.

The present disclosure also describes methods, apparatus, devices, subsystems, and systems related to holographically displaying live scenes including one or more three-dimensional (3D) objects, for example, by i) capturing optical holograms of a live scene, digitizing/processing the optical holograms, and holographically reconstructing the live scene based on the digitized/processed holograms, and/or ii) capturing images/videos of a live scene, computing corresponding holograms, and holographically reconstructing the live scene based on the computed holograms.

Another aspect of the present disclosure features a system including a holographic capturing system and a holographic display system. The holographic capturing system includes: an optical system configured to generate an optical hologram of a live scene that includes one or more three-dimensional (3D) objects; and an optical sensor configured to capture sequential optical holograms of the live scene and output sequential hologram data associated with the sequential optical holograms of the live scene, each optical hologram being associated with respective hologram data. The holographic display system configured to optically reconstruct the live scene in a 3D space based on at least part of the sequential hologram data.

In some implementations, the system further includes a computing device coupled between the holographic capturing system and the holographic display system. The computing device is configured to receive the at least part of the sequential hologram data from the optical sensor and generate digital holograms associated with the live scene based on the at least part of the sequential hologram data. The holographic display system is configured to receive the digital holograms associated with the live scene from the computing device and reconstruct the live scene in the 3D space based on the digital holograms.

In some implementations, the holographic capturing system is configured to capture the sequential optical holograms and generate the sequential hologram data, without storing the sequential optical holograms and the sequential hologram data. The computing device is configured to process the at least part of the sequential hologram data to generate the digital holograms, without storing the at least part of the sequential hologram data and the digital holograms.

In some implementations, the holographic capturing system, the computing device, and the holographic display system are configured together to capture optical holograms of the live scene and optically reconstruct the live scene in real time.

In some implementations, a digital hologram includes an amplitude-like hologram, and the holographic display system includes a display for phase modulation.

In some implementations, the optical sensor includes a digital sensor, and the sequential hologram data includes a stream of digital data. The digital data can include an array of data bits.

In some implementations, the system further includes a frame grabber coupled to the optical sensor and configured to select respective hologram data of one or more optical holograms among the sequential optical holograms to be transmitted to the computing device.

In some implementations, the frame grabber includes a frame-buffer-based grabber configured to deposit the respective hologram data in a frame buffer of the frame grabber and subsequently into the computing device.

In some implementations, the frame grabber includes a first in, first out (FIFO)-based grabber configured to deposit the respective hologram data directly into the computing device.

In some implementations, the frame grabber is externally and respectively coupled to each of the optical sensor and the computing device.

In some implementations, the frame grabber is included in the optical sensor or in the computing device.

In some implementations, the optical sensor includes a plurality of sen sing pixels in an active area of the optical sensor, and the holographic display system includes a display having a plurality of display elements. The computing device is configured to process the at least part of the sequential hologram data to generate the digital holograms associated with the live scene based on at least one of a pitch of the sen sing pixels, a pitch of the display elements, a size of the active area of the optical sensor, or a size of the display.

In some implementations, the pitch of the sen sing pixels is associated with a resolution of a captured optical hologram and a capturable size of a scene.

In some implementations, the pitch of the display elements is associated with an acceptable viewing angle of a reconstructed scene and the size of the display.

In some implementations, the computing device is configured to suppress a mismatch between a captured optical hologram of the live scene and a reconstruction of the live scene. The mismatch is associated with at least one of a difference between the pitch of the sen sing pixels and the pitch of the display elements, or a difference between the size of the active area of the optical sensor and the size of the display.

In some implementations, the computing device is configured to perform at least one of: scaling a first digital hologram associated with a captured optical hologram based on a ratio between the pitch of the sen sing pixels and the pitch of the display elements, or adjusting the scaled first digital hologram to generate a second digital hologram to be modulated on the display based on the size of the display and the size of the hologram data.

In some implementations, the computing device is configured to perform the scaling using at least one of one or more interpolation algorithms including linear interpolation, nearest neighbor interpolation, cubic spline interpolation, shape-preserving interpolation, Biharomic interpolation, and thin-plate spline interpolation.

In some implementations, the computing device is configured to resample a first digital hologram associated with a captured optical hologram to be a second digital hologram to be modulated on the display using Fourier transform and inverse Fourier transform, the first digital hologram being associated with the pitch of the sen sing pixels, the second digital hologram being associated with the pitch of the display elements.

In some implementations, the computing device is configured to: perform the Fourier transform on the first digital hologram to generate a transformed first digital hologram, and if the pitch of the sen sing pixels is larger than the pitch of the display elements, perform zero-padding on the transformed first digital hologram based on a ratio between the pitch of the sen sing pixels and the pitch of the display element, then perform the inverse Fourier transform on the transformed first digital hologram with the zero-padding to obtain the second digital hologram.

In some implementations, the computing device is configured to: perform the Fourier transform on the first digital hologram to generate a transformed first digital hologram, and in response to determining the pitch of the sen sing pixels is smaller than the pitch of the display elements, crop the transformed first digital hologram based on a ratio between the pitch of the sen sing pixels and the pitch of the display elements, then perform the inverse Fourier transform on the cropped transformed first digital hologram to obtain the second digital hologram.

In some implementations, the computing device is configured to resample the first digital hologram to be the second digital hologram by respectively resampling central points of the plurality of sen sing pixels of the optical sensor to match centroids of the plurality of display elements of the display.

In some implementations, the plurality of sen sing pixels of the optical sensor is regularly arranged in the active area of the optical sensor, and the plurality of display elements is regularly arranged in the display, and the central points of the plurality of sen sing pixels are regularly spaced, and the centroids of the plurality of display elements of the display are regularly spaced.

In some implementations, the plurality of sen sing pixels of the optical sensor is regularly arranged in the active area of the optical sensor, and the plurality of display elements is irregularly arranged in the display, and the central points of the plurality of sen sing pixels are regularly spaced, and the centroids of the plurality of display elements of the display are irregularly spaced.

In some implementations, the computing device is configured to resample the regularly spaced center points of the plurality of sen sing pixels to match the irregularly spaced centroids of the plurality of display elements by determining a position of each centroid of the plurality of display elements based on a weighted sum of adjacent center points around the centroid using one or more weighting algorithms. The plurality of display elements can form a Voronoi pattern.

In some implementations, the plurality of sen sing pixels of the optical sensor is irregularly arranged in the active area of the optical sensor, and the plurality of display elements is irregularly arranged in the display, and the central points of the plurality of sen sing pixels are irregularly spaced, and the centroids of the plurality of display elements of the display are irregularly spaced. In some implementations, an irregular pattern formed by the plurality of sen sing pixels match an irregular pattern formed by the plurality of display elements.

In some implementations, the optical system includes an interferometer, and the optical hologram includes an interference pattern of an object beam interacting with the live scene and a reference beam interfering with the object beam by the interferometer.

In some implementations, the optical system includes: a coherent light source configured to emit a coherent light beam; and a beam splitter configured to split the coherent light beam from the coherent light source into the object beam and the reference beam.

In some implementations, the optical system further includes a beam combiner, where the live scene is on an optical path of the object beam upstream the beam combiner, and where the beam combiner is configured to superimpose the reference beam and the object beam to form the interference pattern.

In some implementations, the optical sensor is arranged downstream of the beam combiner and configured to directly capture the interference pattern on an active area of the optical sensor.

In some implementations, there is no optical lens between the beam combiner and the optical sensor.

In some implementations, there is no optical lens on an optical path of the reference beam between the beam splitter and the beam combiner.

In some implementations, the live scene is transmissive, and the object beam travels through the live scene to be incident on the beam combiner.

In some implementations, the live scene is reflective, and where the optical system includes one or more reflective mirrors configured to guide the object beam towards the live scene with an angle such that the object beam is reflected or scattered from the live scene to be incident on the beam combiner.

In some implementations, the optical system further includes one or more optical lens on the optical path of the object beam between the live scene and the beam combiner and configured to magnify or demagnify the object beam after interacting with the live scene to be compatible with an active area of the optical sensor.

In some implementations, the optical system further includes an absorber arranged on a side surface of the beam combiner and configured to absorb another part of the reference beam propagating away from the interference pattern.

In some implementations, the optical system further includes one or more optical lens arranged between the beam splitter and the live scene and configured to magnify or demagnify the object beam to be compatible with an active area of the optical sensor.

In some implementations, the optical system includes a collimator arranged upstream the beam splitter and configured to collimate the coherent light beam from the coherent light source.

In some implementations, the optical system includes a phase adjuster arranged on an optical path of one of the object beam and the reference beam and configured to dynamically adjust a phase shift of the one of the object beam and the reference beam before the interference pattern is formed, and where the phase adjuster includes a phase shifter or a dynamic retarder.

In some implementations, the phase adjuster is configured to sequentially adjust the phase shift to be a series of predetermined values in a time period, such that the optical sensor captures corresponding sequential optical holograms of the live scene in the time period.

In some implementations, the system further includes a computing device coupled between the holographic capturing system and the holographic display system. The computing device is configured to generate a digital hologram of the live scene with noise suppression based on the corresponding sequential optical holograms.

In some implementations, the phase adjuster includes a liquid crystal cell configured to adjust the phase shift to be the series of predetermined values by corresponding voltages.

In some implementations, the liquid crystal cell is a single cell having a size no smaller than a size of the one of the object beam and the reference beam.

In some implementations, a correspondence between the predetermined values of the phase shift and the corresponding voltages is pre-calibrated and predetermined.

In some implementations, the computing device is configured to process the corresponding sequential optical holograms to obtain corresponding raw digital holograms, and the computing device is configured to perform one or more mathematical operations on the corresponding raw digital holograms to generate the digital hologram of the live scene.

In some implementations, the series of predetermined values for the phase shift includes 0, pi/2, pi, 3pi/2, and the digital hologram is calculated based on an expression as follows:

final_hologram=(hologram_0−hologram_pi)/(hologram_pi/2)−hologram_3pi/2, where final_hologram represents the digital hologram, hologram_0 represents a first corresponding raw digital hologram based on a first corresponding optical hologram with 0 phase shift, hologram_pi/2 represents a second corresponding raw digital hologram based on a second corresponding optical hologram with pi/2 phase shift, hologram_pi represents a third corresponding raw digital hologram based on a third corresponding optical hologram with pi phase shift, and hologram_3pi/2 represents a fourth corresponding raw digital hologram based on a fourth corresponding optical hologram with 3pi/2 phase shift.

In some implementations, the light coherent source includes a plurality of light elements, each coherent light element emitting a respective color.

In some implementations, the plurality of coherent light elements is configured to sequentially and alternatively emit light with the respective colors, and the holographic capturing system further includes a corresponding color filter arranged upstream the optical sensor for each coherent light element of the plurality of coherent light elements, and the corresponding color filter is configured to transmit light with a corresponding color from the coherent light element and block light with other colors to reach the optical sensor.

In some implementations, the plurality of coherent light elements is configured to emit light with the respective colors simultaneously. The holographic capturing system further includes a color filter array including groups of different color filters on a plurality of sen sing pixels of the optical sensor, the different color filters being associated with the respective colors, each group of the different color filters being arranged on a corresponding group of adjacent sen sing pixels of the plurality of sen sing pixels.

In some implementations, the optical sensor is configured to determine hologram data for the respective colors based on a captured optical hologram captured by the corresponding groups of adjacent sen sing pixels of the plurality of sen sing pixels.

In some implementations, the system further includes a computing device coupled between the holographic capturing system and the holographic display system, and the computing device is configured to generate digital holograms for the respective colors based on a captured optical hologram captured by the corresponding groups of adjacent sen sing pixels of the plurality of sen sing pixels.

In some implementations, the holographic display system includes: a display including a plurality of display elements; and a driving device coupled to the display. The driving device is configured to: generate control signals for the plurality of display elements of the display based on a digital hologram associated with the live scene; and transmit the control signals to the display to modulate the plurality of display elements of the display based on the control signals.

In some implementations, the system further includes a computing device coupled between the holographic capturing system and the holographic display system. The computing device is configured to receive the at least part of the sequential hologram data from the optical sensor and generate digital holograms associated with the live scene based on the at least part of the sequential hologram data. The holographic display system is configured to receive the digital holograms associated with the live scene from the computing device and reconstruct the live scene in the 3D space based on the digital holograms.

In some implementations, the digital holograms include a series of groups of digital holograms for a plurality of colors, and the holographic display system further includes an illuminator including a plurality of coherent light elements for the plurality of colors.

In some implementations, the driving device is configured to: sequentially modulate the display with a first digital hologram for a first color during a first time period and modulate the display with a second digital hologram for a second color during a second, sequential time period; and control the illuminator to sequentially turn on a first coherent light element to emit light with the first color during the first time period and a second coherent light element to emit light with the second color during the second, sequential time period.

In some implementations, the driving device includes at least one of a display driver coupled to the display, an illuminator driver coupled to the illuminator, or a memory coupled to at least one of the display driver or the illuminator driver.

In some implementations, the reconstructed live scene in the 3D space has one or more holography characteristics including occlusion, parallax, and accommodation.

Another aspect of the present disclosure features a method performed by the system as noted above.

Another aspect of the present disclosure features a method including: optically generating an optical hologram of a live scene that includes one or more three-dimensional (3D) objects; capturing sequential optical holograms of the live scene and generating sequential hologram data associated with the sequential optical holograms of the live scene, each optical hologram being associated with respective hologram data; and reconstructing the live scene in a 3D space based on at least part of the sequential hologram data.

In some implementations, the method further includes: processing the at least part of the sequential hologram data to generate digital holograms associated with the live scene. Reconstructing the live scene in a 3D space based on at least part of the hologram data includes: reconstructing the live scene in the 3D space based on the digital holograms.

In some implementations, each of the digital holograms includes an amplitude-like hologram. Reconstructing the live scene in the 3D space based on the digital holograms includes: modulating a display for phase modulation directly with the digital hologram.

In some implementations, the sequential hologram data includes a stream of digital data, and where the digital data includes an array of data bits.

In some implementations, the method further includes: selecting respective hologram data of one or more optical holograms among the sequential optical holograms by a frame grabber. Processing the at least part of the sequential hologram data to generate the digital holograms associated with the live scene includes: generating the digital holograms associated with the live scene based on the selected respective hologram data of the one or more optical holograms.

In some implementations, the frame grabber includes one of: a frame-buffer-based grabber configured to deposit the respective hologram data in a frame buffer of the frame grabber before transmitting for generating the digital holograms, or a first in, first out (FIFO)-based grabber configured to transmit the respective hologram data directly for generating the digital holograms.

In some implementations, processing the at least part of the sequential hologram data to generate the digital holograms associated with the live scene includes: processing the at least part of the sequential hologram data to generate the digital holograms associated with the live scene based on at least one of a pitch of sen sing pixels of an optical sensor, a pitch of display elements of a display, a size of an active area of the optical sensor, or a size of the display.

In some implementations, the pitch of the sen sing pixels is associated with a resolution of a captured optical hologram and a capturable size of a scene, and the pitch of the display elements is associated with an acceptable viewing angle of a reconstructed scene and the size of the display.

In some implementations, processing the at least part of the sequential hologram data to generate the digital holograms associated with the live scene includes: suppressing a mismatch between a captured optical hologram of the live scene and a reconstruction of the live scene. The mismatch is associated with at least one of a difference between the pitch of the sen sing pixels and the pitch of the display elements, or a difference between the size of the active area of the optical sensor and the size of the display.

In some implementations, processing the at least part of the sequential hologram data to generate the digital holograms associated with the live scene includes at least one of: scaling a first digital hologram associated with a captured optical hologram based on a ratio between the pitch of the sen sing pixels and the pitch of the display elements, or cropping the scaled first digital hologram to generate a second digital hologram to be modulated on the display based on the size of the display and the size of the hologram data.

In some implementations, scaling the size of the first digital hologram associated with the captured optical hologram includes: using at least one of one or more interpolation algorithms including linear interpolation, nearest neighbor interpolation, cubic spline interpolation, shape-preserving interpolation, Biharomic interpolation, and thin-plate spline interpolation.

In some implementations, processing the at least part of the sequential hologram data to generate the digital holograms associated with the live scene includes: resampling a first digital hologram associated with a captured optical hologram to be a second digital hologram to be modulated on the display using Fourier transform (e.g., FFT) and inverse Fourier transform (e.g., inverse FFT), the first digital hologram being associated with the pitch of the sen sing pixels, the second digital hologram being associated with the pitch of the display elements.

In some implementations, resampling the first digital hologram associated with the captured optical hologram to be the second digital hologram to be modulated on the display includes: performing the Fourier transform on the first digital hologram to generate a transformed first digital hologram, and in response to determining the pitch of the sen sing pixels is smaller than the pitch of the display elements, cropping the transformed first digital hologram based on a ratio between the pitch of the sen sing pixels and the pitch of the display element, then performing the inverse Fourier transform on the cropped transformed first digital hologram to obtain the second digital hologram.

In some implementations, resampling the first digital hologram associated with the captured optical hologram to be the second digital hologram to be modulated on the display includes: performing the Fourier transform on the first digital hologram to generate a transformed first digital hologram, and if the pitch of the sen sing pixels is larger than the pitch of the display elements, adding one or more zero-pads to the transformed first digital hologram based on a ratio between the pitch of the sen sing pixels and the pitch of the display element, then performing the inverse Fourier transform on the transformed first digital hologram with the added one or more zero-pads to obtain the second digital hologram.

In some implementations, resampling the first digital hologram associated with the captured optical hologram to be the second digital hologram to be modulated on the display includes: resampling the first digital hologram to be the second digital hologram by respectively resampling central points of the plurality of sen sing pixels of the optical sensor to match centroids of a plurality of display elements of the display.

In some implementations, the plurality of sen sing pixels of the optical sensor is regularly arranged in the active area of the optical sensor, and the plurality of display elements is regularly arranged in the display, and the central points of the plurality of sen sing pixels are regularly spaced, and the centroids of the plurality of display elements of the display are regularly spaced.

In some implementations, the plurality of sen sing pixels of the optical sensor is regularly arranged in the active area of the optical sensor, and the plurality of display elements is irregularly arranged in the display, and the central points of the plurality of sen sing pixels are regularly spaced, and the centroids of the plurality of display elements of the display are irregularly spaced.

In some implementations, resampling the first digital hologram associated with the captured optical hologram to be the second digital hologram to be modulated on the display includes: resampling the regularly spaced center points of the plurality of sen sing pixels to match the irregularly spaced centroids of the plurality of display elements by determining a position of each centroid of the plurality of display elements based on a weighted sum of adjacent center points around the centroid using one or more weighting algorithms.

In some implementations, the plurality of sen sing pixels of the optical sensor is irregularly arranged in the active area of the optical sensor, and the plurality of display elements is irregularly arranged in the display, the central points of the plurality of sen sing pixels are irregularly spaced, and the centroids of the plurality of display elements of the display are irregularly spaced, and an irregular pattern formed by the plurality of sen sing pixels match an irregular pattern formed by the plurality of display elements.

In some implementations, optically generating the optical hologram of the live scene includes: forming an interference pattern by interfering an object beam interacting with the live scene with a reference beam, where the object beam and the reference beam are coherent light beams, and the optical hologram includes the interference pattern.

In some implementations, capturing the sequential optical holograms of the live scene includes directly capturing the interference pattern on active area of an optical sensor.

In some implementations, the method further includes: magnifying or demagnifying the object beam after interacting with the live scene to be compatible with an active area of the optical sensor.

In some implementations, the method further includes: dynamically adjusting a phase shift of one of the object beam and the reference beam before the interference pattern is formed.

In some implementations, dynamically adjusting the phase shift of one of the object beam and the reference beam includes: sequentially adjusting the phase shift to be a series of predetermined values in a time period. Capturing the sequential optical holograms of the live scene includes: capturing corresponding sequential optical holograms of the live scene in the time period.

In some implementations, the method further includes: generating a digital hologram of the live scene with noise suppression based on the corresponding sequential optical holograms.

In some implementations, generating the digital hologram of the live scene with noise suppression based on the corresponding sequential optical holograms includes: processing the corresponding sequential optical holograms to obtain corresponding raw digital holograms, and performing one or more mathematical operations on the corresponding raw digital holograms to generate the digital hologram of the live scene.

In some implementations, the series of predetermined values for the phase shift includes 0, pi/2, pi, 3pi/2, and the digital hologram is calculated based on an expression as follows:

final_hologram=(hologram_0-hologram_pi)/(hologram_pi/2-hologram_3pi/2), where final_hologram represents the digital hologram, hologram_0 represents a first corresponding raw digital hologram based on a first corresponding optical hologram with 0 phase shift, hologram_pi/2 represents a second corresponding raw digital hologram based on a second corresponding optical hologram with pi/2 phase shift, hologram_pi represents a third corresponding raw digital hologram based on a third corresponding optical hologram with pi phase shift, and hologram_3pi/2 represents a fourth corresponding raw digital hologram based on a fourth corresponding optical hologram with 3pi/2 phase shift.

In some implementations, optically generating the optical hologram of the live scene includes: sequentially and alternatively emitting light with a plurality of colors to sequentially and alternatively generate optical holograms for the plurality of colors. Capturing the sequential optical holograms of the live scene includes: sequentially transmitting only light with an individual color, while blocking light with other colors.

In some implementations, optically generating the optical hologram of the live scene includes: emitting light with a plurality of colors simultaneously. Capturing the sequential optical holograms of the live scene includes: capturing the optical hologram by corresponding groups of adjacent sen sing pixels of a plurality of sen sing pixels of an optical sensor, with a color filter array arranged on the optical sensor, where the color filter array includes groups of different color filters on the plurality of sen sing pixels of the optical sensor, the different color filters being associated with the plurality of colors, each group of the different color filters being arranged on a corresponding group of adjacent sen sing pixels of the plurality of sen sing pixels.

In some implementations, generating sequential hologram data associated with the sequential optical holograms of the live scene includes: determining hologram data for each of the plurality of colors based on the optical hologram.

In some implementations, the method further includes: generating digital holograms for the plurality of colors based on the optical hologram, and reconstructing the live scene in a 3D space based on at least part of the hologram data includes: reconstructing the live scene in the 3D space based on the digital holograms.

In some implementations, reconstructing the live scene in a 3D space based on at least part of the hologram data includes: generating control signals for a plurality of display elements of a display based on a digital hologram associated with the live scene; and modulate the plurality of display elements of the display based on the control signals.

In some implementations, the method further includes: generating digital holograms associated with the live scene based on the at least part of the sequential hologram data. The digital holograms include a series of groups of digital holograms for a plurality of colors.

In some implementations, reconstructing the live scene in a 3D space based on at least part of the hologram data includes: sequentially modulating the display with a first digital hologram for a first color during a first time period and modulating the display with a second digital hologram for a second color during a second, sequential time period, and sequentially turning on a first coherent light element to emit light with the first color during the first time period and a second coherent light element to emit light with the second color during the second, sequential time period.

Another aspect of the present disclosure features a system including: a hologram generation system configured to generate one or more digital holograms corresponding to a live scene that includes one or more three-dimensional (3D) objects; and a holographic display system configured to reconstruct the live scene in a 3D space based on the one or more digital holograms. The hologram generation system includes: one or more scene acquisition devices configured to capture visual data of the live scene from one or more views, the visual data including at least one of one or more images or one or more videos; and a computing system configured to: obtain primitive data associated with the live scene based on the captured visual data of the live scene; and generate a digital hologram corresponding to the live scene based on the primitive data associated with the live scene and display element information of a display of the holographic display system.

In some implementations, the computing system includes a computing device coupled to the one or more scene acquisition devices and configured to: generate a 3D representation of the live scene based on the captured visual data of the live scene; and obtain primitive data of the 3D representation of the live scene based on the 3D representation of the live scene, where the primitive data associated with the live scene includes the primitive data of the 3D representation of the live scene.

In some implementations, the computing device is configured to generate the 3D representation of the live scene based on the captured visual data of the live scene using a 3D rendering algorithm.

In some implementations, the one or more scene acquisition devices are configured to transmit sequential visual data of the live scene to the computing device in a time period, the sequential visual data including first visual data and second visual data sequential to the first visual data. The computing device is configured to: generate a first 3D representation of the live scene based on the first visual data of the live scene using the 3D rendering algorithm, and generate a second 3D representation of the live scene by updating the first 3D representation of the live scene based on a difference between the first visual data and the second visual data using the 3D rendering algorithm.

In some implementations, the computing device is configured to: load the 3D representation of the live scene into a 3D simulation application, and obtain the primitive data of the 3D representation of the live scene based on an output of the 3D simulation application that is associated with the 3D representation of the live scene.

In some implementations, the primitive data of the 3D representation of the live scene includes: data of a plurality of primitives corresponding to the 3D representation of the live scene, the data including primitive data of each primitive of the plurality of primitives, a primitive including at least one vertex, primitive data of the primitive including data of the at least one vertex.

In some implementations, the primitive data of the primitive includes at least one of: a primitive identifier of the primitive, at least one vertex identifier of the at least one vertex, coordinate information of the primitive in a 3D coordinate system, color information of the primitive, texture coordinate information of the primitive, shading information for the primitive, viewpoint dependent shading information associated with the primitive, or occlusion information of the primitive.

In some implementations, the computing system includes a processing device coupled to the computing device and configured to: for each primitive of the plurality of primitives, determining an electromagnetic (EM) field contribution to each of a plurality of display elements of the display based on primitive data of the primitive; and for each of the plurality of display elements of the display, generating a sum of the EM field contributions of the plurality of primitives to the display element, where the digital hologram includes the sums of the EM field contributions for the plurality of display elements of the display.

In some implementations, the computing device is configured to: generate the primitive data of the 3D representation of the live scene based on the output of 3D simulation application using an application programming interface (API). The computing device is configured to execute the API to: for each of a plurality of vertices of the plurality of primitives, associate a respective vertex identifier of the vertex with respective vertex data of the vertex, and store the association between the respective vertex identifier and the respective vertex data of the vertex in a memory of the computing device; and for each of the plurality of primitives, associate a respective primitive identifier of the primitive with one or more respective vertex identifiers of one or more vertices of the primitive in the memory, and store an association between the respective primitive identifier and the one or more respective vertex identifiers for the primitive in the memory.

In some implementations, the computing device is configured to execute the API to: determine primitive identifiers of multiple primitives associated with a command instruction, determine vertex identifiers associated with the primitive identifiers; and transmit a command including the command instruction, the vertex identifiers associated with the primitive identifiers, and the primitive identifiers of the multiple primitives, to the processing device, without the primitive data of the plurality of primitives. The command indicates drawing the multiple primitives according to the command instruction and based on at least one of the primitive identifiers of the multiple primitives or the vertex identifiers associated with the primitive identifiers.

In some implementations, the processing device includes: a command processor, a plurality of computing units, and an accumulator. The command processor is configured to: receive the command from the computing device, and process the command to obtain primitive data of the multiple primitives from the computing device based on the command. The plurality of computing units can be configured to calculate an electromagnetic (EM) field contribution of each of the multiple primitives to each of the plurality of display elements based on the primitive data of the multiple primitives. The accumulator can be configured to: accumulate EM field contributions of the multiple primitives to each of the plurality of display elements.

In some implementations, the command processor, the plurality of computing units, and the accumulator are connected in series, and the plurality of computing units are connected in parallel between the command processor and the accumulator.

In some implementations, the digital hologram is a complex-valued hologram, a phase hologram, or an amplitude hologram.

In some implementations, the holographic display system includes a driving device coupled to the display and configured to: generate modulation control signals for a plurality of display elements of the display based on the digital hologram corresponding to the live scene.

In some implementations, the digital hologram is a complex-valued hologram, and the driving device is configured to: convert the complex-valued hologram to a phase-only hologram, and generate the respective modulation control signals for the plurality of display elements based on the phase-only hologram.

In some implementations, the holographic display system further includes an illuminator. The driving device is configured to: transmit an illumination control signal to the illuminator to activate the illuminator to illuminate light on the display such that the light is caused by modulated display elements of the display to form a volumetric light field corresponding to the live scene. The driving device is configured to: output the respective modulation control signal to each display element of the plurality of display elements, in coordination with transmitting the illumination control signal to the illuminator.

In some implementations, the driving device is configured to: sequentially output a first modulation control signal to modulate the display with a first digital hologram associated with a first color during a first time period, and a second modulation control signal to modulate the display with a second digital hologram associated with a second color during a second, sequential time period; and sequentially output a first illumination control signal to activate the illuminator to turn on a first coherent light element to emit light with a first color during the first time period, and a second illumination control signal to activate the illuminator to turn on a second coherent light element to emit light with the second color during the second time period.

In some implementations, the hologram generation system is configured to generate sequential digital holograms corresponding to the live scene, and the holographic display system is configured to continuously reconstruct the live scene in the 3D space based on the sequential digital holograms.

Another aspect of the present disclosure features a method including: capturing visual data of a live scene from one or more views, the live scene including one or more three-dimensional (3D) objects, the visual data including at least one of one or more images or one or more videos; obtaining primitive data associated with the live scene based on the captured visual data of the live scene; generating one or more digital holograms corresponding to the live scene based on the primitive data associated with the live scene and display element information of a display; and reconstructing the live scene in a 3D space by modulating the display with the one or more digital holograms.

In some implementations, obtaining the primitive data associated with the live scene based on the captured visual data of the live scene includes: generating a 3D representation of the live scene based on the captured visual data of the live scene, and obtaining primitive data of the 3D representation of the live scene based on the 3D representation of the live scene, where the primitive data associated with the live scene includes the primitive data of the 3D representation of the live scene.

In some implementations, generating the 3D representation of the live scene based on the captured visual data of the live scene includes: processing the captured visual data of the live scene using a 3D rendering algorithm to generate the 3D representation of the live scene.

In some implementations, the method includes: generating sequential visual data of the live scene in a time period, the sequential visual data including first visual data and second visual data sequential to the first visual data; generating a first 3D representation of the live scene based on the first visual data of the live scene using the 3D rendering algorithm; and generating a second 3D representation of the live scene by updating the first 3D representation of the live scene based on a difference between the first visual data and the second visual data using the 3D rendering algorithm.

In some implementations, obtaining the primitive data of the 3D representation of the live scene based on the 3D representation of the live scene includes: loading the 3D representation of the live scene into a 3D simulation application, and obtaining the primitive data of the 3D representation of the live scene based on an output of the 3D simulation application that is associated with the 3D representation of the live scene.

In some implementations, the primitive data of the 3D representation of the live scene includes: data of a plurality of primitives corresponding to the 3D representation of the live scene, the data including primitive data of each primitive of the plurality of primitives, a primitive including at least one vertex, primitive data of the primitive including data of the at least one vertex.

In some implementations, the primitive data of the primitive includes at least one of: a primitive identifier of the primitive, at least one vertex identifier of the at least one vertex, coordinate information of the primitive in a 3D coordinate system, color information of the primitive, texture coordinate information of the primitive, shading information for the primitive, viewpoint dependent shading information associated with the primitive, or occlusion information of the primitive.

In some implementations, generating the one or more digital holograms corresponding to the live scene includes: for each primitive of the plurality of primitives, determine an electromagnetic (EM) field contribution to each of a plurality of display elements of the display based on primitive data of the primitive; and for each of the plurality of display elements of the display, generate a sum of the EM field contributions of the plurality of primitives to the display element. A digital hologram includes the sums of the EM field contributions for the plurality of display elements of the display.

In some implementations, the method further includes: for each of a plurality of vertices of the plurality of primitives, associating a respective vertex identifier of the vertex with respective vertex data of the vertex, and storing the association between the respective vertex identifier and the respective vertex data of the vertex in a memory; and for each of the plurality of primitives, associating a respective primitive identifier of the primitive with one or more respective vertex identifiers of one or more vertices of the primitive in the memory, and storing an association between the respective primitive identifier and the one or more respective vertex identifiers for the primitive in the memory.

In some implementations, the method further includes: determining primitive identifiers of multiple primitives associated with a command instruction, determining vertex identifiers associated with the primitive identifiers; and generating a command including the command instruction, the vertex identifiers associated with the primitive identifiers, and the primitive identifiers of the multiple primitives. The command indicates drawing the multiple primitives according to the command instruction and based on at least one of the primitive identifiers of the multiple primitives or the vertex identifiers associated with the primitive identifiers.

In some implementations, the method includes: processing the command to obtain primitive data of the multiple primitives based on the command; calculating an electromagnetic (EM) field contribution of each of the multiple primitives to each of the plurality of display elements based on the primitive data of the multiple primitives; and accumulating EM field contributions of the multiple primitives to each of the plurality of display elements.

In some implementations, reconstructing the live scene in a 3D space by modulating the display with the one or more digital holograms includes: generating modulation control signals for a plurality of display elements of the display based on a digital hologram corresponding to the live scene.

In some implementations, the digital hologram is a complex-valued hologram, and the method includes: converting the complex-valued hologram to a phase-only hologram, and generating the respective modulation control signals for the plurality of display elements based on the phase-only hologram.

In some implementations, reconstructing the live scene in a 3D space by modulating the display with the one or more digital holograms includes: transmitting an illumination control signal to an illuminator to activate the illuminator to illuminate light on the display such that the light is caused by modulated display elements of the display to form a volumetric light field corresponding to the live scene, and outputting the respective modulation control signal to each display element of the plurality of display elements, in coordination with transmitting the illumination control signal to the illuminator.

In some implementations, reconstructing the live scene in a 3D space by modulating the display with the one or more digital holograms includes: sequentially outputting a first modulation control signal to modulate the display with information associated with a first color during a first time period, and a second modulation control signal to modulate the display with information associated with a second color during a second, sequential time period; and sequentially outputting a first illumination control signal to activate the illuminator to turn on a first coherent light element to emit light with a first color during the first time period, and a second illumination control signal to activate the illuminator to turn on a second coherent light element to emit light with the second color during the second time period.

In some implementations, the method includes: generating sequential digital holograms corresponding to the live scene based on captured sequential visual data of the live scene; and continuously reconstructing the live scene in the 3D space based on the sequential digital holograms.

Another aspect of the present disclosure features a system for generating digital holograms corresponding to live scenes. The system includes: one or more scene acquisition devices and a computing system. The configured to capture visual data of a live scene from one or more views, the live scene including one or more three-dimensional (3D) objects, the visual data including at least one of one or more images or one or more videos. The computing system can be configured to: obtain primitive data associated with the live scene based on the captured visual data of the live scene; and generate a digital hologram corresponding to the live scene based on the primitive data associated with the live scene and display element information of a display.

In some implementations, the computing system is implemented by the computing system according to the computing system as described herein.

Another aspect of the present disclosure features a method performed by the system as described herein.

The present disclosure provides techniques that can overcome limitations present in known techniques. As an example, the techniques disclosed herein can capture and display live scenes including 3D objects in a real world in real time, without or with minimum latency, and/or with fast processing speed or minimized data processing. As another example, the techniques disclosed herein provide real 3D reconstruction using holography, which can be implemented without the use of cumbersome wearable devices, such as "3D glasses." As another example, the techniques disclosed herein can optionally be implemented without being limited by the accuracy of tracking mechanisms, the quality of the display devices, relatively long processing times and/or relatively high computational demands, and/or by an inability to display objects to multiple viewers simultaneously. As a further example, the techniques can be implemented without specialized tools and software to develop contents that extend above and beyond the tools and software used in conventional 3D content creation.

Various embodiments can exhibit one or more of the foregoing technical benefits and advantages. For example, the techniques described herein can enable precise measurements, e.g., for an angle of an object and refractive index of a medium (or substance) with cost effective methods. Certain implementations of the present disclosure provide a system that can measure the angle of an object (e.g., a wedge cell) very precisely by performing a Fast Fourier Transform (FFT) of an interference pattern generated by front and back surface reflections of the wedge cell, when the wedge cell is filled with a medium with a known refractive index (e.g., air). The system can also enable to perform a precise measurement of a refractive index of a medium based on the FFT of another interference pattern when the wedge cell is filled with the medium with unknown refractive index. Additionally, the system can be used to measure a surface roughness of an object (e.g., a pane with an uneven surface) using similar or same techniques, e.g., capturing an interference pattern on an optical sensor and transforming the interference pattern to Fourier space to determine the spatial frequencies along different directions. The versatility of the techniques makes optical characterization more effective, efficient, adaptive to different applications without requiring significant modifications or additional components in the system.

Certain implementations of the present disclosure can produce real-time, full color, genuine 3D images that appear to be real 3D objects in the world and can be viewed without encumbrances by multiple viewers simultaneously from different points.

In the present disclosure herein, the term "live scene" refers to real world scene, real life scene, or physical scene, in comparison to computer-generated scene or digital scene. A live scene can include one or more three-dimensional (3D)

objects in real world. The term "real time" refers to events (e.g., capturing a live scene and holographic reconstruction of the live scene) happening instantaneously or a delay between sequential events being in a predetermined threshold (e.g., 10 milliseconds (ms), 50 ms, 66 ms, 100 ms, or any other suitable value).

The term "primitive" refers to a basic element for input or output within a computing system. The element can be a geometric element or a graphical element. For example, in vector computer graphics, CAD systems, and geographic information systems, geometric primitive (or prim) is the simplest (e.g., 'atomic' or irreducible) geometric shape that the system can handle (e.g., draw, store). The term "vertex" refers to a node of a primitive that can be connected with one or more other nodes to form the primitive.

The term "hologram" refers to a pattern displayed by (or uploaded to) a display which contains amplitude information or phase information, or some combination thereof, regarding an object. The term "optical hologram" refers to a physical representation of a hologram, e.g., an interference pattern between a reference beam and an object beam of coherent light (e.g., laser light). The term "digital hologram" refers to a digital representation of a hologram. The digital hologram can be generated by a) processing hologram data of the optical hologram, b) processing images/videos of the object itself, c) simulating an interference process on a computer using mathematical models and algorithms (which can be also called a computational hologram), or d) calculating electromagnetic contributions from primitives of the object to display elements (e.g., generated using Maxwell Holography). The term "amplitude-like hologram" can refer to a hologram performing like an amplitude hologram, though the hologram includes both amplitude information and phase information of an object that enable to reconstruct the object in a 3D space. The term "holographic reconstruction" refers to a volumetric light field (e.g., a holographic light field) from a display modulated with a hologram when illuminated.

As used herein, the term "irregular" represents "non-periodic" and/or "non-uniform" For example, the term "irregular shape" can indicate that a shape has sides and/or angles with different lengths and/or sizes. The term "irregular pattern" can indicate that: i) components (e.g., phasels) in an area of the pattern are arranged in a non-periodic way, and the components can be same or different from each other, or ii) the components have different irregular shapes.

Shading is a process of adding value to create an illusion of form, space, and light in a drawing. Shading can make a drawing appear three dimensional and create a convincing image. Shading can be different from techniques of adding shadows, such as shadow mapping or shadow volumes, which fall under global behavior of light. The term "shading information" refers to depiction information of depth perception in 3D models (e.g., within the field of 3D computer graphics) or illustrations (e.g., in visual art) by varying a level of darkness. Shading information can approximate a local behavior of light on an object's surface. The shading information can be obtained by any customary computer-generated imagery (CGI) surface shading method that involves modulating color or brightness of a surface of the primitive. Primitive data disclosed herein can include shading information associated with the primitive.

The term "view-dependent shading information" can be a larger generalization of the term "geometric specular reflection". Specular reflection is a subset of view-dependent shading. Specular reflection is something like a blurred, recolored image of a light source that is described by bi-directional reflectance distribution function ("BRDF") of a particular material. like plastic or shiny wood. View-dependent shading can encompass specular BRDFs as well as perfect mirror surfaces and image-based lighting. For example, to render a spherical Christmas decoration, an image of the environment surrounding the decoration and an environment that also includes the positions and sizes of each light source can be reflected, and the position of the viewer can be part of that reflection calculation. The reflection appears to move as a viewpoint is changed, revealing different parts of the environment. Similarly, the position of the bright specular area on a plastic surface can be the sum of view-dependent projections of the Christmas lights reflected off the spherical decoration multiplied by the BRDF. Primitive data disclosed herein can include view-dependent shading information associated with the primitive.

The details of one or more implementations of the subject matter of this specification are set forth in the accompanying drawings and associated description. Other features, aspects, and advantages of the subject matter will become apparent from the description, the drawings, and the claims.

It is to be understood that various aspects of implementations can be combined in different manners. As an example, features from certain methods, devices, or systems can be combined with features of other methods, devices, or systems.

DESCRIPTION OF DRAWINGS

FIG. 4B illustrates another example of processing hologram-based images.

FIGS. 7A-7C illustrate example cues of holographically displaying objects, including occlusion (FIG. 7A), parallax (FIG. 7B), and accommodation (FIG. 7C).

FIGS. 10A-10C illustrate diagrams of various stages showing how light propagates through the example system of FIG. 9.

Like reference numbers and designations in the various drawings indicate like elements. It is also to be understood that the various exemplary implementations shown in the figures are merely illustrative representations and are not necessarily drawn to scale.

DETAILED DESCRIPTION

Figure 1A:
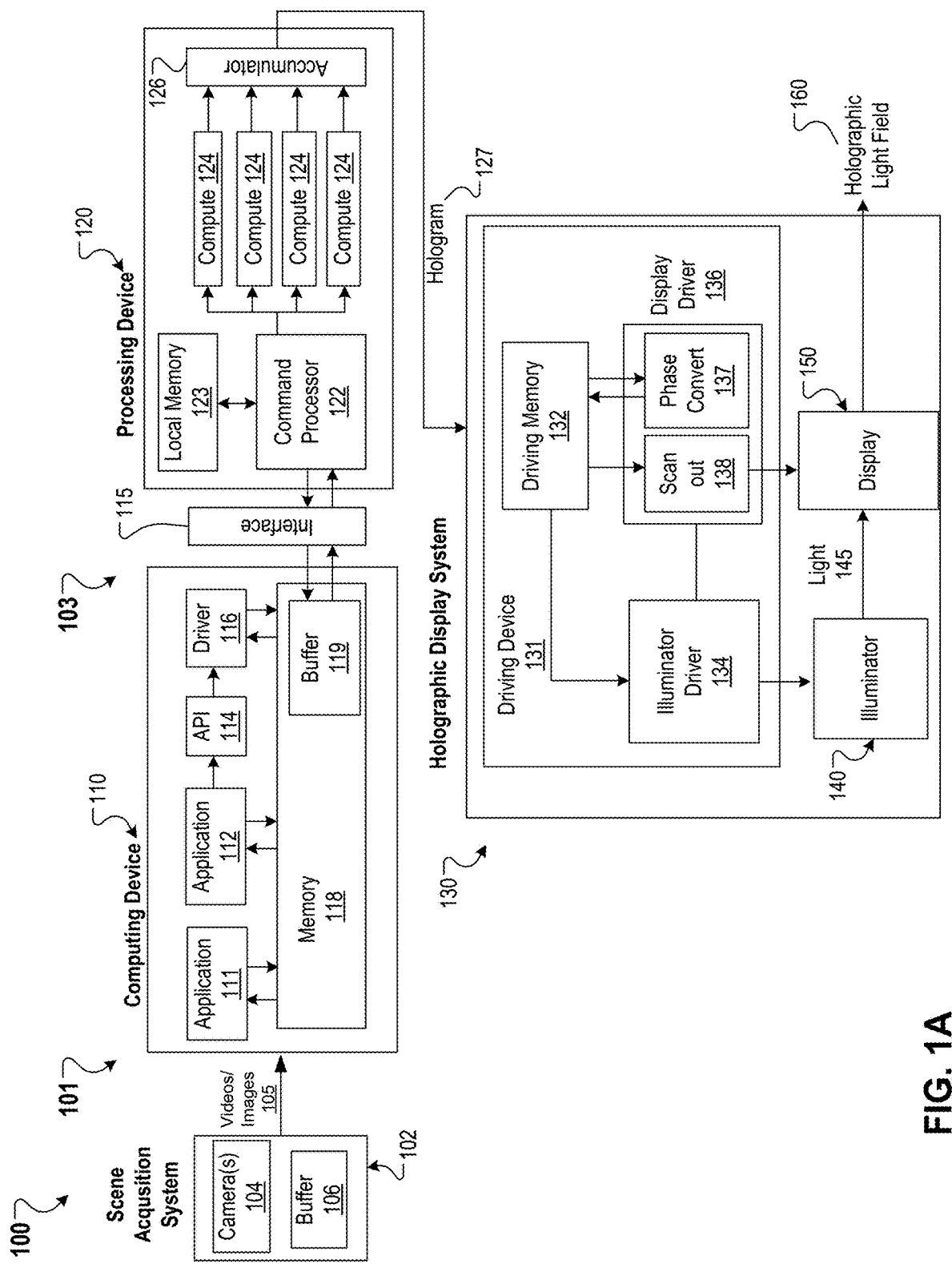
FIG. 1A illustrates a schematic diagram of an example system for capturing and displaying live scenes using computational approach.

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

Implementations of the present disclosure are described herein according to the following general outline:
1. General overview
2. Example system with computational approach
3. Example system with optical approach
4. Example holographic capturing systems
5. Example holographic display systems
6. Example irregular display
7. Example holographic cues
8. Example Processes
9. Example Applications 1. General Overview Implementations of the present disclosure feature techniques for enabling holographically displaying live scenes including one or more three-dimensional (3D) objects. A live scene can be a scene of an event happening in real world, real life, or in a physical space, e.g., a soccer game occurring in a stadium, which can be different from complex computer-generated or simulated or digitally animated scenes (e.g., by 3D simulation applications). The techniques enable to physically capture the live scene, to make holograms (e.g., single or multiple colors of holograms) of the live scene, and holographically display the live scene (in single or multiple colors), which can be implemented in real time, e.g., by transmitting captured data of the live scene to a holographic display system for reconstructing the live scene, without latency or with minimum latency, and/or without storing the captured data of the live scene and/or the generated holograms, and/or improving processing speed.

Figure 1B:
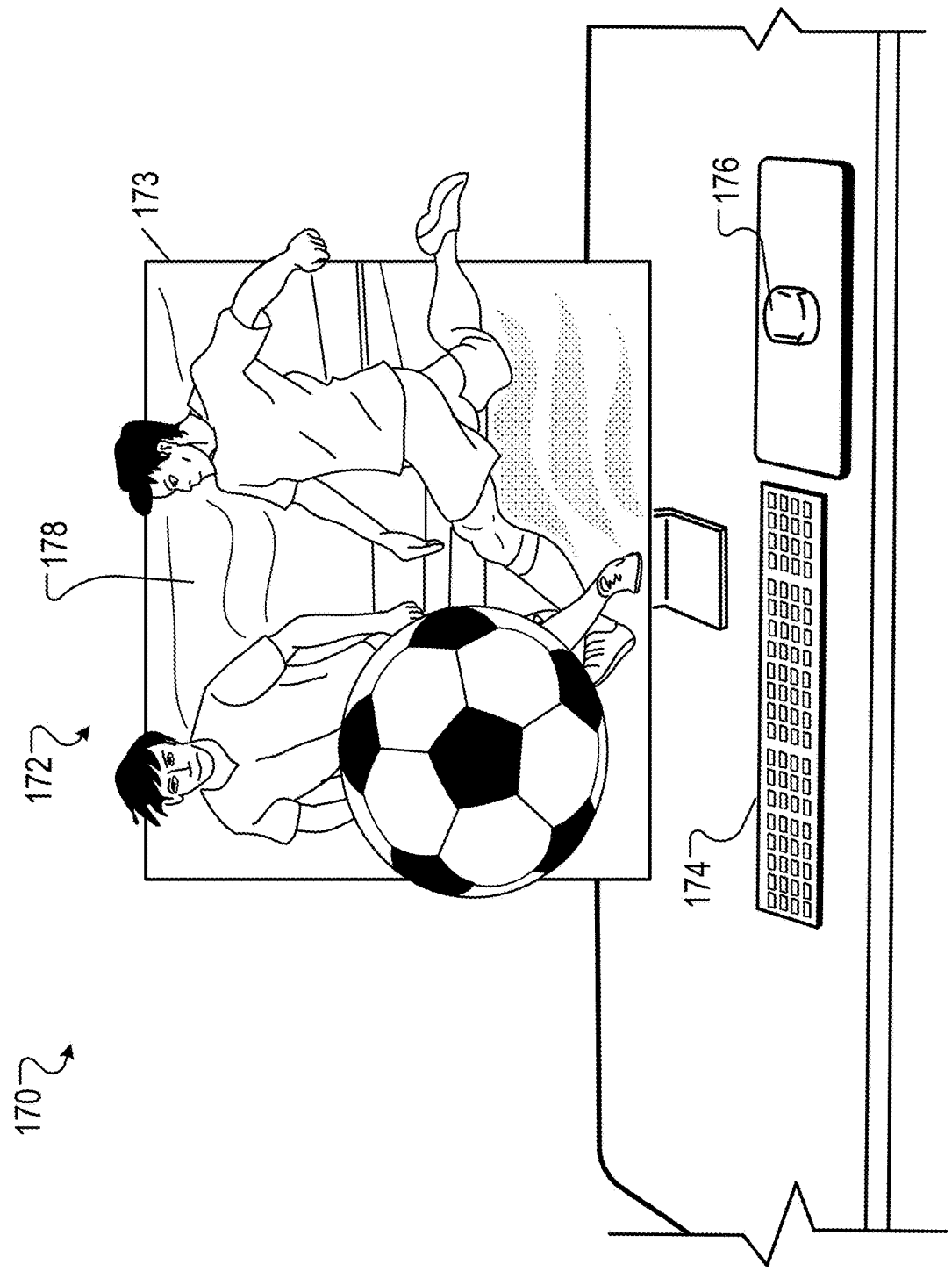
FIG. 1B illustrates an example holographic reconstruction for a live scene.

In some implementations, e.g., as illustrated in FIG. 1, a live scene can be captured by one or more visual acquisition devices (e.g., cameras or image/video recorders) that can be arranged around the live scene and/or from one or more views. The one or more visual acquisition devices can generate visual data of the live scene that can include one or more images (or videos) of the live scene from the one or more views. The one or more visual acquisition devices can transmit (e.g., in real time) the visual data to a computing device. The computing device can generate corresponding digital holograms of the live scene based on the visual data. For example, the computing device can use a 3D rendering algorithm (e.g., NeRF) to generate a 3D representation of the live scene based on the visual data (e.g., from two or more views). The computing device can further use a 3D simulation application (e.g., Unity) to obtain primitive data of a plurality of primitives associated with the 3D representation of the live scene. A processing device (e.g., a phasel processing device) can then generate a digital hologram corresponding to the live scene, e.g., based on the primitive data associated with the live scene and display element information of a display to be modulated with the digital hologram, e.g., by using the techniques of MAXWELL HOLOGRAPHY® (or MAXWELL HOLOGRAPHY™), which can achieve faster processing speed for real time holography than conventional digital holography and/or computational holography. Then the digital hologram can be transmitted to a holographic display system, where the display is modulated with the digital hologram to diffract light from an illuminator to reconstruct the live scene in a 3D space (e.g., as illustrated in FIG. 1B). In some implementations, different colors (e.g., red, blue, and green) of digital holograms can be generated by the computing device and/or the processing device, and the holographic display system can reconstruct the live scene in the different colors, e.g., sequentially modulating the display with alternating holograms with the different colors.

The calculation (or computation) in MAXWELL HOLOGRAPHY® can be represented as Maxwell holographic calculation (or Maxwell holographic computation). In conventional digital holography, a digital intensity image of a hologram first undergoes processing such as complex wave retrieval, and the hologram is then numerically propagated by means of Fresnel approximation which describes wave propagation in free space to an image plane. This may result in a complex image containing both amplitude and phase information. In contrast, based upon Maxwell's Equations for electromagnetic fields, the Maxwell Holographic calculation approaches a hologram as a Dirichlet or Cauchy boundary condition problem for a general electric field, utilizing tools including field theory, topology, analytic continuation, and/or symmetry groups, which enables to solve for holograms in real time without the limitations of legacy holographic systems like conventional digital holography and achieve a faster processing speed.

Figure 2:
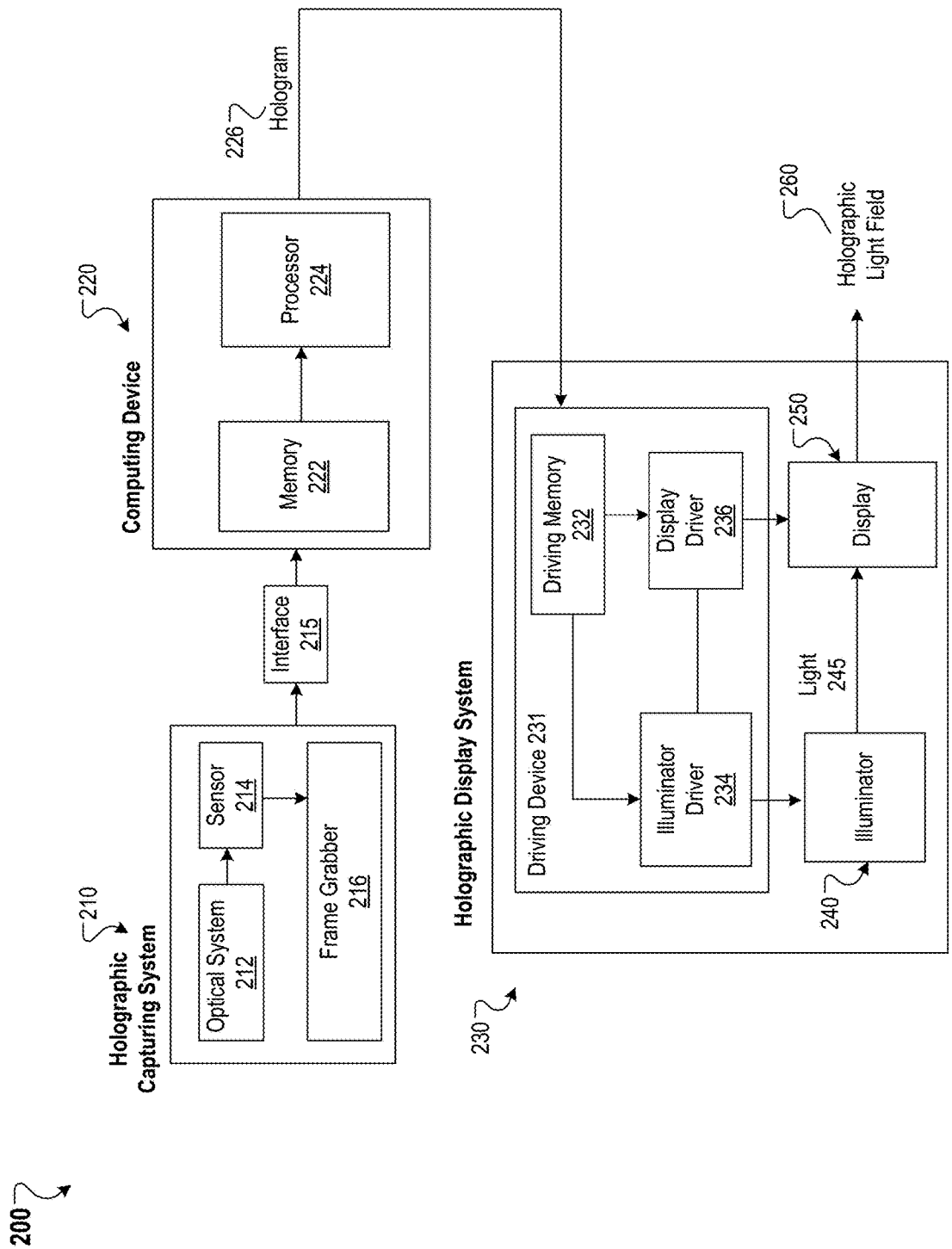
FIG. 2 illustrates a schematic diagram of an example system for capturing and displaying live scenes using optical approach.
Figure 3A:
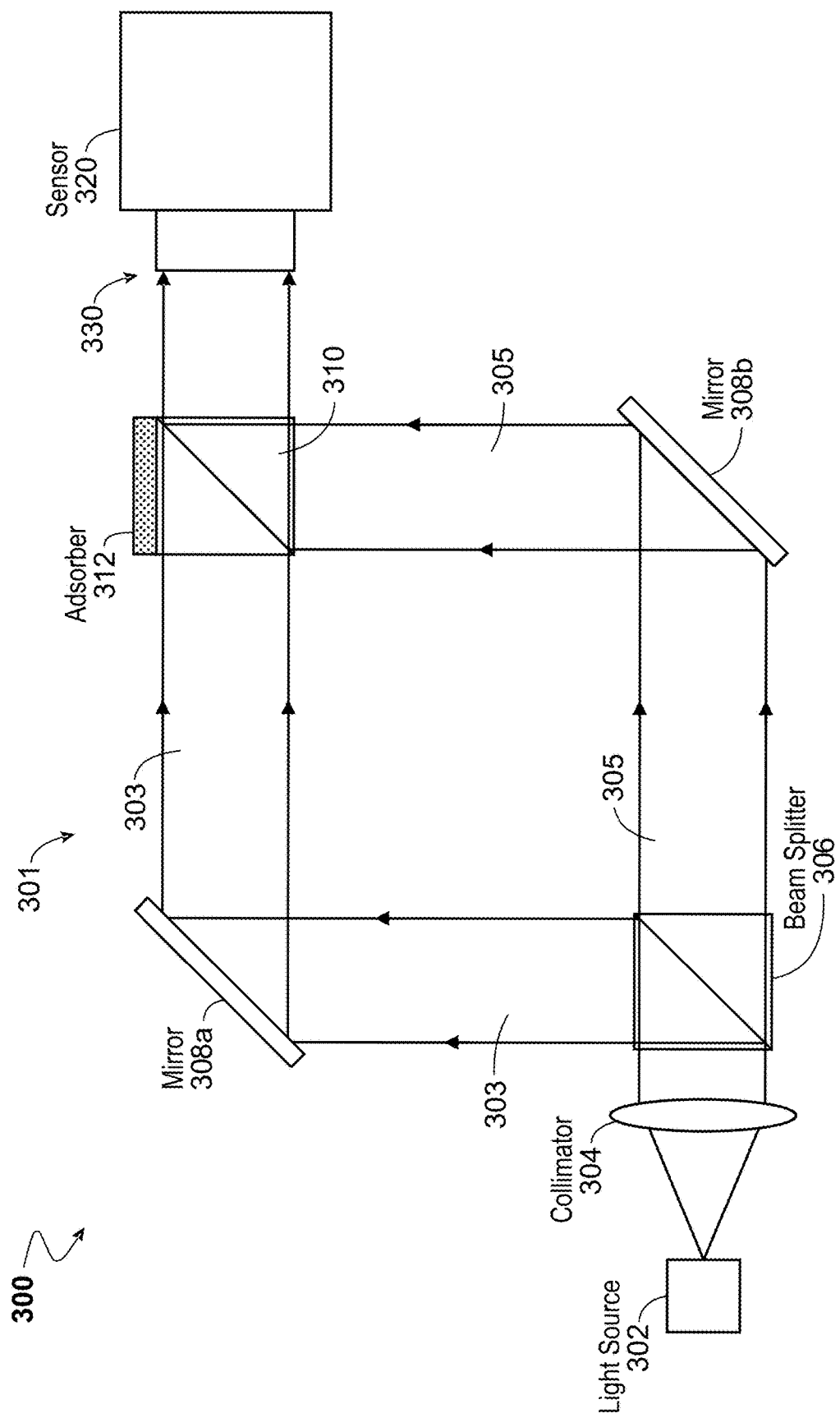
FIG. 3A illustrates a schematic diagram of an example holographic capturing system.
Figure 3B:
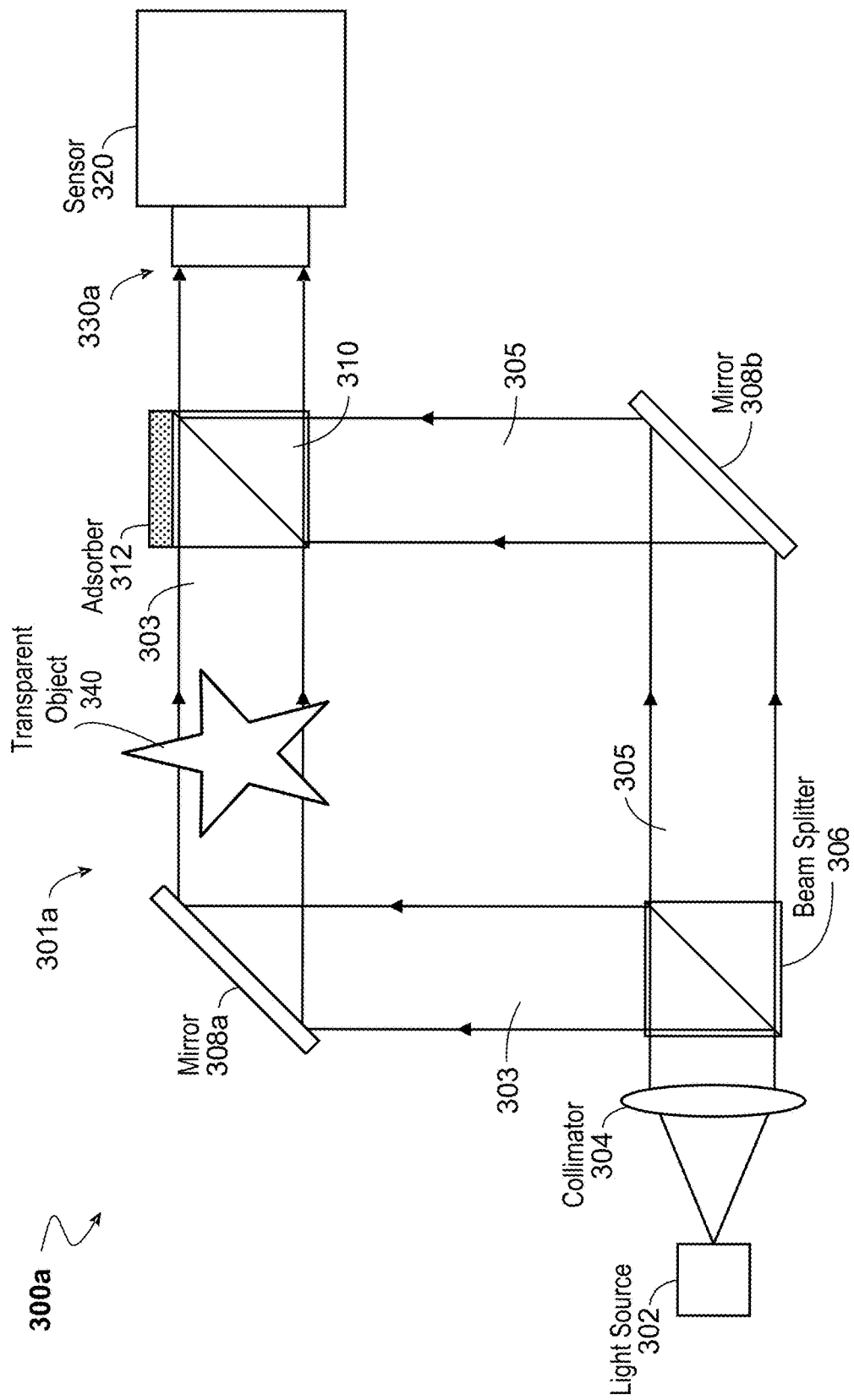
FIG. 3B illustrates a schematic diagram of an example holographic capturing system for capturing a transparent object.
Figure 3C:
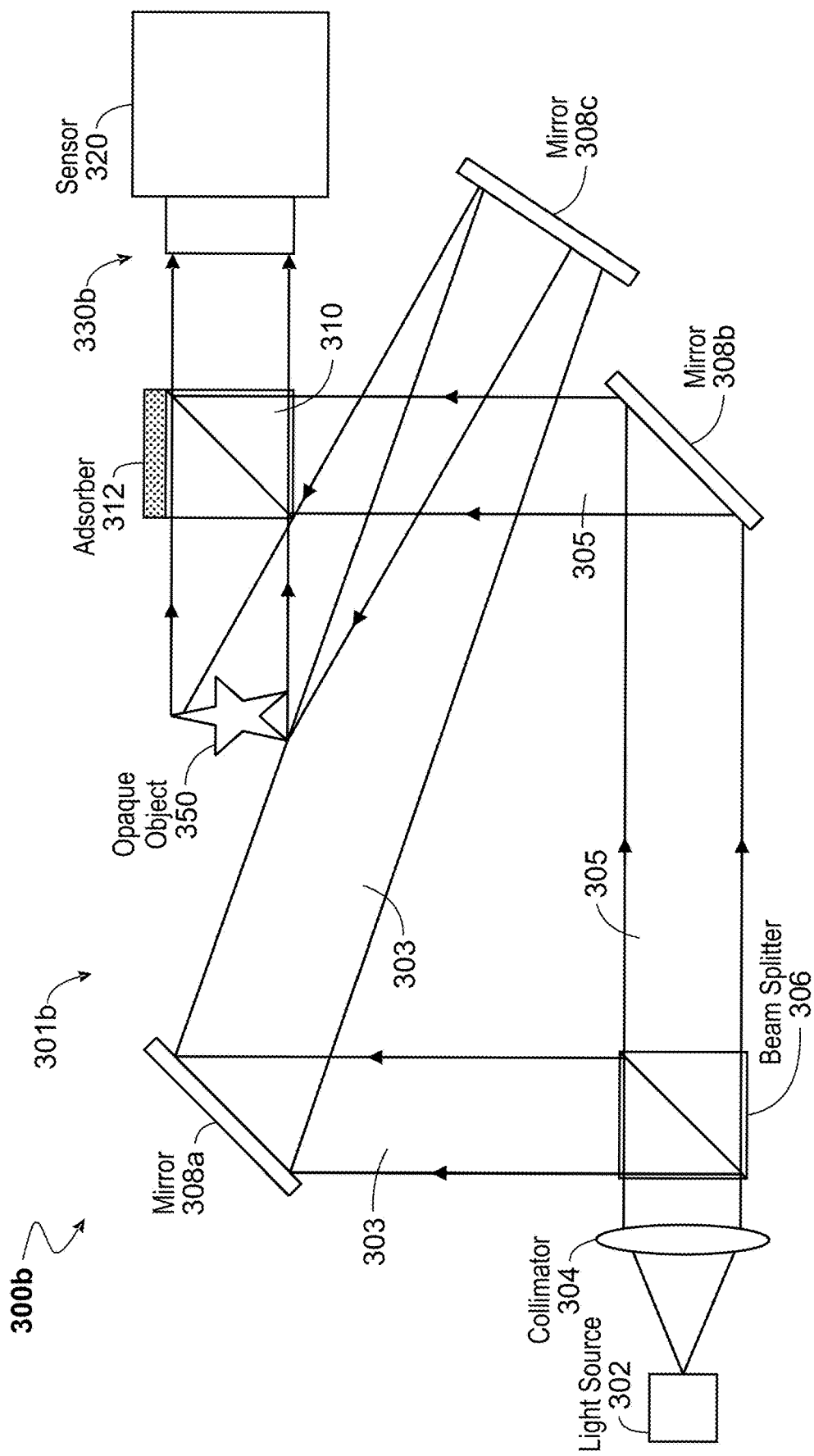
FIG. 3C illustrates a schematic diagram of an example holographic capturing system for capturing an opaque object.

In some implementations, e.g., as illustrated in FIG. 2, a live scene is captured as optical holograms by a holographic capturing system (e.g., as illustrated in FIGS. 3A-3C). An optical hologram of the live scene can be an interference pattern of an object beam interacting with the live scene and a reference beam interfering with the object beam, e.g., using an interferometer like Mach-Zehnder interferometer or Michelson interferometer. The object beam and the reference beam can be from a coherent light source (e.g., a laser). The optical hologram can be captured by a digital sensor (e.g., CCD or CMOS) that outputs hologram data of the optical hologram (e.g., an array of bits). The digital sensor can have a fast frame rate, e.g., 90 Hz, and a frame grabber can be used to select at least part of the hologram data to transmit to a computing device. The computing device can process the at least part of the hologram data to generate a digital hologram to be displayed by a display of a holographic display system. For example, the digital sensor and the display can have different pitches, and the computing device can convert the hologram data to a correct resolution for the display. The holographic display system can reconstruct the live scene in a 3D space based on the digital hologram. The digital hologram can perform like an amplitude hologram, which can simplify the processing of the hologram data and expedite the processing speed. The display (e.g., a phase-modulated liquid crystal on silicon (LCOS)) can be directly modulated with the digital hologram, without additional device for conversion. In some implementations, the coherent light source can include emit light with different colors (e.g., red, green, blue), for example, in an alternating way or a continuous way. One or more notch filters or a color filter array can be positioned before the digital sensor to generate optical holograms with the different colors, which can be processed to generate corresponding digital holograms with the different colors. The display can be sequentially modulated by the digital holograms with the different colors to reconstruct the live scene in the different colors.

2. Example System with Computational Approach

FIG. 1A illustrates a schematic diagram of an example system 100 for capturing and displaying live scenes using computational approach. The system 100 can be configured to capture a live scene in a form of images/videos from different views/angles, generate a 3D digital representation of the live scene based on the images/videos, compute corresponding digital holograms, and then holographically reconstruct the live scene based on the digital holograms. As the digital holograms can be computed using Maxwell Holography calculation with high speed, the system 100 enables to holographically display the live scene in real time by dynamically capturing the live scene and displaying the digital holograms. As discussed with further details below, a number of techniques can be implemented in the system 100 to achieve 3D reconstruction/display with fast computation speed, high display refresh rate, high image quality, and high performance.

In some implementations, the system 100 includes a hologram generation system 101 and a holographic display system 130. The hologram generation system 101 is configured to generate one or more digital holograms corresponding to a live scene that can include one or more three-dimensional (3D) objects in a physical space. The holographic display system 130 is configured to reconstruct the live scene in a 3D space based on the one or more digital holograms.

In some implementations, e.g., as illustrated in FIG. 1A, the hologram generation system 101 includes a scene acquisition system 102 and a computing system 103. The scene acquisition system 102 can include one or more scene acquisition devices 104 (e.g., cameras, image recorders, or video recorders) configured to capture scene data of the live scene. The scene data can include visual data 105 (e.g., images and/or videos) and/or audio data (e.g., audios or sounds). The one or more scene acquisition devices 104 can be arranged around the live scene and be configured to capture corresponding scene data from different angles or views. In some implementations, the scene acquisition system 102 includes a buffer 106 configured to buffer the scene data from the one or more scene acquisition device s 104 before transmitting the scene data to the computing system 103.

The scene acquisition system 102 can transmit the visual data 105 (e.g., images and/or videos of the live scene) to the computing system 103. The computing system 103 can be configured to obtain primitive data associated with the live scene based on the captured visual data of the live scene and generate a digital hologram corresponding to the live scene based on the primitive data associated with the live scene and display element information of a display 150 (e.g., a phase-only LCOS) of the holographic display system 130, e.g., using Maxwell Holography calculation. Data transmission between the scene acquisition system 102 and the computing system 103 can be through a wired connection, a wireless connection, or any high speed connection. Data transmission between the computing system 103 and the holographic display system 130 can be through a wired connection, a wireless connection, or any high speed connection.

In some implementations, the computing system 103 includes a computing device 110 and a processing device 120. The computing device 110 is configured to prepare data for a list of primitives corresponding to the live scene, and transmit the data to the processing device 120 via an interface 115, e.g., PCIe slot or any other high speed connection. The processing device 120 can be configured to compute electromagnetic (EM) field contributions from each of the list of primitives to each of display elements of the display 150 and output a hologram 127 to the holographic display system 130, e.g., using Maxwell Holography Calculation. Herein, the hologram 127 refers to modulation data for the display 150, which contains complex information, amplitude information or phase information, or some combination thereof, regarding the at least one object. A driving device 131 of the holographic display system 130 can be configured to generate control signals based on the hologram to modulate the display elements of the display 150, which diffracts light 145 from an illuminator 140 of the holographic display system 130 to form a holographic light field 160 corresponding to the live scene in a 3D space. The holographic light field 160 can be a volumetric light field from the display 150 when illuminated, and can be also referred to holographic reconstruction. The holographic reconstruction includes a reconstructed scene corresponding to the live scene.

The processing device 120 can be implemented as, for example, an ASIC, an FPGA, an integrated circuit, one or more computing units, or any combination thereof. In some implementations, the processing device 120 is packaged as a circuit board integrated in the computing device 110 through a PCIe slot in the computing device 110. In some implementations, the processing device 120 is integrated with the driving device 131, e.g., to function as a controller, which can be externally coupled to the computing device 110 and the display 150 and/or the illuminator 140. In some implementations, the processing device 120 and the driving device 131 are integrated with the display 150 (and optionally the illuminator 140), e.g., attached together, to form an integrated device, which can be referred to as a holographic display device or the holographic display system 130.

The computing device 110 can be a computing device associated with a user (e.g., an operator, a developer, a programmer, a customer, or any suitable entity). The computing device 110 can be any appropriate type of device, e.g., a desktop computer, a personal computer, a notebook, a tablet computing device, a personal digital assistant (PDA), a network appliance, a smart mobile phone, a smartwatch, an enhanced general packet radio service (EGPRS) mobile phone, a media player, a navigation device, an email device, a game console, or any appropriate combination of any two or more of these computing devices or other computing devices.

The computing device 110 includes an operating system running a number of applications 111, 112 as graphics engines. In some implementations, the computing device 110 is configured to generate a 3D representation of the live scene based on captured visual data of the live scene, e.g., using a 3D rendering algorithm or application 111, and obtain primitive data of the 3D representation of the live scene based on the 3D representation of the live scene. The 3D representation of the live scene can be stored in a memory 118 of the computing device 110.

In some examples, the 3D rendering algorithm or application 111 includes Neural radiance fields (NeRFs) algorithm. NeRFs is a technique that generates 3D representations (e.g., continuous volumetric scene) of an object or scene from 2D images (e.g., from a spare set of input views) by using advanced machine learning. The NeRFs technique involves encoding an entire object or scene into an artificial neural network, which predicts light intensity or radiance at any point in the 2D image to generate 3D views from different angles. NeRFs can generate highly realistic 3D objects automatically. Used with other techniques, NeRFs can be used for massively compressing 3D representations of the live scene, e.g., from gigabytes to tens of megabytes. In some examples, the NeRF algorithm represents a scene using a fully-connected (non-convolutional) deep network, whose input is a single continuous 5D coordinate (spatial location (x, y, z) and viewing direction ($\theta$, $\varphi$)) and whose output is the volume density and view-dependent emitted radiance at that spatial location. The NeRF algorithm can synthesize views by querying 5D coordinates along camera rays and use volume rendering techniques to project the output colors and densities into an image. Because volume rendering is naturally differentiable, the input to optimize the 3D representation can be a set of images with known camera poses. NeRF has a number of advantages over photogrammetry. It can create more realistic 3D models, and it can do so with fewer images. NeRF is also more efficient, as it can generate new views of the 3D scene in real time.

In some implementations, the scene acquisition system 102 is configured to transmit sequential visual data of the live scene to the computing device 110 in a time period. The sequential visual data can include first visual data and second visual data sequential to the first visual data. The computing device 110 can be configured to: generate a first 3D representation of the live scene based on the first visual data of the live scene using the 3D rendering algorithm, and generate a second 3D representation of the live scene by updating the first 3D representation of the live scene based on a difference between the first visual data and the second visual data using the 3D rendering algorithm, which can increase the rendering speed of the 3D representation of the live scene.

In some implementations, the computing device 110 obtains primitive data of primitives of the 3D representation of the live scene from the 3D rendering algorithm, which can be used for generating digital holograms. The primitive data can include density, color, and/or texture.

In some implementations, the computing device 110 loads the 3D representation of the live scene from the 3D rendering algorithm or application 111 into a 3D simulation application 112, and obtains the primitive data of the 3D representation of the live scene based on an output of the 3D simulation application that is associated with the 3D representation of the live scene. The 3D software application 112 can be, e.g., 3ds Max®, SOLIDWORKS®, Maya®, or Unity. In some implementations, one application 112 or multiple applications 112 (operating in parallel) is configured to render the 3D representation of the live scene to obtain application scene data or graphics abstraction. In some cases, the application scene data is obtained by processing the graphics abstraction. The application scene data can be stored in the memory 118 of the computing device 110. In some implementations, the application scene data is directly provided to the processing device 120 for further processing. In some implementations, the application scene data can be also provided to an application programming interface (API) 114 for further processing.

2.1 Application Programming Interface (API)

An API is a type of software interface. The API can specify the interface between a software application and another software application or computer programs, an operation system, computer hardware, or an external device. In the system 100, the API 114 is configured to be a holographic API that enables a developer or a user to use the computing device 110 to interact with a holographic device, e.g., the processing device 120. The holographic API can convert computer graphics primitives into discrete holographic scene primitives, allowing for rich holographic content generation utilizing general purpose and specially designed holographic computation hardware.

In some implementations, the API 114 specifies an interface between an application 112 and computer hardware (e.g., the memory 118) of the computing device 110, e.g., through a driver 116. The driver 116 can include machine-readable or executable programming instructions or software. The driver 116 is configured to communicate between the API 114 with the memory 118, e.g., to store data (such as tables and commands) from the API 114 in the memory 118, or to retrieve data from the memory 118 to the API 114.

The API 114 can obtain the application scene data from the application 112. In some examples, the application scene data includes data of a plurality of primitives corresponding to one or more objects in the scene. In some examples, the API 114 processes the application scene data to obtain the data of the plurality of primitives. The plurality of primitives can be indexed in a particular order. The primitives can include at least one of a point primitive, a line primitive, or a polygon primitive (e.g., a triangle primitive). The data of the primitives can include primitive data of each primitive of the number of primitives. A primitive includes at least one vertex, and primitive data of the primitive can include vertex data of the at least one vertex. For example, a triangle primitive includes three vertices that are connected with each other.

In some examples, primitive data of a primitive includes at least one of: coordinate information of the primitive in a 3D coordinate system, color information of the primitive (e.g., a textured color, a gradient color or both), texture coordinate information of the primitive, viewpoint-dependent shading information (e.g., geometric specular reflection information) associated with the primitive, shading information associated with the primitive, or occlusion information associated with the primitive. The primitive data can also include a primitive identifier of the primitive among the number of primitives, and/or at least one vertex identifier of the at least one vertex.

In some examples, vertex data of a vertex includes at least one of: coordinate information of the vertex in the 3D coordinate system, color information associated with the vertex (e.g., a textured color, a gradient color or both), texture coordinate information associated with the vertex, viewpoint-dependent shading information (e.g., geometric specular reflection information) associated with the vertex, shading information associated with the vertex, or occlusion information associated with the vertex. The vertex data can also include a vertex identifier of the vertex.

In some implementations, the API 114 can adjust vertex data of vertices of multiple primitives associated with an object or a holographic scene, e.g., in response to receiving a user input, a trigger signal or command, or a predetermined command. Based on a result of the adjusting, the API 114 can update the vertex data of the vertices in the memory 118 for further processing. For example, gaps between adjacent primitives can be adjusted to avoid kissing or overlapping, or to create an overlapping effect by adjusting coordinate information of the vertices.

The API 114 can be configured to process primitive data of the plurality of primitives and/or vertex data of a plurality of vertices (or vertexes) of the plurality of primitives to obtain data that can be processable by the processing device 120, including, but not limited to, generating a table showing information of vertices for each primitive, organizing vertices for parallel processing, and/or generating commands for the processing device 120 to draw primitives.

In some implementations, the API 114 is configured to: for each of a plurality of vertices of the number of primitives, associate a respective vertex identifier of the vertex with respective vertex data of the vertex, and store the association between the respective vertex identifier and the respective vertex data of the vertex, for example, together with the respective vertex data, in the memory 118. The API 114 can determine the respective vertex identifiers of the plurality of vertices based on an order of the plurality of vertices in a vertex stream corresponding to the plurality of primitives.

The API 114 can store the associations for the vertices in a table in the memory 118. The table can include information associated with the vertices, including, but not limited to, vertex identifier (No.), 3D coordinates (x, y, z), color information, texture mapping information, occlusion information, shading information, and/or viewpoint dependent shading information.

In some implementations, the API 114 is configured to: for each of the plurality of primitives, associate a respective primitive identifier of the primitive with one or more respective vertex identifiers of one or more vertices of the primitive (and optionally respective primitive data of the primitive) in the memory 118, and store an association between the respective primitive identifier and the one or more respective vertex identifiers for the primitive (and optionally respective primitive data of the primitive) in the memory 118. The API 114 can determine the respective primitive identifiers of the plurality of primitives based on an order of the plurality of primitives in a primitive stream corresponding to the scene.

The API 114 can store the associations for the vertices in a table in the memory 118. The table can include information associated with the primitives, including, but not limited to, primitive identifier (No.), vertex identifiers of vertices of the primitives, color information (PC), texture mapping information (PT), occlusion information (PO), shading information (PS), and/or viewpoint dependent shading information (PVDS).

In some implementations, the API 114 generates a command to be sent to the processing device 120. The command can be generated based on an instruction, e.g., from the application 112 or a processor of the computing device 110. The instruction can indicate reconstructing a holographic scene including one or more objects. For example, the command can include a command instruction for drawing a series of primitives associated with the one or more objects.

In some cases, the API 114 can determine primitive identifiers of the series of primitives associated with the command instruction and transmit the command including the command instruction and the primitive identifiers to the processing device 120 for further processing. In some cases, the API 114 can determine vertex identifiers associated with the primitive identifiers, and transmit the command including the command instruction with the vertex identifiers (and optionally the primitive identifiers) to the processing device 120 for further processing. The command can instruct the processing device 120 to draw the series of primitives based on the primitive identifiers, the vertex identifiers, or a combination thereof. In some examples, the API 114 generates an index table showing the associations between each primitive identifier and its associated vertex identifiers. The API 114 can also generate a vertex table listing the vertex identifiers associated with the command, optionally with vertex data associated with the vertex identifiers. The index table and the vertex table for the command can be stored in the memory 118. In some cases, the index table and the vertex table is stored in a buffer (or cache) 119 of the memory 118. The buffer 119 can be a ring buffer.

In some examples, the API 114 transmits a command list to the processing device 120. The command list can include a number of DRAW commands. Each DRAW command specifies a command instruction (e.g., DRAW type and count) and associated vertices(e.g., vertex_ptr) and indexes (e.g., index_ptr). The vertex_ptr can be vertex identifiers associated with the Draw command, and the index_ptr can be the association between each primitive and vertex identifiers. In such a way, a size of the DRAW command can be very small, and the DRAW command can be transmitted to the processing device 120 for processing with a high speed. The DRAW command can be cached in the buffer 119 of the memory 118 and then be transmitted to the processing device 120 through the interface 115. Compared to transmitting primitive data or vertex data of a number of primitives corresponding to a holographic scene (or one or more objects) from the API 114 to the processing device 120, transmitting the DRAW command (or the command list) can be much efficient and faster. Moreover, the vertex_ptr and index_ptr include information of the number of primitives in the same DRAW command, which enables the processing device 120 to perform parallel processing to increase a computation speed.

2.2 Processing Device

The processing device 120 is in communication with the computing device 110 and configured to generate a hologram corresponding to a holographic scene to be reconstructed based on data transmitted from the computing device 110. The holographic scene includes one or more objects(e.g., 2D or 3D) in a 3D coordinate system. The data can include information of primitives corresponding to the one or more objects. The hologram corresponds to electromagnetic (EM) contributions from the primitives to display elements(or phasels) of the display 150. The processing device 120 can be referred to be a phasel processing unit (PPU). The processing device 120 is configured to compute the EM contributions with high speed, e.g., by parallel processing, simplified expressions, and/or any other techniques described with further details below.

The processing device 120 can include at least one of: an application-specific integrated circuit (ASIC), a field-programmable gate array (FPGA), a programmable gate array (PGA), a central processing unit (CPU), a graphics processing unit (GPU), a phasel processing unit (PPU), or standard computing units. In some implementations, the processing device 120 communicates with the computing device 110 through peripheral component interconnect express(PCIe). The interface 115 can be a PCIe slot of the computing device 110. The processing device 120 can be an integrated chip insertable in the PCIe slot of the computing device 110. In some implementations, the processing device 120 is configured to be integrated with the driving device 131, optionally with the display 150 and/or the illuminator 140 in a package, external to the computing device 110. The processing device 120 can communicate with the computing device 110 via a wired or wireless connection, e.g., USB-C connection or any other high speed serial connection. In some implementations, the API 114 (and optionally the driver 116) can be implemented in the processing device 120.

In some implementations, the processing device 120 includes a command processor 122, a local memory 123, a plurality of computing units 124, and at least one accumulator 126 that can be coupled in series. The plurality of computing units 124 can be coupled in parallel, e.g., for parallel processing. In some implementations, a group of computing units 124 is coupled in series, and multiple groups are coupled in parallel with each other. In some implementations, the processing device 120 includes multiple accumulators 126 that can be coupled in parallel, and each accumulator 126 is coupled to a respective group of computing units 124.

The command processor 122 is in communication with the computing device 110 (e.g., the buffer 119 in the memory 118) and configured to receive a command from the computing device 110. The command can include information of a plurality of primitives corresponding to at least one object. The information can include primitive identifiers of the plurality of primitives, vertex identifiers associated with the primitive identifiers, and an index table showing associations between the primitive identifiers and the vertex identifiers. The command can include an instruction for drawing the plurality of primitives based on the information. As noted above, the command can include no primitive data of the plurality of primitives and no vertex data of vertices of the plurality of primitives.

The command processor 122 is configured to: process the command to identify the primitive identifiers or vertex identifiers and obtain primitive data of the plurality of primitives from the computing device 110 based on the primitive identifiers or vertex identifiers. For example, the command processor 122 retrieves the primitive data from the memory 118 based on the primitive identifiers in the command. In some implementations, the command processor 122 retrieves the vertex data of the vertices based on the vertex identifiers in the command.

In some implementations, an object is represented by a large number of primitives. Drawing the object can be executed by a series of commands, where each command is associated with a respective small group of primitives. In such a way, a size of each command can become smaller. The transmission speed for transmitting the command, the retrieved primitive data, and/or the retrieved vertex data from the computing device 110 to the command processor 122 can be faster. The processing speed of the processing device 120 can be also faster.

In some implementations, as noted above, the API 114 in the host device 110 can decode the object to obtain vertex information of vertices associated with the object and/or primitive information of primitives associated with the object that can be stored in the memory 118 (e.g., in the buffer 119). Before sending commands to the processing device 120, the API 114 can first transmit the vertex information of the vertices and/or the primitive information of the primitives(e.g., stored in the buffer 119) to the processing device 120. The vertex information of the vertices and/or the primitive information of the primitives can be stored in the local memory 123. After the API 114 sends a command to the command processor 122 in the processing device 120, the command processor 122 can retrieve corresponding index information (e.g., the index table 422 of FIG. 4B) from the memory 118 in the host device 110 and corresponding vertex information (e.g., in the table 400 of FIG. 4A or the vertex table 424 of FIG. 4B) from the local memory 123 in the processing device 120, and execute the command based on the retrieved corresponding index information and the retrieved corresponding vertex information. In such a way, the API 114 only needs to transmit the index information from the host device 110 to the processing device 120, without transmitting the vertex information, which can reduce data over the interface 115 and increase a transmission speed.

Different from a conventional 3D graphics system, which takes a 3D scene and renders it on to a 2D display device, the system 100 is configured to produce a 3D output such as a holographic reconstruction in a form of a light field, e.g., a 3D volume of light. In a hologram, each display element can contribute to every part of the holographic reconstruction of the scene. Hence, each display element may potentially be modulated for every part of the scene, e.g., each primitive in the list of primitives generated by the application 112, for complete holographic reproduction of the scene. In some implementations, modulation of certain elements can be omitted or simplified based on, for example, an acceptable level of accuracy in the reproduced scene or in some region of the scene, or occlusion.

In some implementations, the processing device 120 is configured to compute an EM field contribution, e.g., phase, amplitude, or both, from each primitive to each display element, and generate, for each display element, a sum of the EM field contributions from the list of primitives to the display element. This can be done either by running through every primitive and accruing its contribution to a given display element, or by running through each display element for each primitive, or by a hybrid blend of these two techniques.

The processing device 120 can compute the EM field contribution from each primitive to each display element based on a predetermined expression for the primitive. Different primitives can have corresponding expressions. In some cases, the predetermined expression is an analytic expression. In some cases, the predetermined expression is determined by solving Maxwell's Equations with a boundary condition defined at the display 150. The boundary condition can include a Dirichlet boundary condition or a Cauchy boundary condition. Then, the display element can be modulated based on the sum of the EM field contributions, e.g., by modulating at least one of a refractive index, an amplitude index, a birefringence, or a retardance of the display element.

If values of an EM field, e.g., a solution to the Maxwell Equations, at each point on a surface that bounds the field are known, an exact, unique configuration of the EM field inside a volume bounded by a boundary surface can be determined. The list of primitives(or a holographic reconstruction of a corresponding hologram) and the display 150 define a 3D space, and a surface of the display 150 forms a portion of a boundary surface of the 3D space. By setting EM field states(e.g., phase or amplitude or phase and amplitude states) on the surface of the display 150, for example, by illuminating light on the display surface, the boundary condition of the EM field can be determined. Due to time symmetry of the Maxwell Equations, as the display elements are modulated based on the EM field contributions from the primitives corresponding to the hologram, a volumetric light field corresponding to the hologram can be obtained as the holographic reconstruction.

For example, a line primitive of illumination at a specific color can be set in front of the display 150. An analytic expression for a linear aperture can be written as a function in space. Then the EM field contribution from the line primitive on a boundary surface including the display 150 can be determined. If EM field values corresponding to the computed EM field contribution are set in the display 150, due to time-symmetry of the Maxwell Equations, the same linear aperture used in the computation can appear at a corresponding location, e.g., a coordinate position of the linear primitive in the 3D coordinate system and with the specific color.

In some examples, suppose that there is a line of light between two points A and B in the 3D space. The light is evenly lit and has an intensity I per line distance l. At each infinitesimal dl along the line from A to B, an amount of light proportional to I*dl is emitted. The infinitesimal dl acts as a delta (point) source, and the EM field contribution from the infinitesimal dl to any point on a boundary surface around a scene corresponding to a list of primitives can be determined. Thus, for any display element of the display 150, an analytic equation that represents the EM field contribution at the display element from the infinitesimal segment of the line can be determined. A special kind of summation/integral that marches along the line and accrues the EM field contribution of the entire line to the EM field at the display element of the display can be determined as an expression. Values corresponding to the expression can be set at the display element, e.g., by modulating the display element and illuminating the display element. Then, through time reversal and a correction constant, the line can be created in the same location defined by points A and B in the 3D space.

Referring to FIG. 1A, after the command processor 122 obtains the primitive data or vertex data of the plurality of primitives, the command processor 122 transmits the primitive data or vertex data to the plurality of computing units 124 for further processing. The computing units 124 are configured to, for each primitive of the plurality of primitives, determine an EM field contribution of the primitive to each of a plurality of display elements of the display 150 in a 3D coordinate system based on the primitive data or vertex data of the plurality of primitives. The plurality of computing units 124 can be operated in parallel. The accumulator 126 is configured to accumulate EM field contributions of the plurality of primitives to each of the plurality of display elements from the plurality of computing units 124 and generate a respective sum of EM field contributions of the plurality of primitives to each of the plurality of display elements. The accumulator 126 can generate a hologram comprising a respective sum of the EM field contributions of the plurality of primitives for each of the plurality of display elements.

The 3D coordinate system can be, e.g., Cartesian coordinate system XYZ, polar coordinate system, cylindrical coordinate system, or spherical coordinate system. The plurality of display elements in the display 150 can also have corresponding coordinate information in the 3D coordinate system. The primitives at coordinate locations can represent a 3D object adjacent to the plurality of display elements, e.g., in front of the display elements, behind the display elements, or straddling the display elements.

In some implementations, a computing unit 124 is configured to determine at least one distance between a display element of the display 150 and a primitive based on coordinate information of the display element and coordinate information of the primitive, and determine the EM field contribution of the primitive to the display element based on a predetermined expression for the primitive and the at least one distance. The predetermined expression can be determined based on at least one of: analytically calculating an EM field propagation from the primitive to the display element, a solution of Maxwell's equations with a boundary condition defined by the display, or at least one function from a group of functions comprising a sine function, a cosine function, and an exponential function, where determining the EM field contribution includes identifying a value of the at least one function in a table stored in a memory.

In some implementations, adjacent first and second primitives have at least one shared vertex. A computing unit 124 can determine a first EM field contribution of the first primitive to a display element of the display 150 based on primitive data of the first primitive and determining a second EM field contribution of the second primitive to the display element of the display based on the first EM field contribution and primitive data of the second primitive, e.g., by a distance between coordinates of the first primitive and the second primitive.

In some implementations, a computing unit 124 (or a phase1 processing unit) is configured to determine a first EM contribution of a primitive to a first display element of the display 150 and determine a second EM contribution of the primitive to a second display element of the display based on the first EM contribution, the second display element being adjacent to the first display element.

The computing units 124 can determine the EM field contributions from the plurality of primitives to the display elements of the display 150 in parallel. In some implementations, the computing units 124 are configured to determine a first EM field contribution of a first primitive to a first display element in parallel with determining a second EM field contribution of a second primitive to the first display element. In some implementations, the computing units 124 are configured to determine a first EM field contribution of a first primitive to a first display element in parallel with determining a second EM field contribution of a second primitive to a second display element. In some implementations, the computing units 124 are configured to determine a first EM field contribution of a first primitive to a first display element in parallel with determining a second EM field contribution from the first primitive to a second display element.

In some implementations, the computing units 124 are configured to determine first respective EM field contributions from a first primitive of the plurality of primitives to each display element of the plurality of display elements, and, in parallel, determine second respective EM field contributions from a second primitive of the plurality of primitives to each display element of the plurality of display elements. The accumulator 126 can be configured to accumulate the EM field contributions for each display element of the plurality of display elements by adding the first and second respective EM field contributions corresponding to the display element.

In some implementations, the processing device 120 is configured to obtain sums of EM field contributions for the plurality of display elements of the display 150 by pipeline processing of determining the EM field contributions of each of the plurality of primitives to each of the plurality of display elements and generating the sum of the EM field contribution from the plurality of primitives to each of the plurality of display elements.

The processing device 120 can perform pipeline calculation using the computing units 124. As noted above, the processing device 120 obtains the sum of the EM field contribution from the plurality of primitives to each display element through a series of steps. For example, calculating a predetermined expression can be divided into multiple steps. Each row can represent a respective series of steps for a corresponding display element. Steps for multiple display elements can be executed in parallel. After a first step for a first display element is completed, a second step for the first display element is executed, meanwhile, a first step for a second display element is executed (e.g., based on a result of the first step for the first display element). Then, after the second step for the first display element is completed and the first step for the second display element is also completed, a third step for the first display element is executed, a second step for the second display element can be also executed (e.g., based on a result of the second step for the first display element and a result of the first step for the second display element). Meanwhile, a first step for the third display element can be executed (e.g., based on the result of the first step for the second display element and/or the result of the first step of the first display element). In such a way, except a latency period at the beginning of the computation, the processing device 120 enables to execute the steps for the plurality of display elements in parallel according to the pipeline calculation. In some implementations, to improve computation speed and/or accuracy, the processing device 120 calculates one or more mathematical functions using fixed point number representations, updated floating point number presentations, or a combination thereof.

In some implementations, the processing device 120 calculates respective EM field contributions of each primitive of the plurality of primitives to each display element of the plurality of display elements. The calculation of the respective EM field contributions can be without at least one of: expanding a geometry of the object into the plurality of display elements; applying visibility tests before packing wavefronts; or decision making or communication between parallel calculations for different primitives of the plurality of primitives. The calculation of the respective EM field contributions can be configured to cause at least one of: tuning parallel calculations for multiple primitives to speed, cost, size or energy optimization; reducing latency between initiating a draw and a result being ready for display; increasing an accuracy using fixed point number representations; skipping unpacking and repacking of float point number representations between mathematical operations; or optimizing computation speed by optimizing mathematical functions.

After obtaining primitive data or vertex data associated with a plurality of primitives, the processing device 120 can be configured to adjust the primitive data or the vertex data of at least one of the plurality of primitives according to a corresponding setting, and compute EM field contributions associated with the at least one of the plurality of primitives based on the adjusted primitive data or vertex data.

In some examples, the processing device 120 adjusts primitive data or vertex data of at least one of adjacent primitives to generate a gap between the adjacent primitives, such that there is no shared vertex between the adjacent primitives. The gap can be identical to or greater than a predetermined diffraction limit of the display. The processing device 120 can determine the EM field contribution of the at least one of the adjacent primitives based on the adjusted vertex data associated with the at least one of the adjacent primitives.

After obtaining sums of EM field contributions for the plurality of elements of the display 150, the processing device 120 (e.g., the accumulator 126) can generate a hologram based on the sums of the EM field contributions. In some examples, the hologram is a complex-valued hologram. The processing device 120 can further convert the complex-valued hologram to an amplitude-only hologram or a phase-only hologram. The processing device 120 can also transmit the complex-valued hologram to the driving device 131 that can convert the complex-valued hologram to a phase-only hologram or an amplitude-only hologram.

In some examples, the hologram is a phase hologram or an amplitude hologram. The processing device 120 can also transmit the phase hologram or the amplitude hologram to the driving device 131. The driving device 131 can then generate corresponding control signals for modulating the plurality of display elements based on the hologram.

For display zero order suppression, display zero order light can be deviated from a reconstruction cone of a holographic scene formed by diffracted first order light from the display. To achieve this, in some implementations, the processing device 120 can change the hologram for the plurality of display elements. In some implementations, instead of the processing device 120, the driving device 131 can change the hologram for the plurality of display elements after receiving the hologram from the processing device 120.

The hologram can be changed, e.g., by the processing device 120 or the driving device 131, by adjusting a respective phase for each of the plurality of display elements. The respective phase can be adjusted, e.g., by adding a corresponding phase to the respective phase for each of the plurality of display elements.

In some examples, the corresponding phase for each of the plurality of display elements can be expressed as:

$$\emptyset = 2\pi(x \cos \theta + y \sin \theta)/\lambda,$$

where $\emptyset$ represents the corresponding phase for the display element, $\lambda$ represents a wavelength of light to be incident on the display element with an incident angle, $\theta$ represents an angle corresponding to a redirecting angle of an optically redirecting device (e.g., the zero order redirecting grating structure 508-3 of FIG. 5A) configured to redirect light from the display 150, and x and y represent coordinates of the display element in a global 3D coordinate system where the EM field contribution of each of the plurality of display elements to the display element is determined. Adding these corresponding phases to the hologram can have a same or similar effect of preconfiguring the hologram using a software application (e.g., Unity), where a construction cone including one or more corresponding virtual objects is rotated with a corresponding angle.

In some examples, the corresponding phase for each of the plurality of display elements is expressed as:

$$\emptyset = \frac{\pi}{\lambda f (ax^2 + by^2)},$$

where $\emptyset$ represents the corresponding phase for the display element, a and b represent constants, $\lambda$ represents a wavelength of light to be incident on the display, f represents a focal length of an optically diverging component configured to diverge light from the display, x and y represent coordinates of the display element in a coordinate system where the EM field contribution of each of the plurality of display elements to the display element is determined. Adding these corresponding phases to the hologram can have a same or similar effect of preconfiguring the hologram using a software application (e.g., Unity), where a construction cone including one or more corresponding virtual objects is moved close or away from the display 150, such that the display zero order light is diverged by the optically diverging component (e.g., an optical lens) downstream the display 150.

In some implementations, instead of adjusting the hologram, the processing device 120 can adjust the primitive data or vertex data associated with the plurality of primitives. The adjusted primitive data of the plurality of primitives corresponds to a virtual object moved with respect to the display in a global 3D coordinate system. The processing device 120 can then determine EM field contribution of a primitive to each of the plurality of display elements of the display based on the adjusted primitive data of the primitive in the 3D coordinate system.

In some examples, the adjusted primitive data of the plurality of primitives corresponds to the virtual object rotated with an angle with respect to the display in the global 3D coordinate system, and the angle corresponds to a redirecting angle of an optically redirecting device (e.g., the zero order redirecting grating structure 508-3 of FIG. 5A) configured to redirect light from the display, such that modulated light by the plurality of display elements forms a holographic scene, while display zero order light from the display is redirected away from the holographic scene.

In some examples, the adjusted primitive data of the plurality of primitives corresponds to the virtual object moved, with respect to the display, in the global 3D coordinate system, along a direction perpendicular to the display with a distance. The distance corresponds to a focal length of an optically diverging component (e.g., an optical lens) configured to diverge light from the display, such that modulated light by the plurality of display elements forms a holographic scene without divergence, while display zero order light from the display is diverged and suppressed in the holographic scene.

In some implementations, primitive data of a primitive includes texture coordinate information of the primitive. In some cases, the primitive data obtained from the API 114 can include values associated with discrete cosine transform (DCT) amplitudes for pixels of an image to be mapped on a specified surface of one or more primitives of the plurality of primitives, where the DCT amplitudes for the pixels of the image are associated with DCT weights of the pixels of the image. In some cases, after obtaining the primitive data, the processing device 120 can adjust the primitive data to include the values associated with the DCT amplitudes for the pixels of the image. For each primitive of the plurality of primitives, the processing device 120 can calculate the EM field contribution from each of the one or more primitives to each of the plurality of display elements with the values associated with the DCT amplitudes for the pixels of the image.

In some implementations, primitive data of a primitive includes occlusion information of the primitive. In some examples, the processing device 120 can determine one or more particular display elements that make no contribution to a reconstruction of a given primitive based on occlusion information of the given primitive. For each of the one or more particular display elements, the processing device 120 can generate a respective sum of EM field contributions of the plurality of primitives to the particular display element by excluding an EM field contribution of the given primitive to the particular display element. In some examples, the processing device 120 can be configured to: for each display element of the plurality of display elements, determine a respective part of a given primitive that make no EM field contribution to the display element based on occlusion information of the given primitive, and generate a sum of EM field contributions from the plurality of primitives to the display element by excluding an EM field contribution from the respective part of the given primitive to the display element.

In some implementations, primitive data of a primitive includes viewpoint dependent shading information for the primitive. The processing device 120 can be configured to: determine a respective EM field contribution of each primitive of the plurality of primitives to each display element of the plurality of display elements by taking into consideration of the viewpoint dependent shading information for the primitive.

Figure 6A:
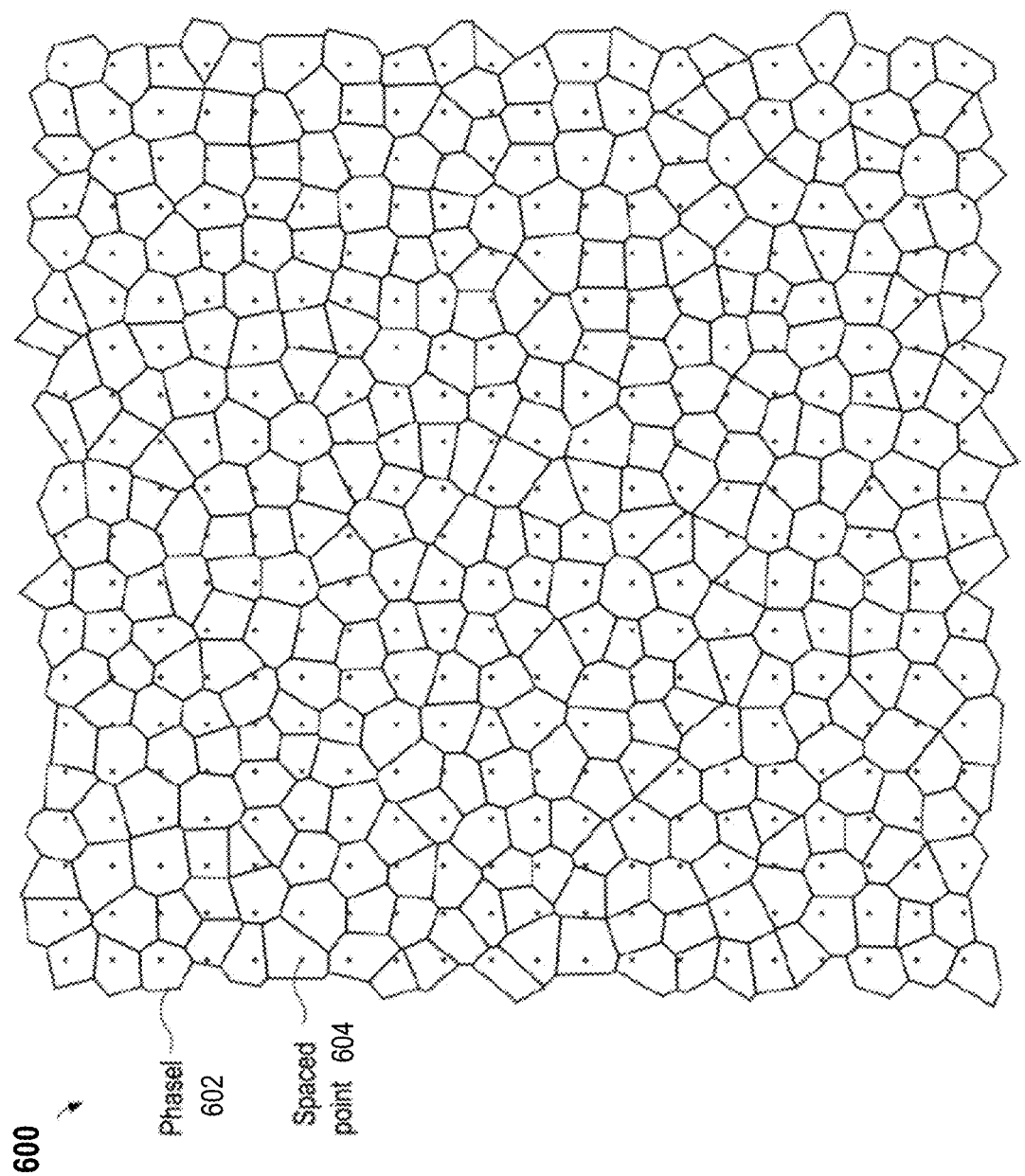
FIG. 6A illustrates an example of an irregular display.

In some implementations, the display 150 is a regular display where the plurality of display elements have a same shape and are spaced evenly in a display area. In some implementations, the display 150 is an irregular display where the plurality of display elements form an irregular pattern, e.g., having different shapes or sizes and/or being irregularly positioned, for example, as illustrated in FIG. 6A below.

For either a regular display or an irregular display, the processing device 120 can be configured to: obtain information of the display 150 that includes coordinate information of a plurality of points corresponding to the plurality of display elements. For each primitive of the plurality of primitives, the processing device 120 determines the electromagnetic (EM) field contribution to each of the plurality of display elements of the display based on the primitive data of the display by: calculating, in a three-dimensional (3D) coordinate system, EM propagation from the primitive to the display based on coordinate information of the primitive and coordinate information of a point corresponding to the display element.

In some implementations, for the irregular display, each of the plurality of display elements has a respective shape of a plurality of shapes in an area of the display, each of the plurality of shapes uniquely enclosing a respective point of the plurality of points, adjacent shapes of the plurality of shapes being different from each other. The coordinate information of the plurality of points includes coordinate information of a plurality of spaced points in the area of the display and offset data including a respective offset between each point of the plurality of points and a corresponding space point of the plurality of space points.

2.3 Driving Device

The driving device 131 is coupled to the processing device 120 and is configured to receive a hologram from the processing device 120 (e.g., from the accumulator 126). The hologram is for modulating the display 150, and can include: for each display element of the plurality of display elements, a respective sum of electromagnetic (EM) field contributions of a plurality of primitives corresponding to at least one object to the display element. The driving device 131 can be configured to: generate, for each display element of the plurality of display elements, a respective modulation control signal (e.g., a voltage signal) based on the respective sum of EM field contributions of the plurality of primitives to the display element, and output the respective modulation control signal to each display element of the plurality of display elements for modulating the display element.

In some implementations, e.g., as illustrated in FIG. 1A, the driving device 131 includes a driving memory 132 coupled to the processing device 120, an illuminator driver 134 coupled to the driving memory 132 and the illuminator 140, and a display driver 136 coupled to the driving memory 132 and the display 150. The driving memory 132 can include a first memory buffer coupled to the display driver 136 and a second memory buffer coupled to the illuminator driver 134. The second memory buffer can be configured to store information for controlling amplitude and/or brightness of light emitting elements in the illuminator 140. The second memory buffer can have a smaller size than the first memory buffer.

The driving memory 132 is configured to receive and store the hologram from the processing device 120. In some cases, the hologram is a phase-only hologram. In some cases, the hologram is a complex-valued hologram. The driving device 131 can convert the complex-valued hologram to a phase-only hologram, and generate the respective modulation control signals for the plurality of display elements based on the phase-only hologram. The driving device 131 can also store the phase-only hologram in the driving memory 132, together with the complex-valued hologram. The phase-only hologram for the display 150 can include a respective phase for each of the plurality of display elements of the display 150. The respective phase corresponds to a sum of electromagnetic (EM) field contributions of the plurality of primitives corresponding to at least one object to the display element.

In some implementations, the display driver 136 includes a phase converter 137 and a scanning out unit 138. The phase converter 137 is configured to convert a respective phase for each of the plurality of display elements into a corresponding modulation control signal (e.g., a voltage signal), and the scanning out unit 138 is configured to transmit the corresponding modulation control signal to the display element. The phase converter 137 can sequentially and continuously convert the respective phases for the plurality of display elements, and the scanning out unit 138 can sequentially and continuously transmit the corresponding modulation control signals to the plurality of display elements once each of the corresponding modulation control signals is generated by the phase converter 137.

In some implementations, the phase converter 137 is included in the processing device 120 and coupled to the accumulator 126. The phase converter 137 can convert a complex hologram from the accumulator 126 into a phase hologram. The phase hologram can be transmitted from the processing device 120 to the driving device 130, and can be stored in the driving memory 132 of the driving device 130.

In some implementations, the phase converter 137 and the driving memory 132 are both in the processing device 120, where the driving memory 132 is included in the local memory 123 and the phase converter 137 is coupled to the accumulator 126 and coupled to the local memory 123. In such a way, the processing device 120 can directly output a phase hologram to the driving device 130. The driving device 130 can include the illuminator driver 134 and the display driver 136 including only the scanning out unit 139, which can greatly simply the driving device 130 and can be integrated with the display 150.

The display driver 136 and the display 150 can be connected using an interface, e.g., low voltage differential signal (LVDS) interface. The display driver 136 can be configured to drive a digital signal to the display 150 using the interface. For example, the digital signal can be a 9-bit digital value which can be turned into 512 different voltage signals for modulating display elements of the display 150.

Besides display elements, the display 150 can include digital circuits and analog circuits. The digital circuits can be configured to receive a digital data for modulating the elements, and optionally perform data processing on the digital phase signals(e.g., to reduce noise in the phases for the display elements). The analog circuits can include digital to analog converters (DACs), drivers, and row scanners. The DACs are configured to convert the digital data for the display elements into analog voltage signals. The drivers are coupled to the digital circuits and configured to drive the analog voltage signals to corresponding display elements. The row scanners can be configured to sequentially select a row of display elements for modulating the row of display elements using corresponding voltage signals driven from the drivers.

The illuminator driver 134 can be configured to: transmit an illumination control signal (e.g., for amplitude and/or brightness control) to the illuminator 140 to activate the illuminator 140 to illuminate light on the display 150 such that light is caused by the modulated display elements of the display 150 to form a volumetric light field corresponding to the at least one object, e.g., the holographic light field 160. The resulting volumetric light field corresponds to a solution of Maxwell's equations with a boundary condition defined by the modulated elements of the display 150. The display driver 136 and the illuminator driver 134 can be configured to communicate with each other, such that outputting the respective modulation control signal to each display element of the plurality of display elements by the display driver 136 is in coordination with transmitting the illumination control signal to the illuminator 140 by the illuminator driver 134.

In some implementations, the illuminator 140 includes two or more light emitting elements each configured to emit light with a different color (e.g., red, blue, or green), and the illuminator driver 134 can sequentially transmit a respective illumination control signal to sequentially activate each of the two or more light emitting elements of the illuminator.

In some implementations, the display driver 136 sequentially outputs: i) a first modulation control signal to modulate the display 150 with information associated with a first color during a first time period, and ii) a second modulation control signal to modulate the display 150 with information associated with a second color during a second, sequential time period. The illuminator driver 134 can sequentially output a first illumination control signal to activate the illuminator 140 to turn on a first light emitting element to emit light with a first color during the first time period, and a second illumination control signal to activate the illuminator 140 to turn on a second light emitting element to emit light with the second color during the second time period.

2.4 Display

The display 150 includes a number of display elements. In some implementations, the display 150 includes a spatial light modulator (SLM). The SLM can be a phase SLM, an amplitude SLM, or a phase and amplitude SLM. In some examples, the display 150 is a digital micro-mirror device (DMD), a liquid crystal on silicon (LCOS) device, Optically addressed spatial light modulators(OASLMs), or any other type of light modulator that is capable of performing holography.

Figure 6B:
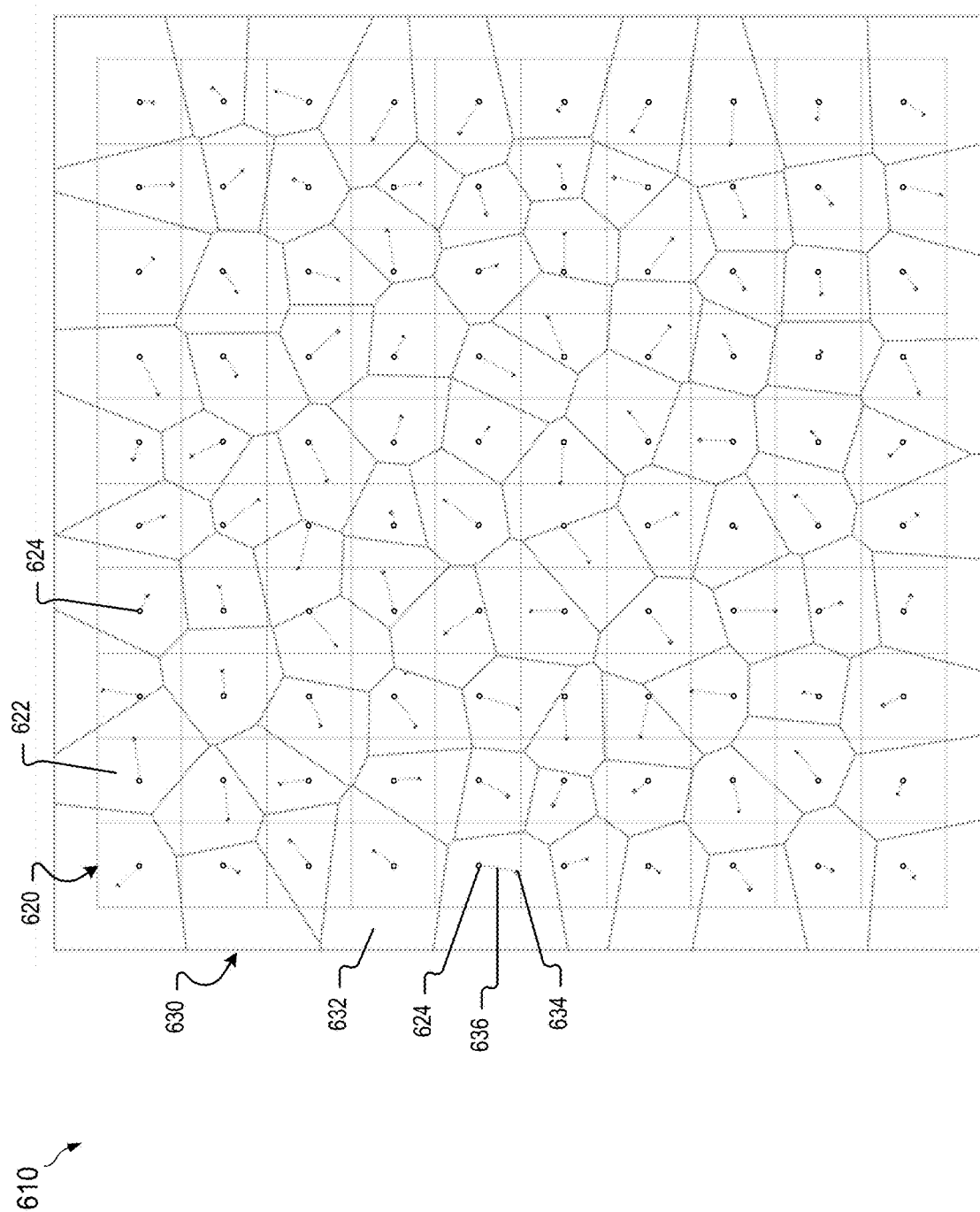
FIG. 6B illustrates an example of designing an irregular display.

In some implementations, the display 150 is a regular display where the plurality of display elements have a same shape and are spaced evenly in a display area (e.g., as illustrated in FIG. 6A below). In some implementations, the display 150 is an irregular display where the plurality of display elements form an irregular pattern, e.g., having different shapes or sizes and/or being irregular positioned, for example, as illustrated in FIG. 6A or FIG. 6B below.

The display elements of the display 150 can be modulated by the modulated control signals from the display driver 136. Each modulated control signal is for modulating a respective display element based on a sum of EM field contributions from a plurality of primitives corresponding to a scene (e.g., including one or more objects) for the respective display element.

In some implementations, a number of light emitting elements in the illuminator 140 can be smaller than a number of the display elements of the display 150, as long as light from the light emitting elements can illuminate over substantially a total surface of the display 150. For example, an illuminator having 64×64 OLEDs(organic light emitting diodes) can be used for a display having 1024×1024 elements. The driving device 131 (e.g., the illuminator driver 134) can be configured to simultaneously activate the number of lighting elements of the illuminator 140.

The illuminator 140 can include one or more coherent light sources(e.g., lasers), one or more semi-coherent light sources(e.g., LEDs(light emitting diodes) or superluminescent diodes (SLEDs)), one or more incoherent light sources, or a combination of such sources. In some implementations, the illuminator 140 is a monochromatic light source configured to emit a substantially monochromatic light, e.g., a red light, a green light, a yellow light, or a blue light. In some implementations, the illuminator 140 includes two or more light emitting elements, e.g., lasers or light emitting diodes (LEDs), each configured to emit light with a different color. For example, the illuminator 140 can include red, green, and blue lighting elements.

To display a full-color 3D object, three or more separate holograms for colors including at least red, green, and blue, can be computed, e.g., by the processing device 120. That is, at least three EM field contributions from corresponding primitives to the display elements can be obtained. The display elements can be modulated sequentially based on the at least three EM field contributions and the illuminator 140 can be controlled to sequentially turn on the at least red, green and blue lighting elements sequentially. For example, the driving device 131 can first transmit a first timing signal to turn on a blue lighting element and transmit first modulation control signals corresponding to a blue hologram to display elements of the display 150. After the blue hologram on the display 150 is illuminated with the blue light for a first period of time, the driving device 131 can transmit a second timing signal to turn on a green lighting element and transmit second control signals corresponding to a green hologram to display elements of the display 150. After the green hologram on the display 150 is illuminated with the green light for a second period of time, the driving device 131 can transmit a third timing signal to turn on a red lighting element and transmit third control signals corresponding to a red hologram to display elements of the display 150. After the red hologram on the display 150 is illuminated with the red light for a third period of time, the driving device 131 can repeat the above steps. Depending on temporal coherence-of vision effect in an eye of a viewer, the three colors can be combined in the eye to give an appearance of full color. In some cases, the illuminator 140 is switched off during a state change of the display image (or holographic reconstruction) and switched on when a valid image (or holographic reconstruction) is presented for a period of time. This can also depend on the temporal coherence of vision to make the image (or holographic reconstruction) appear stable.

In some implementations, the display 150 has a resolution small enough to diffract visible light, e.g., on an order of 0.5 µm or less. The illuminator 140 can include a single, white light source and the emitted white light can be diffracted by the display 150 into different colors for holographic reconstructions.

As discussed in further detail below with respect to FIG. 5A-5D, there can be different configurations for the system 100. The display 150 can be reflective or transmissive. The display 150 can have various sizes, ranging from a small scale (e.g., 1-10 cm on a side) to a large scale (e.g., 100-1000 cm on a side). Illumination from the illuminator 140 can be from the front of the display 150 (e.g., for a reflective or transflective display) or from the rear of the display 150 (e.g., for a transmissive display). The illuminator 140 can provide uniform illumination across the display 150. In some implementations, an optical waveguide can be used to evenly illuminate a surface of the display 150.

In some implementations, the illuminator driver 134 and the illuminator 140 are integrated together as an illumination device, and the display driver 136 and the display 150 are integrated together as a display device. The driving memory 132 can be separated from the illuminator device and the display device, or the driving memory 132 can be integrated with one of the illuminator device and the display device. The illuminator device and the display device can communicate with each other.

In some implementations, the processing device 120 and the driving device 131 are integrated together as a controller for the display 150 and/or the illuminator 140. In some implementations, the processing device 120, the driving device 131, and the display 150 are integrated together as a single unit. The single unit can also be integrated with the illuminator 140. The single units can be arranged (or tiled) in arrays to form a larger device.

In some implementations, the driving device 131, the illuminator 140, and the display 150 are integrated together as a single unit, e.g., as a holographic display device. The processing device 120 can be integrated in the computing device 110, e.g., through a PCIe slot. As noted above, the computing device 110 can generate application scene data using a 3D simulation application (e.g., the application 112), the application scene data including information of a plurality of primitives corresponding to at least one object and generate the primitive data of the plurality of primitives corresponding to the at least one object based on the application scene data using the API 114. The API 114 can be configured to adjust initial primitive data of the plurality of primitives generated from the application scene data to generate the primitive data of the plurality of primitives, vertex data of vertices associated with the plurality of primitives, and/or tables and commands, e.g., as discussed with details in section 2.1.

In some implementations, an optically diffractive device, e.g., a field grating device, a waveguide device, or a lightguide device, as illustrated in FIG. 5A to 5D, is coupled between the illuminator 140 and the display 150 and is configured to diffract light from the illuminator 140 into the display 150 that then diffracts the light to a viewer's eyes. The optically diffractive device can be positioned adjacent to the display 150, e.g., as illustrated in FIG. 5A to 5D.

In some examples, the light from the illuminator 140 can be incident on the optically diffractive device with a large incident angle from a side, such that the illuminator 140 does not block the viewer's view of the display 150. In some examples, the diffracted light from the optically diffractive device can be diffracted at a nearly normal incident angle into the display, such that the light can relatively uniformly illuminate the display 150 and be diffracted to the viewer's eyes with reduced (e.g., minimized) loss.

The optically diffractive device can include a field grating structure (e.g., the field grating structure 508-1 of FIG. 5A) formed on a first side of a substrate (e.g., the substrate 508-2 of FIG. 5A) and configured to suppress color crosstalk between different colors of light incident on the display 150 and/or a zero order redirecting structure (e.g., the zero order redirecting grating structure 508-3 of FIG. 5A) formed on a second, opposite side of the substrate and configured to suppress display zero order light. In some implementations, example optically diffractive devices are configured and performed as described in international application PCT/US2021/50271 entitled "DISPLAYING THREE-DIMENSIONAL OBJECTS" and filed on Sep. 14, 2021 and international application PCT/US2021/50275 entitled "RECONSTRUCTING OBJECTS WITH DISPLAY ZERO ORDER LIGHT SUPPRESSION" and filed on Sep. 14, 2021, which are commonly-owned and fully incorporated herein by reference.

In some implementations, the field grating structure includes at least one optically diffractive components and at least one of one or more color-selective polarizers or at least one of one or more reflective layers or one or more transmissive layers. In some implementations, e.g., as discussed with further details in section 4.5, the field grating structure includes at least one diffraction grating with a low diffraction efficiency for the light from the illuminator 140. The diffraction efficiency can be lower than a predetermined threshold, e.g., 20%, 15%, or 10%.

In some implementations, a coupling device is arranged between the illuminator 140 and the optically diffractive device (e.g., the field grating structure). The illuminator 140 can illuminate a plurality of different colors of light. The coupling device can be configured to receive the plurality of different colors of light from the illuminator 140 and to output the plurality of different colors of light to the optically diffractive device.

In some implementations, the coupling device includes: a prism element between the illuminator 140 and the optical diffractive device and configured to receive the plurality of different colors of light from an input surface of the prism element; one or more expansion gratings adjacent an exit surface of the prism element, each of the one or more expansion gratings configured to expand a beam profile of a different corresponding color of light by a factor in at least one dimension; and one or more reflectors downstream of the one or more expansion gratings, each of the one or more reflectors being configured to reflect a respective color of light into the optically diffractive device, where a tilt angle of each of the one or more reflectors is independently adjustable to cause a uniformity of diffraction from the optical diffractive device to the display 150.

In some implementations, the optically diffractive device (e.g., the field grating structure) is positioned facing a display surface of the display 150 along a perpendicular direction to the display surface. In some implementations, the coupling device is configured to couple the plurality of different colors of light into the optically diffractive device (e.g., the field grating structure) from a bottom surface or a top surface of the coupling device. In some implementations, the coupling device is configured to couple the plurality of different colors of light into the optically diffractive structure (e.g., the field grating structure) from a side surface of the coupling device.

In some implementations, a plurality of optical components arranged between the illuminator 140 and the display 150 can be configured for dispersion compensation. For example, at least one first optical component (e.g., a diffraction grating) is configured to cause a positive optical dispersion for light incident on the display, and at least one second optical component (e.g., another diffraction grating) can be configured to cause a negative optical dispersion for the light, the light having a spectral bandwidth with a peak wavelength. The positive optical dispersion and the negative optical dispersion can be compensated with each other, such that a holographic scene reconstructed from the light has no or little light dispersion.

2.5 Example Holographic Reconstruction for a Live Scene

FIG. 1B illustrates an example holographic reconstruction for a live scene. A system 170 can include a computing device, e.g., the computing device 110 of FIG. 1A optionally with the processing device 120 of FIG. 1A, and a holographic display device 172, e.g., the holographic display 150 of FIG. 1A optionally with the processing device 120 of FIG. 1A and/or the driving device 131 of FIG. 1A. A user can use an input device, e.g., a keyboard 174 and/or a mouse 176, to operate the system 170. The computing device or the holographic display device 172 can include a holographic renderer, e.g., implemented by the processing device 120 of FIG. 1A, to render a 3D representation of a live scene (e.g., a soccer game in a stadium) to generate corresponding graphic data for the live scene. The graphic data can include respective primitive data for a list of primitives corresponding to the live scene.

The holographic display device 172 can include a processing device (e.g., the processing device 120 of FIG. 1A), a driving device (e.g., the driving device 131 of FIG. 1A), and a display 173 (e.g., the display 150 of FIG. 1A). The processing device can compute a respective sum of EM field contributions from the primitives to each display element of the display 173 and generate control signals for modulating each display element based on the respective sum of EM field contributions. The holographic display device 172 can further include an illuminator (e.g., the illuminator 140 of FIG. 1A). The driving device can generate a timing control signal to activate the illuminator. When light from the illuminator illuminates a surface of the display 173, the modulated display elements can cause the light to propagate in the 3D space to form a volumetric light field corresponding to a holographic reconstruction 178 for the live scene, e.g., a soccer game in a stadium including two players and a soccer ball. Thus, the 3D holographic reconstruction 178 of the live scene are displayed as respective holographic reconstructions floating in the 3D space in front of, behind, or straddling the display 173.

3. Example System with Optical Approach

FIG. 2 illustrates a schematic diagram of an example system 200 for capturing and displaying live scenes using optical approach. Different from the system 100 of FIG. 1A where visual data of a live scene is captured and processed to generate a 3D digital representation of the live scene and further a corresponding computed hologram for holographic reconstruction, the system 200 is configured to capture real optical holograms of a live scene (e.g., an interference pattern associated with the live scene) using a digital sensor (e.g., CCD or CMOS) that outputs digital hologram data, without post-processing, to a holographic display system for holographic reconstruction in real time, e.g., with an acceptable quality. Optionally, the digital hologram data can be processed by a computing device to generate a corresponding digital hologram to be the holographic display system for holographic reconstruction, which, for example, can increase the quality of the reconstructed live scene. If the processing speed is fast, the capturing and displaying of the live scene can be still realized in real time.

In some implementations, e.g., as illustrated in FIG. 2, the system 200 includes a holographic capturing system 210 and a holographic display system 230. The holographic capturing system 210 can include an optical system 212 configured to generate an optical hologram of a live scene and an optical sensor 214 configured to capture sequential optical holograms of the live scene and output sequential hologram data associated with the sequential optical holograms of the live scene, each optical hologram being associated with respective hologram data. The live scene can include one or more three-dimensional (3D) objects in a real world or a physical space. The holographic display system 230 can be configured to optically reconstruct the live scene in a 3D space based on at least part of the sequential hologram data.

In some implementations, the system 200 further includes a computing device 220 coupled between the holographic capturing system 210 and the holographic display system 230. The computing device 220 can be configured to receive the at least part of the sequential hologram data from the optical sensor 214 and generate digital holograms 226 associated with the live scene based on the at least part of the sequential hologram data. The holographic display system 230 can be configured to receive the digital holograms 226 associated with the live scene from the computing device and reconstruct the live scene in the 3D space based on the digital holograms 226.

In some implementations, the system 200 includes one or more holographic capturing systems 210, e.g., positioned around a live scene (e.g., a soccer game in a stadium), and configured to capture optical holograms of the live scene from one or more different views. The one or more holographic capturing systems 210 can be coupled to one or more computing devices 220 that can be operated in parallel. Data transmission between the holographic capturing system 210 and the computing device 220 can be through a wired connection, a wireless connection, or any high speed connection. Data transmission between the computing device 220 and the holographic display system 230 can be through a wired connection, a wireless connection, or any high speed connection.

In some implementations, to achieve real-time display of a live scene, the holographic capturing system 210 is configured to capture the sequential optical holograms and generate the sequential hologram data, without storing the sequential optical holograms and the sequential hologram data. The computing device 220 can also be configured to process the at least part of the sequential hologram data to generate the digital holograms, without storing the at least part of the sequential hologram data and the digital holograms. The holographic capturing system 210, the computing device 220, and the holographic display system 230 are configured together to capture optical holograms of the live scene and optically reconstruct the live scene in real time.

A refresh rate of capturing and displaying a live scene can be limited by a refresh rate (or frame rate) of an optical sensor of the holographic capturing system 210 (e.g., 90 frames per second) and a refresh rate (or frame rate) of a display of the holographic display system 230 (e.g., 30 frames per second). For real-time holography, a limit is 15 frames per second, so a value larger than that obeys a persistence of vision property of human eye and brain, which indicates that reconstruction of a live scene at a rate of more than 15 frames per second can make the live scene continuous to human eye and brain.

3.1 Holographic Capturing System

Referring to FIG. 2, the holographic capturing system 210 includes the optical system 212 and the optical sensor 214. The optical system 212 can include a holographic setup configured to generate an optical hologram. For example, the holographic setup can include an interferometer (e.g., Mach-Zehnder interferometer or Michelson interferometer), Gabor's holographic setup (e.g., inline), or Leith-Upatnieks holographic setup (e.g., off-axis). For illustration, Mach-Zehnder interferometer is described as an example holographic setup of the optical system 212, e.g., as illustrated with further details in FIG. 3A-3D. The optical hologram includes an interference pattern associated with a live scene, e.g., an interference between an object beam interacting with the live scene and a reference beam interacting with the object beam.

The optical sensor 214 is configured to capture the optical hologram and output hologram data of the optical hologram. The optical sensor 214 can be a digital sensor, e.g., a digital camera like CCD or CMOS. The optical sensor 214 can include a number of sen sing pixels in an active area of the optical sensor 214. The optical hologram, e.g., an interference pattern, can be formed on the number of sen sing pixels. The hologram data can include an array of data bits, e.g., bit "0" and "1". In some examples, the array of data bits includes a one-dimensional data array (e.g., 1×12,000,000). In some examples, the array of data bits includes a two-dimensional data array (e.g., 3,000×4,000). In some implementations, the optical sensor 214 includes a buffer for buffering the hologram data. The optical sensor 214 can output sequential hologram data of sequential optical holograms of a live scene, e.g., a stream of array of data bits.

In some implementations, a frame rate of the optical sensor 214 is comparable to a processing speed of the computing device 200. The optical sensor 214 can directly transmit the hologram data of the optical holograms to the computing device 200 for processing.

In some implementations, the optical sensor 214 has a high frame rate, e.g., 90 Hz, that is, the optical sensor 214 can capture 90 images(e.g., optical holograms) per second. The frame date of the optical sensor 214 can be higher than the processing speed of the computing device 220. In some implementations, the system 200 includes a frame grabber 216 coupled between the optical sensor 214 and the computing device 220 and configured to select part of hologram data of the optical holograms to transmit to the computing device 220. For example, if the frame rate of the optical sensor 214 is 90 Hz and the computing device 220 can process 30 images per second, the frame grabber 216 can select just one third of the images captured by the optical sensor 214 to transmit to the computing device 220. As an example, the frame grabber 216 can select the $1^{st}$ image, $4^{th}$ image, $7^{th}$ image, . . . , $88^{th}$ image out of the 90 images to transmit to the computing device 220.

The frame grabber 216 can be coupled to the optical sensor 214 by, for example, a wired connection such as one or more transmission cables or a wireless connection. The frame grabber 216 can be coupled to the computing device 220, by, for example, an interface 215 (e.g., the interface 115 of FIG. 1A) that can be a PCIe slot or any other high speed connection. In some implementations, e.g., as illustrated in FIG. 2, the frame grabber 216 is included in the holographic capturing system 210 (e.g., integrated with the optical sensor 214). In some implementations, the frame grabber 216 is integrated in the computing device 220, e.g., by a PCIe slot.

In some implementations, the frame grabber 216 includes a first in, first out (FIFO)-based grabber configured to deposit hologram data outputted from the optical sensor 214 directly into the computing device 220. In some implementations, the frame grabber 216 includes a frame-buffer-based grabber configured to deposit hologram data outputted from the optical sensor 214 in a frame buffer of the frame grabber and subsequently into the computing device 220.

In some implementations, the frame grabber 216 includes at least one of a grabber, a frame buffer, or a controller (e.g., a Direct Memory Access(DMA) controller). The grabber can include a set of hardware resources taking in charge all timing and control task required by the optical sensor 214, and conditioning the digital hologram data provided by the optical sensor 214. The frame buffer can include an internal storage area large enough to hold a full frame image issued by the optical sensor 214. The controller is configured to transfer the stored image from the frame buffer into a memory 222 of the computer device 220, e.g., in a DMA (Direct Memory Access) fashion. This transfer does not require any CPU intervention (e.g., an intervention of a processor 224 of the computing device 220).

In some implementations, the optical system 212 generates optical holograms with different colors(e.g., red, green, blue), for example, using a coherent light source including coherent light elements with the different colors(e.g., lasers with different colors).

In some implementations, the coherent light elements are sequentially and alternatively emit coherent light beams with respective colors, e.g., red, green, and blue (RGB). For each color, the holographic capturing system 210 includes a corresponding color filter arranged upstream the optical sensor 214 for each coherent light element when the coherent light element emits a corresponding coherent light beam with the color. The corresponding color filter can be a notch filter configured to transmit light with the color and block light with other colors to reach the optical sensor 214. The optical sensor 214 can capture sequential groups of optical holograms with the different colors, each group including corresponding optical holograms with the different colors (e.g., red optical hologram, green optical hologram, blue optical hologram). In some implementations, the frame grabber 216 selects alternatively hologram data of one of the optical holograms with the different colors from a group, e.g., red, green, blue from adjacent three groups. In such a way, the processing speed of the computing device 220 can match up with the transmitted hologram data from the frame grabber 216.

In some implementations, the coherent light elements with the different colors emit corresponding coherent light beams with respective colors simultaneously. The holographic capturing system 210 can further include a color filter array position on the active area of the optical sensor 214. The color filter array can include groups of different color filters on a plurality of sen sing pixels of the optical sensor. The different color filters are associated with the respective colors, and each group of the different color filters is arranged on a corresponding group of adjacent sen sing pixels of the plurality of sen sing pixels. Hologram data for the respective colors can be determined based on a captured optical hologram captured by the corresponding groups of adjacent sen sing pixels of the plurality of sen sing pixels.

In some implementations, the color filter array includes a Bayer filter mosaic that is a color filter array for arranging RGB color filters on a square grid of photosensors. The Bayer filter mosaic has a particular arrangement of color filters (or filter pattern) to create a color image. The filter pattern can be half green, one quarter red, and one quarter blue, e.g., BGGR, RBGB, GRBG, or RGGB. The color image is color-coded with Bayer filter colors, and an image with an individual color can be reconstructed after interpolating missing color information. Demosaicing can be performed in different ways. In some examples, the color value of the pixels of the same color in the neighborhood is interpolated. For example, once the sen sing pixels have been exposed to an optical hologram, each sen sing pixel can be read. A sen sing pixel with a green filter provides an exact measurement of the green component. The red and blue components for this sen sing pixel are obtained from the neighbors. For a green pixel, two red neighbors can be interpolated to yield the red value, also two blue pixels can be interpolated to yield the blue value.

In some implementations, the optical sensor 214 is configured to perform the demosaicing to generate respective hologram data with the different colors based on a same optical hologram captured by the optical sensor 214 with the Bayer filter mosaic. In some implementations, the computing device 220 is configured to perform the demosaicing to generate respective hologram data with the different colors based on a same optical hologram captured by the optical sensor 214 with the Bayer filter mosaic, and further to generate digital holograms for the different colors.

3.2 Computing Device

The computing device 220 can be a computing device associated with a user (e.g., an operator, a developer, a programmer, a customer, or any suitable entity). The computing device 220 can be any appropriate type of device, e.g., a desktop computer, a personal computer, a notebook, a tablet computing device, a personal digital assistant (PDA), a network appliance, a smart mobile phone, a smartwatch, an enhanced general packet radio service (EGPRS) mobile phone, a media player, a navigation device, an email device, a game console, or any appropriate combination of any two or more of these computing devices or other computing devices.

Figure 4A:
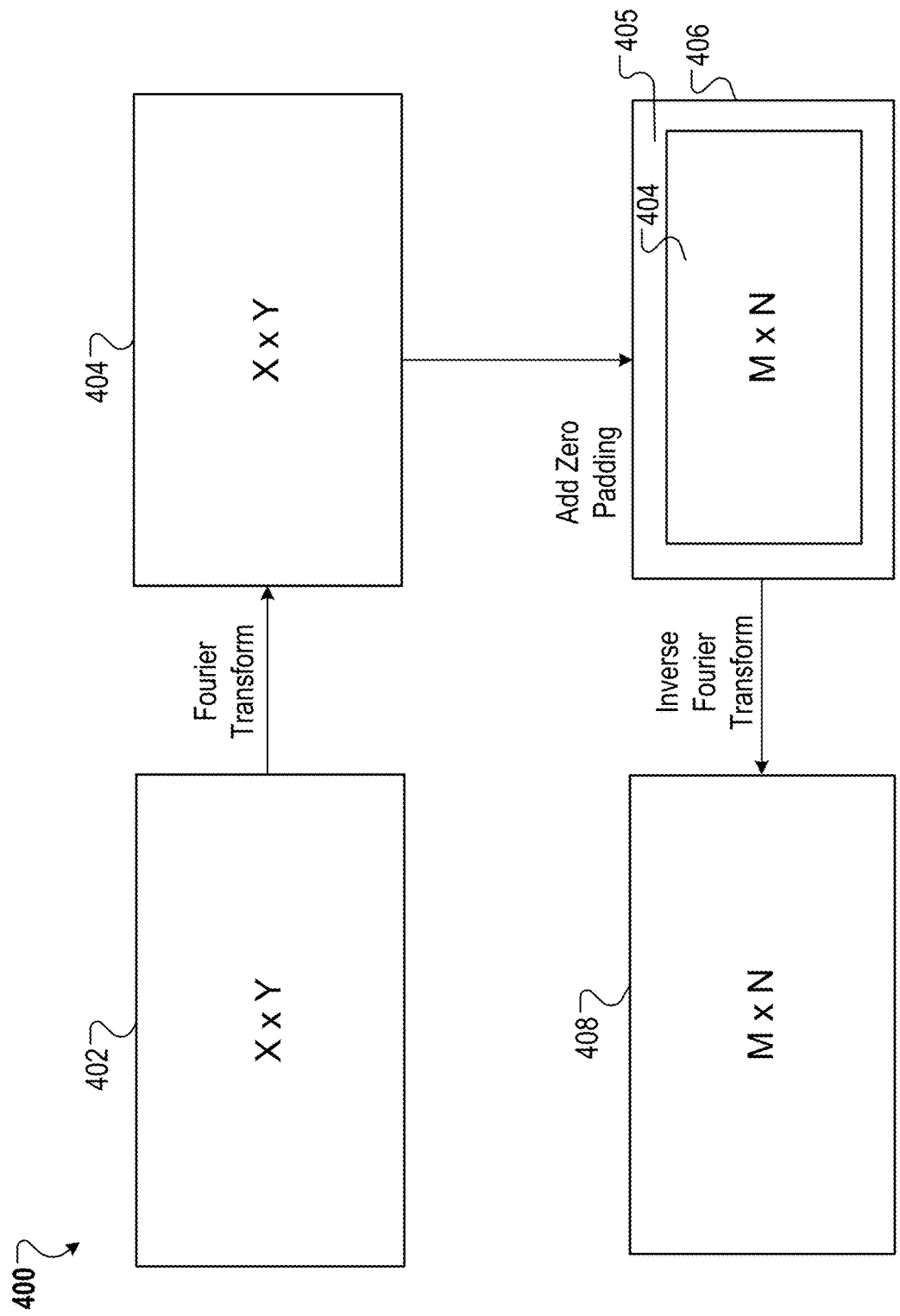
FIG. 4A illustrates an example of processing hologram-based images.
Figure 4C:
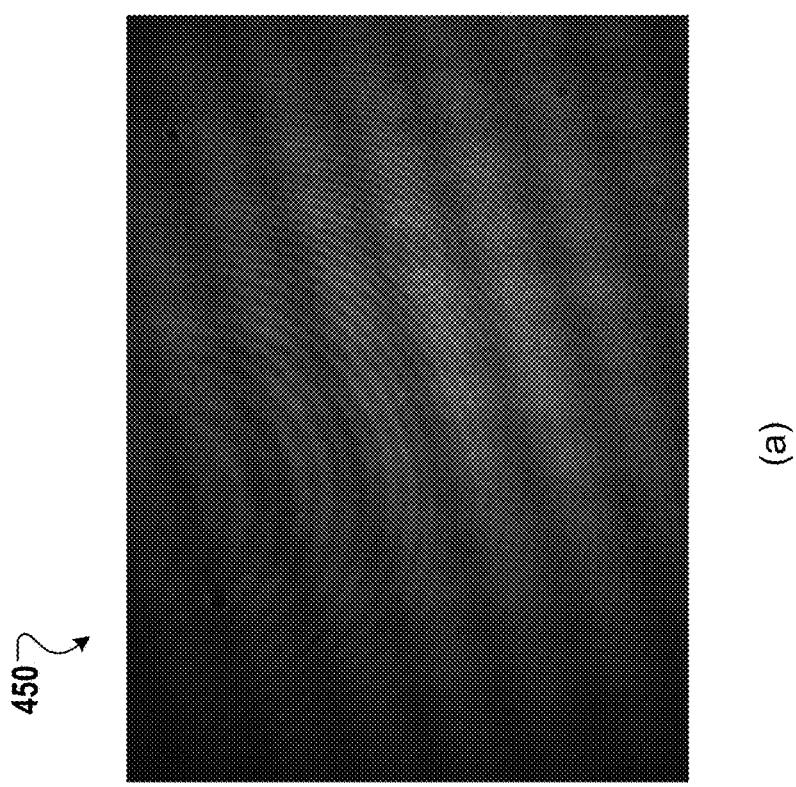
FIG. 4C illustrates an example of a raw hologram and a processed hologram with noise suppression.
Figure 4C:
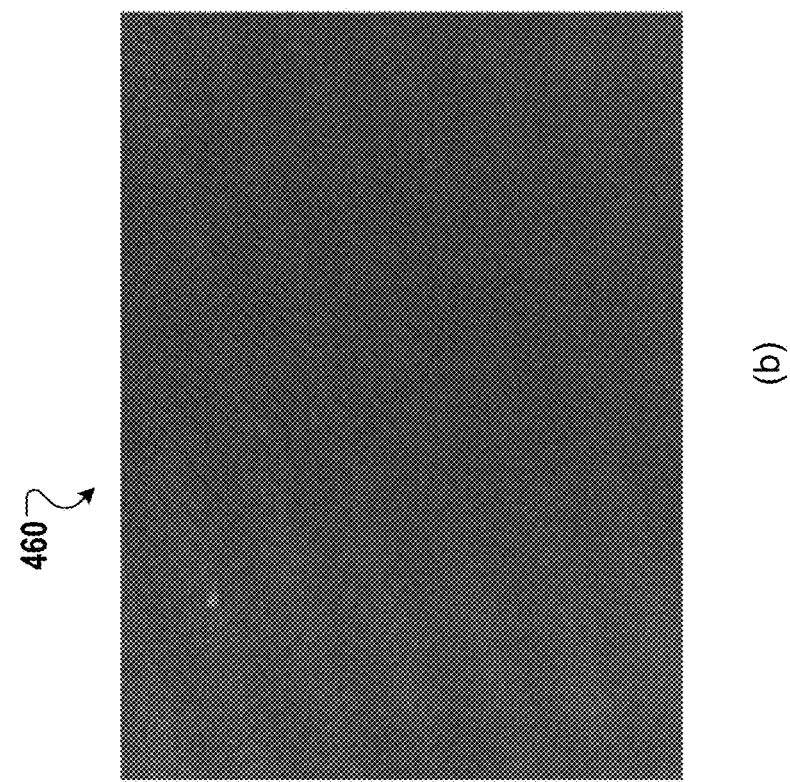

In some implementations, the computing device 220 includes at least one memory 222 and at least one processor 224. As noted above, the memory 222 can receive and store hologram data of optical holograms of a live scene from the holographic capturing system 210 (e.g., from the optical sensor 214 or the frame grabber 216). As the optical sensor 214 can be a digital sensor (e.g., CCD or CMOS) that only picks up intensities of an optical hologram (e.g., interference pattern), the hologram data of the optical hologram can be an array of data bits. The processor 224 can be configured to process the hologram data to generate corresponding digital holograms 226 to be transmitted to the holographic display system 230 for holographic reconstruction of the live scene in a 3D space. As discussed with further details below, the processor 224 can perform at least one of resolution correction, subtractions, adding zero-pads, divisions, Fast Fourier Transforms (FFTs), inverse FFTs, or any other mathematical operations, e.g., as illustrated in FIGS. 4A-4C.

In some implementations, the optical sensor 214 includes a plurality of sen sing pixels in an active area of the optical sensor, and the holographic display system 230 includes a display 250 having a plurality of display elements. The processor 224 is configured to process the at least part of the sequential hologram data to generate the digital holograms associated with the live scene based on at least one of a pitch of the sen sing pixels, a pitch of the display elements, a size of the active area of the optical sensor, or a size of the display.

The pitch of the sen sing pixels can be associated with a resolution of a captured optical hologram and a capturable size of a scene. On one hand, the optical sensor 214 needs to have small sen sing pixels enough to record a high-resolution image. On the other hand, the optical sensor 214 also needs to be large enough so it records a large enough scene. In some examples, the pitch of the sen sing pixels of the optical sensor 214 is about 3.45 µm.

The pitch of the display elements is associated with an acceptable viewing angle of a reconstructed scene and the size of the display. On one hand, the pixel pitch of the display needs to be small enough so the display reconstructs a 3D object or scene with an acceptable viewing angle. Besides a small pixel pitch, the size of the display needs to be large so one can see a scene large enough to be meaningful once viewed directly. In some examples, the pitch of the display elements of the display 250 is about 3.74 µm.

As noted above, an optical hologram (e.g., an interferogram) can be captured with the optical sensor 214 and be displayed on the display 250 in real-time with no post-processing by the computing device 220, and the holographic reconstruction may have an acceptable quality. A higher quality of the holographic reconstruction can be achieved with a level of post-processing by the computing device 220. A reason for the post-processing is unequal pixel size of the sen sing pixels of the optical sensor 214 and the display elements of the display 250. In some examples, the pitch of the sen sing pixels of the optical sensor 214 is 3.45 µm and the pitch of the display elements of the display 250 is 3.74 µm, which creates a mismatch between the recording process and the display process, e.g., a mismatch between a captured optical hologram of the live scene and a reconstruction of the live scene. Another mismatch is the size of the display 250 and the active area of the optical sensor 214. The size of the display 250 is identical to a number of pixels multiplied by a pixel size. If the active area of the optical sensor 214 is larger than the size of the display 250, a live scene captured by the optical sensor 214 cannot be fully displayed by a smaller display 250. On the contrary, if the active area of the optical sensor 214 is smaller than the size of the display 250, a live scene captured by the optical sensor 214 is only displayed by part of the display 250.

In some implementations, the mismatch between a captured optical hologram of the live scene and a reconstruction of the live scene is associated with at least one of a difference between the pitch of the sen sing pixels of the optical sensor 214 and the pitch of the display elements of the display 250, or a difference between the size of the active area of the optical sensor 214 and the size of the display 250. The computing device 220 (e.g., the processor 224) can be configured to suppress the mismatch by post-processing hologram data of the optical holograms to generate corresponding digital holograms 226.

In some implementations, the computing device 220 is configured to perform at least one of scaling a first digital hologram associated with a captured optical hologram based on a ratio between the pitch of the sen sing pixels and the pitch of the display elements or adjusting the scaled first digital hologram to generate a second digital hologram to be modulated on the display 250 based on the size of the display 250 and the size of the hologram data.

For example, assuming that
pixelpitch_Display=L,
pixelpitch_Sensor=C,
ratio=L/C, and
post_hologram=recorded_hologram x ratio, where pixelpitch_Display and pixelpitch_Sensor represent the pitch of the display elements of the display 250 and the pitch of the sen sing pixels of the optical sensor 214, respectively. recorded_hologram and post_hologram represent a digital hologram before processing and a digital hologram after processing, respectively. Then the post_hologram can be further adjusted to be displayed on the display 250.

During the resampling, the computing device 220 can use at least one of one or more interpolation algorithms, e.g., linear interpolation, nearest neighbor interpolation, cubic spline interpolation, shape-preserving interpolation, Biharomic interpolation, or thin-plate spline interpolation. For example, in linear interpolation, if a new pixel is added between two adjacent pixels, a value of that new pixel can be an average value of the two adjacent pixels.

The computing device 200 can be configured to resample a digital hologram such that the resampled digital hologram can be modulated on the display 250 with a same sampling frequency. One way to achieve this is to use Fourier transforms to find a range of spatial frequencies making up the digital hologram associated with an optical hologram captured by the optical sensor 214 with a particular pixel pitch and then process(e.g., crop or add) frequencies and resample on a grid equal to the pixel pitch of the display 250. In some implementations, the computing device 220 is configured to resample a first digital hologram associated with a captured optical hologram to be a second digital hologram to be modulated on the display 250 using Fourier transform (e.g., FFTs) and inverse Fourier transform (e.g., inverse FFT). The first digital hologram is associated with the pitch of the sen sing pixels, and the second digital hologram is associated with the pitch of the display elements.

FIG. 4A illustrates an example 400 of data processing hologram-based images. The computing device 220 can receive hologram data (e.g., an array of data bits) of an optical hologram captured by the optical sensor 214 and convert the hologram data (e.g., 1×12,000,000) to be an image 402 with X×Y pixels(e.g., 3,000×4,000). The computing device 220 can perform Fourier transform (e.g., FFT) on the image 402 in time domain to obtain image 404 in frequency domain that can still have X×Y pixels.

Zero-padding an FFT can increase a resolution of the frequency domain results, which can be useful for a narrow band with limited data. In some implementations, if the pitch of the sen sing pixels is larger than the pitch of the display elements, the computing device 220 processes the image 404 in frequency domain to perform zero-padding on the image 404 based on a ratio between the pitch of the sen sing pixels and the pitch of the display element. As shown in FIG. 4A, zeros 405 can be added around the image 404 to obtain image 406 having M×N pixels that can match the pitch of the display element, e.g., using the expression: post_hologram=recorded_hologram x ratio. The computing device 220 can further perform an inverse Fourier transform (e.g., inverse FFT) on the transformed image 406 with the zero padding in frequency domain to obtain image 408 with M×N pixels in time domain. The image 408 can be a new hologram with correct sampling frequency. The zero padding may add background noise but also makes the resampling to a correct resolution. The image 408 in time domain can be a digital hologram (e.g., hologram 226). As the optical sensor 214 (e.g., digital CCD or CMOS) only pick up intensities of the optical hologram (e.g., interference pattern), the digital hologram performs like an amplitude hologram (or an amplitude-like hologram), thought the digital hologram still contains both amplitude information and phase information of a live scene, which enable to reconstruct the live scene in a 3D space. The display 250 (e.g., LCoS) can convert the digital hologram (e.g., amplitude-like hologram) into a phase hologram as orientations of liquid crystals determine phases of the display elements thus causing different refractive indices for different display elements to reconstruct 3D objects in the live scene.

FIG. 4B illustrates another example 430 of data processing hologram-based images. Similar to the example 400 of FIG. 4A, the computing device 220 can receive hologram data (e.g., an array of data bits) of an optical hologram captured by the optical sensor 214 and convert the hologram data (e.g., 1×12,000,000) to be an image 432 with X×Y pixels(e.g., 3,000×4,000). The computing device 220 can perform Fourier transform (e.g., FFT) on the image 432 in time domain to obtain image 434 in frequency domain that can still have X×Y pixels.

If the pixel pitch of the sen sing pixels of the optical sensor 214 is smaller than the pixel pitch of the display elements of the display 250, the computing device 220 can be configured to crop the image 432 based on a ratio between the pitch of the sen sing pixels and the pitch of the display elements to obtain image 436 with M×N pixels, e.g., using the expression: post_hologram=recorded_hologram x ratio. Then, e.g., as illustrated in FIG. 4B, the computing device 220 can further perform an inverse Fourier transform (e.g., inverse FFT) on the transformed image 436 in frequency domain to obtain image 438 with M×N pixels in time domain. The image 438 can be a new hologram with correct sampling frequency. In such a way, information that the display 250 cannot display due to large pixel pitch of the display elements can be got rid of.

The computing device 220 can be configured to resample a first digital hologram to be a second digital hologram by respectively resampling central points of the plurality of sen sing pixels of the optical sensor 214 to match centroids of the plurality of display elements of the display 250. In some implementations, the plurality of sen sing pixels of the optical sensor 214 is regularly arranged in the active area of the optical sensor 214, and the plurality of display elements is regularly arranged in the display 250, and the central points of the plurality of sen sing pixels are regularly spaced, and the centroids of the plurality of display elements of the display 250 are regularly spaced.

In some implementations, the plurality of sen sing pixels of the optical sensor 214 is regularly arranged in the active area of the optical sensor 214, and the plurality of display elements is irregularly arranged in the display 250. The central points of the plurality of sen sing pixels are regularly spaced, and the centroids of the plurality of display elements of the display are irregularly spaced, e.g., as illustrated in FIGS. 6A-6B. The plurality of display elements can form an irregular pattern (e.g., a Voronoi pattern). The irregular pattern of the display 250 can greatly reduce or eliminate diffractive aberrations, among other effects and thus improve image quality. The computing device 220 can be configured to resample the regularly spaced center points of the plurality of sen sing pixels to match the irregularly spaced centroids of the plurality of display elements by determining a position of each centroid of the plurality of display elements based on a weighted sum of adjacent center points around the centroid using one or more weighting algorithms(e.g., Gaussian weighting or optimized Windowed-Sync weighting).

In some implementations, the plurality of sensing pixels of the optical sensor is irregularly arranged in the active area of the optical sensor 214, and the plurality of display elements is irregularly arranged in the display 250. The central points of the plurality of sensing pixels are irregularly spaced, and the centroids of the plurality of display elements of the display 250 are irregularly spaced. An irregular pattern formed by the plurality of sensing pixels can match an irregular pattern formed by the plurality of display elements.

Unwanted noise may exist in captured optical holograms. The unwanted noise can include zero-order noise resulting from an undiffracted part of the reference beam or the object beam. The unwanted noise can also include noise coming from cover plates in front of the optical sensor 214, which can add interference patterns(like diffraction gratings or Gabor zone plates) with different frequencies depending on flatness of the cover plates, sometimes low-frequency ones and sometimes high-frequency ones. Post-processing on the captured optical holograms can get rid of those types of noises because they are constant parts of the optical holograms and won't change due to additional phase shifts on an optical path in the optical system 212.

Figure 3D:
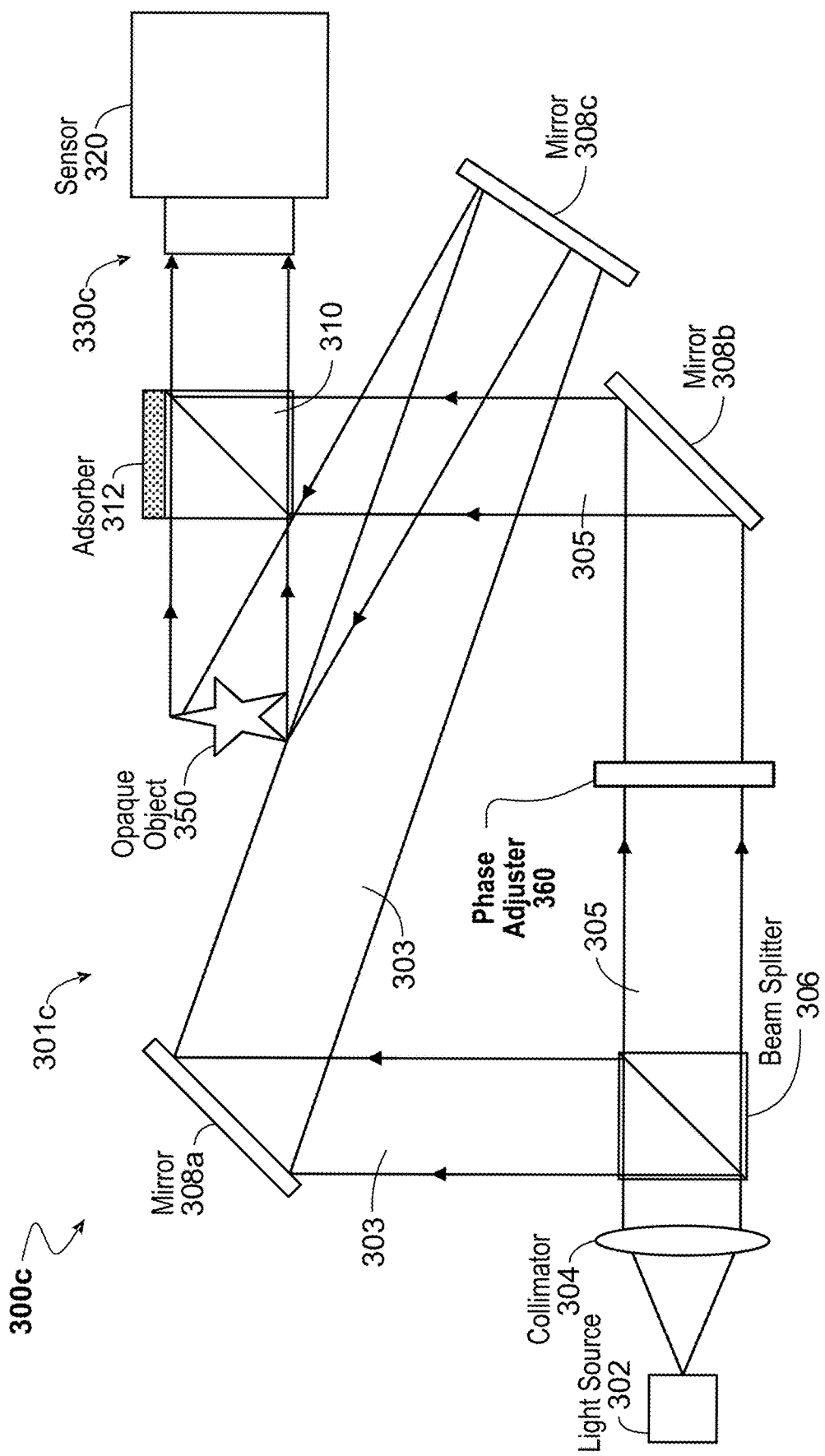
FIG. 3D illustrates a schematic diagram of an example holographic capturing system for noise suppression.

In some implementations, e.g., as discussed with further details in FIG. 3D, to remove unwanted noise from the captured optical holograms by the optical sensor 214, known phase shifts can be introduced in one of coherent light beams(reference beam or object beam) in the optical system 212, e.g., by adding a phase adjuster such as a phase shifter or dynamic retarder controllable by voltages. Then, the computing device 220 can process hologram data of the captured optical holograms, e.g., using one or more mathematical operations like subtraction and/or division to get new digital holograms with lower levels of noise.

As noted above, in conventional digital holography, a digital intensity image of a hologram first undergoes processing such as complex wave retrieval, and the hologram is then numerically propagated by means of Fresnel approximation which describes wave propagation in free space to an image plane. This may result in a complex image containing both amplitude and phase information. In contrast, the computing device 220 can generate digital holograms(e.g., amplitude-like holograms) with simpler processing as discussed above to therefore improve the processing speed and achieve holographic reconstruction or display in real time.

3.3 Holographic Display System

The holographic display system 230 can be similar to the holographic display system 130 of FIG. 1A. As shown in FIG. 2, the holographic display system 230 includes a driving device 231, an illuminator 240 (e.g., the illuminator 140 of FIG. 1A), and the display 250 (e.g., the display 150 of FIG. 1A or the display device 172 of FIG. 1B). The driving device 231 can include a driving memory 232 (e.g., the driving memory 132 of FIG. 1A) coupled to the computing device 220, an illuminator driver 234 (e.g., the illuminator driver 134 of FIG. 1A) coupled to the driving memory 232 and the illuminator 240, and a display driver 236 (e.g., the display driver 136 of FIG. 1A) coupled to the driving memory 232 and the display 250.

The driving memory 232 can be configured to receive and store the hologram 226 from the computing device 220. In some cases, the hologram is an amplitude-like digital hologram corresponding to an interference pattern associated with the live scene.

In some implementations, the display driver 236 is configured to convert the hologram 226 into corresponding modulation control signals(e.g., a voltage signal) for the plurality of display elements of the display 250. The display 250 (e.g., LCoS) can convert the hologram 226 (e.g., amplitude-like hologram) into a phase hologram as orientations of liquid crystals determine phases of the display elements thus causing different refractive indices for different display elements to reconstruct 3D objects in the live scene. The illuminator driver 234 can be configured to: transmit an illumination control signal (e.g., for amplitude and/or brightness control) to the illuminator 240 to activate the illuminator 240 to illuminate light on the display 250 such that light is caused by the modulated display elements of the display 250 to form a volumetric light field 260 corresponding to the live scene, e.g., the holographic light field 160 of FIG. 1A or the 3D holographic reconstruction 178 of FIG. 1B. The display driver 236 and the illuminator driver 234 can be configured to communicate with each other, such that outputting the respective modulation control signal to each display element of the plurality of display elements by the display driver 236 is in coordination with transmitting the illumination control signal to the illuminator 240 by the illuminator driver 234.

In some implementations, the illuminator 240 includes two or more light emitting elements each configured to emit light with a different color (e.g., red, blue, or green), and the illuminator driver 234 can sequentially transmit a respective illumination control signal to sequentially activate each of the two or more light emitting elements of the illuminator. In some implementations, the display driver 236 sequentially outputs: i) a first modulation control signal to modulate the display 250 with information associated with a first color during a first time period, and ii) a second modulation control signal to modulate the display 250 with information associated with a second color during a second, sequential time period. The illuminator driver 234 can sequentially output a first illumination control signal to activate the illuminator 240 to turn on a first light emitting element to emit light with a first color during the first time period, and a second illumination control signal to activate the illuminator 240 to turn on a second light emitting element to emit light with the second color during the second time period.

In some implementations, the display 250 includes a spatial light modulator (SLM). The SLM can be a phase SLM, an amplitude SLM, or a phase and amplitude SLM. In some examples, the display 250 is a digital micro-mirror device (DMD), a liquid crystal on silicon (LCOS or LCoS) device, Optically addressed spatial light modulators (OASLMs), or any other type of light modulator that is capable of performing holography.

In some implementations, the display 250 is a regular display where the plurality of display elements have a same shape and are spaced evenly in a display area. In some implementations, the display 250 is an irregular display where the plurality of display elements form an irregular pattern, e.g., having different shapes or sizes and/or being irregular positioned, for example, as illustrated in FIG. 6A or FIG. 6B below.

As discussed in further detail below with respect to FIG. 5A-5D, there can be different configurations for the system 200. The display 250 can be reflective or transmissive. The display 250 can have various sizes, ranging from a small scale (e.g., 1-10 cm on a side) to a large scale (e.g., 100-1000 cm on a side). Illumination from the illuminator 240 can be from the front of the display 250 (e.g., for a reflective or transflective display) or from the rear of the display 250

(e.g., for a transmissive display). The illuminator 240 can provide uniform illumination across the display 250. In some implementations, an optical waveguide can be used to evenly illuminate a surface of the display 250.

4. Example Holographic Capturing Systems

FIG. 3A illustrates a schematic diagram of an example holographic capturing system 300 that can be implemented as the holographic capturing system 210 of FIG. 2. The holographic capturing system 300 is configured to generate an optical hologram of a live scene using a holographic setup 301 and to capture the optical hologram using an optical sensor 320. The holographic setup 301 can be implemented as the optical system 212 of FIG. 2.

For illustration, a Mach-Zehnder (MZ) interferometer is implemented in the holographic capturing system 300 as an example of the holographic setup 301. The MZ interferometer can be configured to determine relative phase shift variations between two collimated beams derived by splitting light from a single coherent source. The phase shift variations can be caused by a scene or a change in a length of one of optical paths of the collimated beams.

In some implementations, as illustrated in FIG. 3A, the holographic capturing system 300 includes a coherent light source 302 (e.g., a laser source) configured to emit a coherent light beam. The coherent light beam can be collimated using a collimator 304 (e.g., an optical lens), and then be split by a beam splitter 306 into two optical beams: one as an object beam 303 and the other one as a reference beam 305. The holographic setup 301 can include a number of reflective mirrors 308a, 308b to guide the object beam 303 and the reference beam 305 to an optical combiner 310 (e.g., a beam splitter). The beam combiner 310 is configured to superimpose the reference beam 305 and the object beam 303 to form an interference pattern 330. The optical sensor 320 can be positioned downstream the beam combiner 310 to capture the interference pattern 330 on an active area of the optical sensor 320.

The optical sensor 320 can be similar to, or same as, the optical sensor 214 of FIG. 2. The optical sensor 320 can be a digital optical camera (e.g., CCD or CMOS) configured to record the interference pattern 330 as an array of data bits. As the scene does not need to be imaged, there is no lens on the optical sensor 320 or between the beam combiner 310 and the optical sensor 320, and the interference pattern 330 is directly captured on the active area of the optical sensor 320. Also, there is no optical lens on an optical path of the reference beam 305 between the beam splitter 306 and the beam combiner 310.

In some implementations, the holographic setup 301 includes one or more optical lens arranged between the beam splitter 306 and the scene and configured to magnify or demagnify the object beam 303 to be compatible with the active area of the optical sensor 320. In some implementations, the holographic setup 301 includes one or more optical lens on an optical path of the object beam 303 between the scene and the beam combiner 310 and configured to magnify or demagnify the object beam 303 after interacting with the scene to be compatible with the active area of the optical sensor 320.

In some implementations, the holographic setup 301 further includes an optical absorber 312 arranged on a side surface of the beam combiner 310 and configured to absorb part of the reference beam 310 propagating away from the interference pattern 330.

As discussed below, the holographic setup 301 can be configured to operate in a transmission mode for capturing optical holograms of transparent objects or in a reflection mode for capturing optical holograms of reflective objects.

FIG. 3B illustrates a schematic diagram of an example holographic capturing system 300a for capturing a transparent object 340 in an optical path of the object beam 303. The holographic capturing system 300a can be same as the holographic capturing system 300 of FIG. 3A, and a holographic setup 301a can be same as the holographic setup 301 of FIG. 3A. The object beam 303 travels through the transparent object 340 to be incident on the beam combiner 310. The object beam 303 interacting with the transparent object 340 interacts with the reference beam 305 to form an interference pattern 330a that is captured by the optical sensor 320.

FIG. 3C illustrates a schematic diagram of an example holographic capturing system 300b for capturing an opaque or reflective object 350. Compared to the holographic capturing system 300a of FIG. 3B, the holographic capturing system 300b includes at least one more reflective mirror 308c in a holographic setup 301b. The reflective mirror 308c can be arranged in an optical path of the object beam 303 and configured with the reflective mirror 308a together to guide the object beam 303 towards the opaque object 350 with an angle such that the object beam 303 is reflected or scattered from the opaque object 350 to be incident on the beam combiner 310. The object beam 303 interacting with the transparent object 340 interacts with the reference beam 305 to form an interference pattern 330b that is captured by the optical sensor 320.

FIG. 3D illustrates a schematic diagram of an example holographic capturing system 300c with noise removal. As noted above, a phase adjuster (e.g., a phase shifter or dynamic retarder) can be added in the holographic capturing system 300c to remove noise in optical holograms captured by the optical sensor 320. The phase adjuster can introduce phase shifts in one of the reference beam 305 and the object beam 303. For illustration, a phase adjuster 360 is added to an optical path of the reference beam 305 in the holographic capturing system 300b of FIG. 3C to form the holographic capturing system 300c with a holographic setup 301c.

The phase adjuster 360 can be configured to dynamically adjust a phase shift of the reference beam 305 to therefore a phase difference between the object beam 303 interacted with a scene and the reference beam 305 before an optical hologram (or interference pattern) 300c is formed on the optical sensor 320.

In some implementations, the phase adjuster 360 is configured to sequentially adjust the phase shift of the reference beam 305 to be a series of predetermined values in a time period, such that the optical sensor 320 captures corresponding sequential optical holograms of the scene in the time period. In some examples, the phase adjuster 360 includes a liquid crystal (LC) cell configured to adjust the phase shift to be the series of predetermined values by corresponding voltages. The LC cell can be a single cell having a size no smaller than a size of the reference beam 305 such that all the optical holograms can be adjusted with the phase shift. The LC cell can be pre-calibrated to determine a correspondence between the predetermined values of the phase shift and the corresponding voltages.

In some implementations, a computing device (e.g., the computing device 220 of FIG. 2) is configured to receive hologram data of optical holograms captured by the optical sensor 320. The computing device can be configured to generate a digital hologram of the scene with noise suppression based on the corresponding sequential optical holograms. For example, the computing device can be configured to process the corresponding sequential optical holograms to obtain corresponding raw digital holograms, and to perform one or more mathematical operations on the corresponding raw digital holograms to generate the digital hologram of the scene.

In some implementations, the series of predetermined values for the phase shift comprises 0, pi/2, pi, 3pi/2, and the digital hologram is calculated based on an expression as follows:

final_hologram=(hologram_0-hologram_pi)/(hologram_pi/2-hologram_3pi/2), where final_hologram represents the digital hologram, hologram_0 represents a first corresponding raw digital hologram based on a first corresponding optical hologram with 0 phase shift, hologram_pi/2 represents a second corresponding raw digital hologram based on a second corresponding optical hologram with pi/2 phase shift, hologram_pi represents a third corresponding raw digital hologram based on a third corresponding optical hologram with pi phase shift, and hologram_3pi/2 represents a fourth corresponding raw digital hologram based on a fourth corresponding optical hologram with 3pi/2 phase shift. For example, diagram (a) of FIG. 4C shows a raw digital hologram 450, e.g., hologram_0 with 0 phase shift, and diagram (b) of FIG. 4C shows a processed digital hologram 460 calculated based on the above expression, e.g., final_hologram. It can be shown that compared to the raw digital hologram 450, noise has been suppressed or eliminated in the processed digital hologram 460.

5. Example Holographic Display Systems 5.1 Example System Setups

Figure 5A:
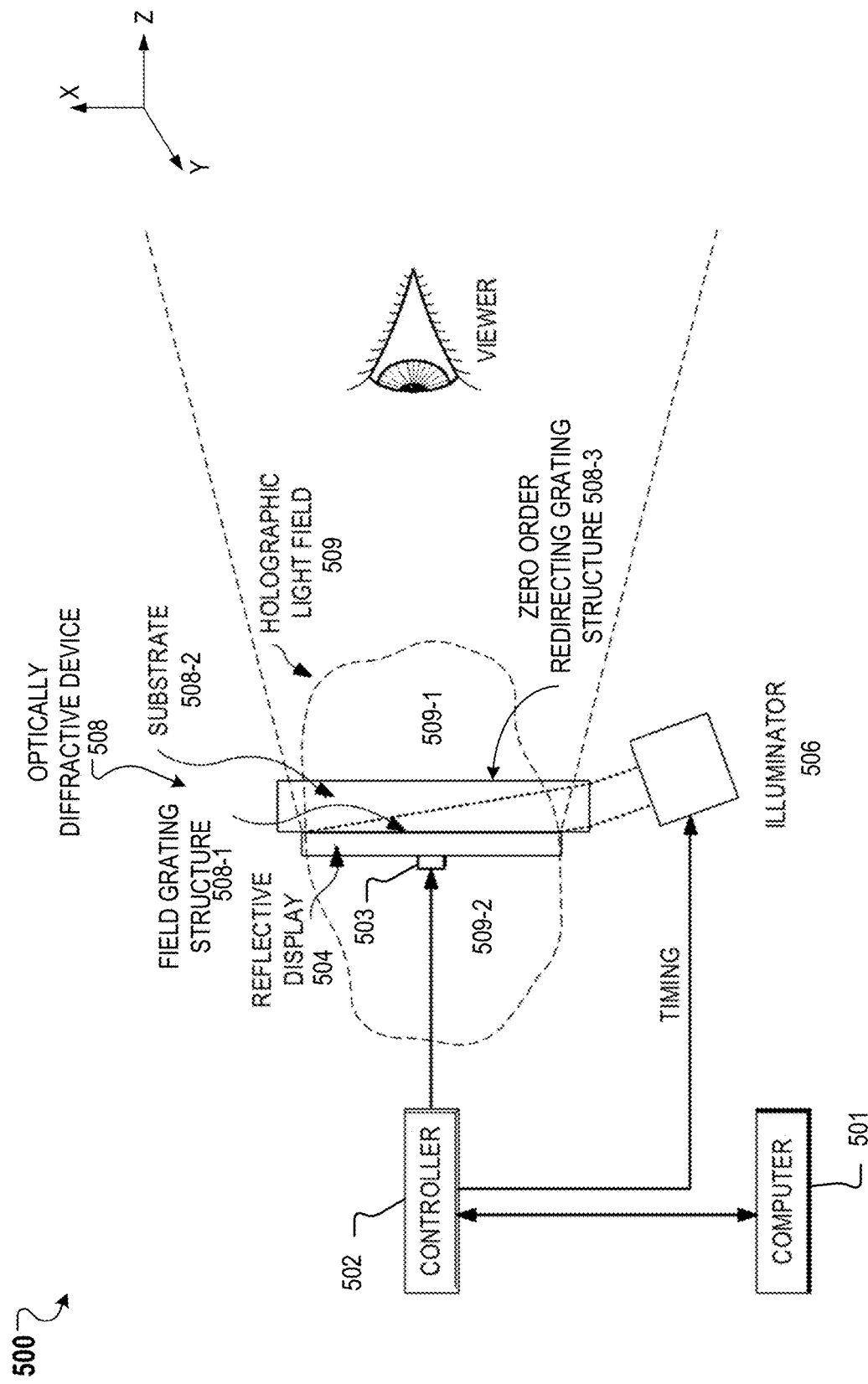
FIG. 5A illustrates an example system for 3D display including a reflective display with optically diffractive illumination.
Figure 5B:
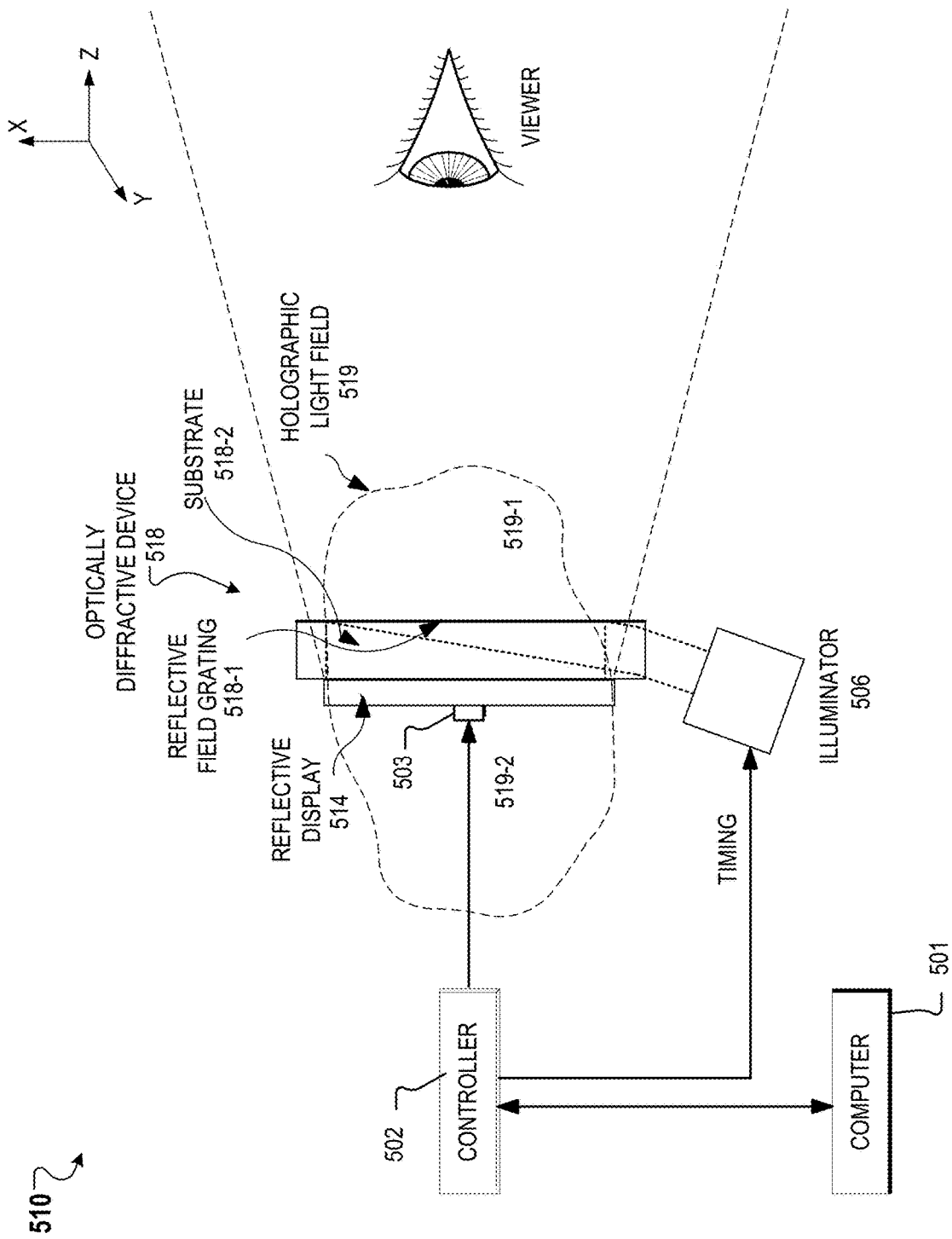
FIG. 5B illustrates another example system for 3D display including a reflective display with optically diffractive illumination.
Figure 5C:
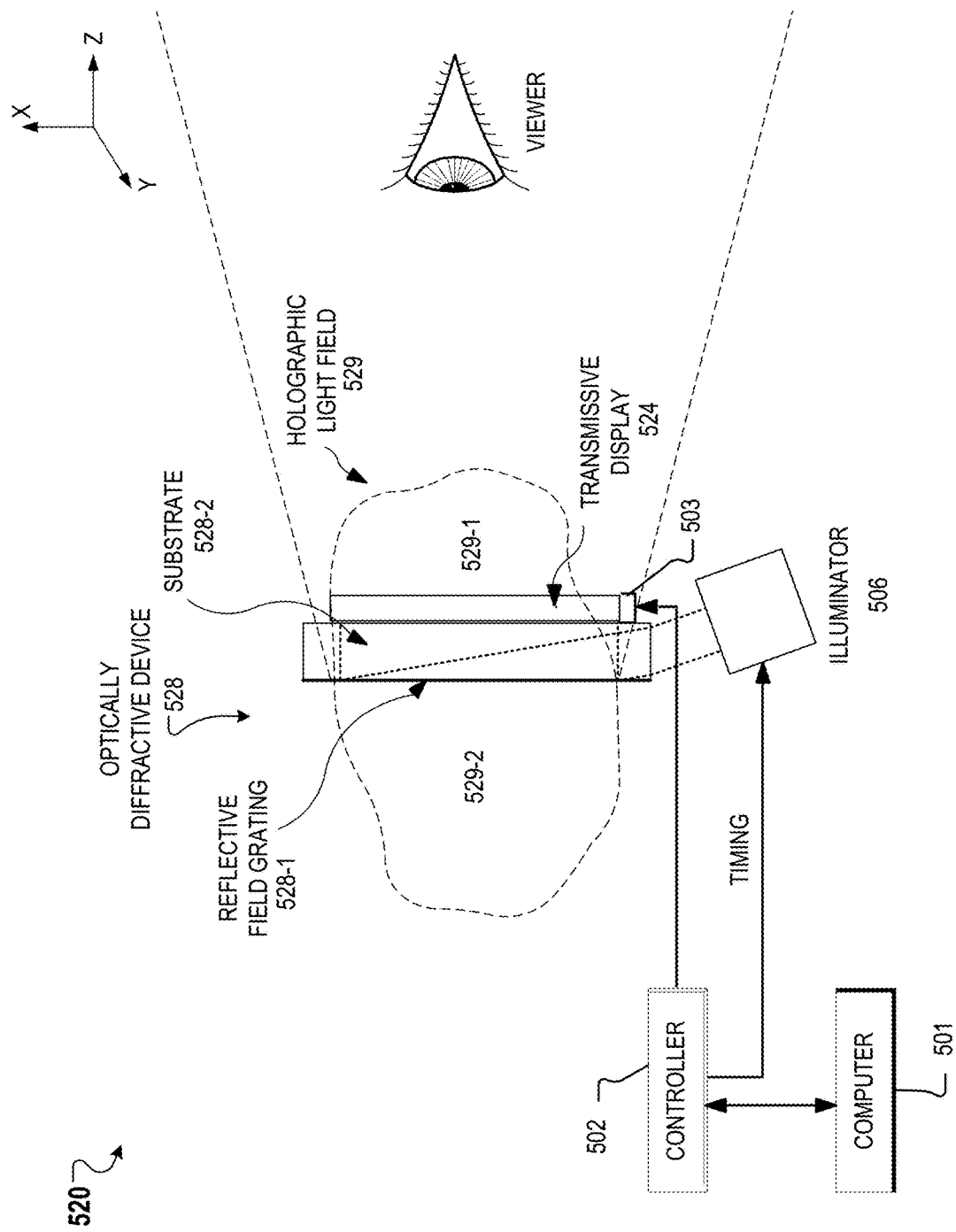
FIG. 5C illustrates another example system for 3D display including a transmissive display with optically diffractive illumination.
Figure 5D:
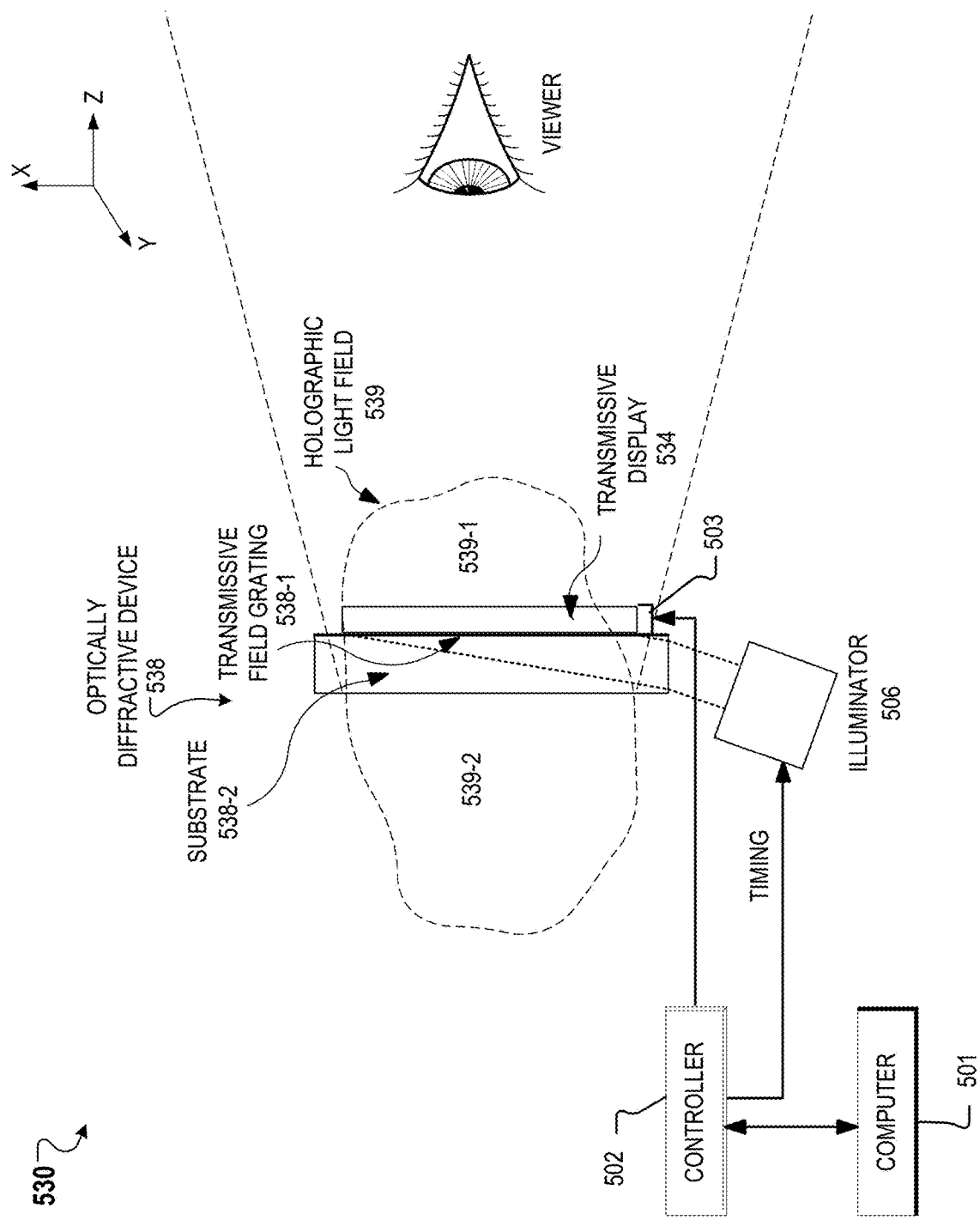
FIG. 5D illustrates another example system for 3D display including a transmissive display with optically diffractive illumination.

A system for 3D display can have a reflective display or transmissive display with front illumination, back illumination, waveguide illumination, or optically diffractive illumination. For illustration, FIGS. 5A-5D show implementations of example systems for 3D displays with optically diffractive illumination. Any one of the systems can correspond to, for example, the system 100 of FIG. 1A, the system 170 of FIG. 1B, or the system 200 of FIG. 2. FIGS. 5A and 5B show example systems having reflective displays with optically diffractive illumination using a transmissive grating structure (FIG. 5A) and a reflective grating structure (FIG. 5B). FIGS. 5C and 5D show example systems having transmissive displays with optically diffractive illumination using a reflective grating structure (FIG. 5C) and a transmissive grating structure (FIG. 5D).

FIG. 5A illustrates a system 500 for 3D display including a reflective display 504 with optically diffractive illumination, e.g., using an optically diffractive device 508. The optically diffractive device 508 can be considered as a lightguide (or a waveguide) device for guiding light. The optically diffractive device 508 can be a transmissive field grating based structure that can include one or more transmissive holographic gratings. The reflective display 504 can be the display 150 of FIG. 1A, the holographic display device 172 of FIG. 1B, the display 250 of FIG. 2. In some examples, the reflective display 504 is a reflective LCOS device.

A controller 502 can be configured to receive graphic data corresponding to one or more objects from a computer 501 (e.g., the computing device 110 of FIG. 1A or the computing device 220 of FIG. 2), perform computation on graphic data or process hologram data, and/or generate and transmit control signals for modulation to the display 504 through a memory buffer 503 (e.g., the memory 132 of FIG. 1A or the memory 232 of FIG. 2). The controller 502 can be also coupled to an illuminator 506 (e.g., the illuminator 140 of FIG. 1A or the illuminator 240 of FIG. 2) and be configured to provide a timing signal to activate the illuminator 506 to provide light. In some implementations, the controller 502 includes a processing device (e.g., the processing device 120 of FIG. 1A or the processor 224 of FIG. 2) and a driving device (e.g., the driving device 131 of FIG. 1A or 231 of FIG. 2). In some implementations, the controller 502 includes the driving device, and the processing device is integrated in the computer 501.

The light is diffracted by the optically diffractive device 508 to be incident on the display 504 and then diffracted by the display 504 to form a holographic light field 509 corresponding to the one or more objects. The display 504 can include a back mirror on the back of the display 504 and can reflect the light towards the viewer. The optically diffractive device 508 can be optically transparent. The illuminator 506 can be positioned below the display 504, which can allow the illuminator 506 to be mounted or housed with other components of the system 500 and to be below an eyeline of the viewer.

Bragg selectivity allows off-axis illumination light to be diffracted from the optically diffractive device 508 towards the display 504 while the returning light diffracted from the display 504 can be close to on axis and hence be off-Bragg to the gratings in the optically diffractive device 508 and hence can pass through the optically diffractive device 508 almost perfectly to the viewer without being diffracted again by the gratings in the optically diffractive device 508. In some implementations, the light from the illuminator 506 can be incident on the optically diffractive device 508 with a large incident angle from a side of the display 504, such that the illuminator 506 does not block the viewer's view and is not intrusive into the holographic light field 509. The incident angle can be a positive angle or a negative angle with respect to a normal line of the display 504. For illustration, the incident angle is presented as a positive angle. For example, the incident angle can be in a range from 70 degrees to 90 degrees, e.g., in a range from 80 degrees to 90 degrees. In a particular example, the incident angle is 84 degrees. The diffracted light from the optically diffractive device 508 can be diffracted at close to normal incidence into the display 504, such that the light can uniformly illuminate the display 504 and can be diffracted back nearnormally through the optically diffractive device 508 to the viewer's eyes with minimized power loss due to undesired reflections, diffractions, and/or scatterings within or at the surfaces of the optically diffractive device 508. In some examples, the diffracted angle from the optically diffractive device 508 to the reflective display 504 can be in a range of −10° (or 10 degrees) to 10° (or 10 degrees), e.g., from −7° to 7°, or from 5° to 7°. In a particular example, the diffracted angle is 6°. In another example, the diffracted angle is 0°.

In some implementations, as illustrated in FIG. 5A, the optically diffractive device 508 is arranged in front of the reflective display 504, e.g., along the Z direction towards the viewer. The optically diffractive device 508 can include a field grating structure 508-1 positioned on a substrate 508-2. A back surface of the field grating structure 508-1 faces a front surface of the reflective display 504, and a front surface of the field grating structure 508-1 is attached to the substrate 508-2. The light from the illuminator 506 can be incident on the front surface of the field grating structure 508-1 through the substrate 508-2, e.g., from a side surface of the substrate 508-2. For example, the substrate 508-2 can have a wedged side surface, such that the light at a large incident angle can have less reflection loss.

If a diffraction efficiency of a diffractive structure, e.g., a holographic grating, is less than 100%, light incident at an incident angle can be diffracted by the diffractive structure into zero and first orders. Light of first order (or first order light) is diffracted by the diffractive structure at a diffracted angle towards the display to therein diffract again to reconstruct a holographic light field 509. The first order can be also called first diffraction order. Light in the zero order (or zero order light, or undiffracted light, or the undiffracted order) is undiffracted (or undeflected) by the diffractive structure and transmitted by the diffractive structure at an angle corresponding to the incident angle. The zero order light may cause an undesired effect such as a ghost image, e.g., when the zero order light is incident upon the reflective display 508-1 directly or subsequent to reflection off surfaces within the optically diffractive device 508.

To eliminate the undesired effect, the field grating structure 508-1 can be spaced from the display 504. In some implementations, a back surface of the field grating structure 508-1 is spaced from a front surface of the display 504 by a gap. The gap can have any suitable distance, e.g., 1 mm. The gap can be filled with air or any lower-refractive-index material to satisfy total internal reflection (TIR) on an interface. For example, air has a refractive index (e.g., n≈1.0) which is much smaller than that of a back layer of the field grating structure 508-1 (e.g., n≈1.5), and hence any residual light at the incident angle (e.g., >70°) can be totally internally reflected by the back surface of the field grating structure 508-1 when the incident angle is larger than a critical angle (e.g., ≈41.8° for n≈1.5). That is, the residual light at the incident angle cannot reach the reflective display 504 to cause the undesired effect. In some examples, at least one of the front surface of the reflective display 504 or the back surface of the field grating structure 508-1 is treated with an anti-reflection coating, which can substantially reduce a part of the holographic light field reflected from the reflective display 504 back towards the reflective display 504 from the back of the field grating structure 508-1 which otherwise could cause further ghost images. In some examples, the back surface of the field grating structure 508-1 can be protected by an additional layer, e.g., a glass layer.

In some implementations, instead of being spaced with a gap, the back surface of the field grating structure 508-1 can be attached to the front surface of the reflective display 504 using an intermediate layer. The intermediate layer can be an optically clear adhesive (OCA) layer with a refractive index substantially lower than that of the back layer of the field grating structure 508-1, such that total internal reflection (TIR) can occur and the residual zero order light can be totally reflected at the interface between the intermediate layer and the back layer of the field grating structure 508-1 back into the optically diffractive structure 508.

In some implementations, the field grating structure 508-1 and the display 504 can be separated with a gap so that any residual light cannot reach the display 504. The gap can be filled with any suitable transparent material, index-matching fluid, or OCA. In some implementations, the field grating structure 508-1 can be formed in a cover layer (e.g., a cover glass) of the display 504.

In some cases, to illuminate a whole surface of the reflective display 504 by light diffracted from an active area of the field grating structure 508-1, the active area of the field grating structure 508-1 can be no smaller than an area of the whole surface of the reflective display 504. In some implementations, the field grating structure 508-1 and the reflective display 504 have a rectangular shape with a height along the X direction and a width along the Y direction. The active area of the field grating structure 508-1 can have a height no smaller than a height of the reflective display 504 and a width no smaller than a width of the reflective display 504. If there is a substantial gap between the field grating structure 508-1 and the reflective display 504, the field grating structure 508-1 and the substrate 508-2 can be enlarged further so that an expanding cone (or frustrum) of light from the reflective display 504, e.g., the holographic light field 509, can be seen through the front of the optically diffractive device 508 over an entire vertical and horizontal field of view (around the +Z axis) of the holographic light field 509. The substrate 508-2 can be a little wider and higher than the field grating structure 508-1.

As light is incident on the field grating structure 508-1 at a substantially off-axis angle in a dimension, e.g., the Z direction, the light can be narrower by the cosine of the incidence angle in that dimension. The light from the illuminator 506 can have a narrow rectangular shape incident into the field grating structure 508-1 which can then expand the light to a large rectangular shape incident into the reflective display 504. One or more optical components, e.g., mirrors, prisms, optical slabs, and/or optical fillers, can be arranged between and within the illuminator 506, the optically diffractive structure 508, and the reflective display 504 to further expand the light and to filter its bandwidth. In some examples, the expanded light can have a beam area somewhat smaller than the active area of the reflective display 504, such that the edges and surrounding area of the illuminated area of the reflective display 504 are not noticeable in reflection or scatter towards the viewer. In some examples, the expanded light can have a beam area somewhat larger than the active area of the reflective display 504, such that the edges of the illuminated area of the reflective display 504 are fully illuminated even if the edges of the expanded light are not uniform, e.g., because of diffraction off masking edges.

In some implementations, the illuminator 506 can include one or more color light emitting elements, e.g., red, blue, or green color lasers(or LEDs), configured to emit light of corresponding colors. The optically diffractive device 508 can be configured to diffract a plurality of different colors of light at respective diffracted angles that are substantially identical to each other. Each of the respective diffracted angles can be in a range of 0° to =10°, e.g., substantially identical to 0°, + or −1°, + or −2°, + or −3°, + or −4°, + or −5°, + or −6°, + or −7°, + or −8°, + or −9°, or + or −10°.

In some implementations, the controller 502 is configured to sequentially modulate the display 504 with information associated with a plurality of colors of light in a series of time periods. For example, the information can include a series of color holograms or color images. The controller 502 can control the illuminator 506 to sequentially emit each of the plurality of colors of light to the optically diffractive device 508 during a respective time period of the series of time periods, such that each of the plurality of colors of light is diffracted by the optically diffractive device 508 to the reflective display 504 and diffracted by modulated display elements of the reflective display 504 to form a respective color three-dimensional holographic light field 509 corresponding to the object during the respective time period. Depending on temporal coherence-of vision effect in an eye of a viewer, the plurality of colors can be combined in the eye to give an appearance of full color. In some cases, the illuminator 506 is switched off among different light emitting elements during a state change of the display image (or holographic reconstruction) such as during black-insertion subframes between color subframes or during blanking or retrace periods of a video source or during LC rise, fall, or DC-balancing inversion transitions, or during system warm-up, or when the intended holographic light field is completely black, or during a calibration procedure, and is switched on when a valid image (or holographic reconstruction) is presented for a period of time. This can also rely on persistence of vision to make the image (or holographic reconstruction) appear stable and flicker-free.

If a part of the holographic light field 509 appears in front of the display 504, as illustrated by a light field 509-1 in FIG. 5A, that part of the holographic light field 509 is a real part of the reconstructed image or holographic reconstruction (also called a real image or a real holographic reconstruction). When a viewer sees a point of light in front of the display 504, there really is light being reflected from the display 504 to that point. If a part of the light field 509 appears to the viewer to be behind (or inside) the display 504, as illustrated by a light field 509-2 in FIG. 5A, that part of the holographic light field 509 is a virtual part of the reconstructed image or holographic reconstruction (also called a virtual image or a virtual holographic reconstruction). When the viewer sees a point of light which appears to be behind or inside the display 504, there is actually no light being diffracted from the display 504 to that virtual point: rather, part of the light diffracted from the display 504 appears to be originated at that virtual point.

The computer 501 and/or the controller 502 can be configured to adjust a computation (e.g., by equations) of the information (e.g., a two-dimensional hologram, image, or pattern) to be modulated in the display 504 to move the reconstructed holographic light field 509 back and forth along a direction (e.g., the Z direction) normal to the display 504. The computation can be based on a holographic rendering process. In some cases, the holographic light field 509 can be fully in front of the display 504. In some cases, the holographic light field 509 can appear to be all behind the display 504. In some cases, as illustrated in FIG. 5A, the holographic light field can have one part in front of the display 504, e.g., the real part 509-1, and another part appearing to be behind the display, e.g., the virtual part 509-2. That is, the light field 509 can appear to straddle a surface of the display 504, which can be called image planning.

The optically diffractive device 508 can be implemented in different configurations. In some implementations, the optically diffractive device 508 includes a holographic grating, e.g., a Bragg grating, for a particular color, and the holographic light field 509 can correspond to the particular color. In some implementations, the optically diffractive device 508 includes multiple holographic gratings for different colors in a single recording layer.

In some implementations, the field grating structure 508-1 of the optically diffractive device 508 includes multiple holographic gratings for different colors in different recording layers. A grating for a particular color can diffract not only light of the particular color, but also light of other colors, which can cause crosstalk among the different colors. In some examples, the field grating structure 508-1 of the optically diffractive device 508 can include multiple holographic gratings with one or more color-selective polarizers to suppress(e.g., eliminate or minimize) color crosstalk. In some examples, the field grating structure 508-1 of the optically diffractive device 508 can include multiple holographic gratings with one or more reflective layers for light of different colors incident at respective incident angles to suppress color crosstalk and zero order light. In some examples, the field grating structure 508-1 of the optically diffractive device 508 can include multiple holographic gratings with one or more color-selective polarizers, and one or more reflective layers to suppress color crosstalk and zero order diffraction. Each of the color-selective polarizers can be configured for a single color or multiple colors. Each of the reflective layers can be configured for a single color or multiple colors. In some implementations, example field grating structures are configured and performed as described in international application PCT/US2021/50271 entitled "DISPLAYING THREE-DIMENSIONAL OBJECTS" and filed on Sep. 14, 2021, which is commonly-owned and fully incorporated herein by reference.

To improve an effect of a reconstructed holographic scene and thus a performance of a display system, it is desirable to suppress(or even eliminate) display zero order light in the reconstructed holographic scene. The display zero order light can include any unwanted light from the display, e.g., light reflected/diffracted at gaps between display elements, reflected light from the display elements, or reflected light from a display cover on the display. In some implementations, the optically diffractive device 508 is configured to suppress display zero order light by at least one of: zero order light deviation, zero order light blocking, or zero order light redirection. In some implementations, example optically diffractive device 508 are configured and performed as described in international application PCT/US2021/50275 entitled "RECONSTRUCTING OBJECTS WITH DISPLAY ZERO ORDER LIGHT SUPPRESSION" and filed on Sep. 14, 2021, which is commonly-owned and fully incorporated herein by reference.

In some examples, for zero order light deviation, the field grating structure 508-1 the optically diffractive device 508 can be configured to couple input light to illuminate the display 504 at an incident angle larger than a half of a viewing angle of a reconstructed cone that forms the holographic scene. The display zero order light propagates away from the display 504 at a reflected angle identical to the incident angle. A hologram corresponding to the holographic scene can be preconfigured such that diffracted first order light propagates away from the display to form the reconstruction cone in a same way as that when the incident angle is 0°. Thus, the display zero order light is deviated from the reconstruction cone and accordingly the holographic scene.

In some examples, for zero order light blocking, display zero order light can be first deviated away from diffracted first order light according to the zero order light deviation and then blocked (or absorbed) by an optically blocking component (e.g., a metamaterial layer or an anisotropic optical element such as a louver film). The optically blocking component is configured to transmit a light beam having an angle smaller than a predetermined angle and block a light beam having an angle larger than the predetermined angle. The predetermined angle can be smaller than the incident angle of the input light and larger than a half of the viewing angle of the reconstruction cone. The optically blocking component can be formed on a side of the optically diffractive device 508 that is opposite to the field grating structure 508-1.

In some examples, for zero order light redirection, display zero order light can be first deviated away from diffracted first order light according to the zero order light deviation and then redirected even further away from the diffracted first order light by a redirecting grating structure 508-3 in the optically diffractive device 508. When the input light includes different colors of light simultaneously or sequentially, the optically diffractive component can include one or more corresponding diffractive gratings that are configured to diffract the different colors of light towards different directions in a plane or in space to reduce color crosstalk among the different colors of light. The redirecting grating structure 508-3 can be formed on a side of the substrate 508-2 that is opposite to the field grating structure 508-1.

FIG. 5B illustrates another system 510 for 3D display including a reflective display 514 with optically diffractive illumination, e.g., using an optically diffractive device 518. The reflective display 514 can be similar to, or same as, the reflective display 504 of FIG. 5A. Different from the optically diffractive device 508 of the system 500 of FIG. 5A, the optically diffractive device 518 of the system 510 can have a reflective field grating based structure that can include a reflective field grating structure 518-1 and a substrate 518-2. The substrate 518-2 can be a glass substrate. The reflective field grating structure 518-1 can include one or more reflective holographic gratings for one or more different colors. The reflective field grating structure 518-1 is arranged on a front surface of the substrate 518-2, e.g., along Z direction. An illuminator 506 is arranged behind the reflective field grating structure 518-1 and configured to illuminate light on the reflective field grating structure 518-1 at a large incident angle. The light is diffracted back (along-Z direction) to the reflective display 514 that further diffracts the light back through the optically diffractive device 518 to form a holographic light field 519. The holographic light field 519 can be similar to, or same as, the holographic light field 509 of FIG. 5A, and can include a real holographic reconstruction 519-1 (e.g., 509-1 of FIG. 5A) and a virtual holographic reconstruction 519-2 (e.g., 509-2 of FIG. 5A). In some implementations, the optically diffractive device 518 also includes a redirecting grating structure (e.g., redirecting grating structure 508-3 of FIG. 5A) for display zero order suppression. For example, the redirecting grating structure can be formed on a side of the field grating structure 518-1 that is away from the reflective display 514, e.g., by attaching the redirecting grating structure to the field grating structure 518-1 using an adhesive material with a low refractive index, such that: i) light diffracted by the field grating structure 518-1 is reflected back by an interface between the field grating structure 518-1 and the adhesive material to the reflective display 514, and ii) light diffracted by the reflective display 514 is transmitted through the adhesive material to the redirecting grating structure.

FIG. 5C illustrates another system 520 for 3D display including a transmissive display 524 with optically diffractive illumination, e.g., using an optically diffractive device 528. Similar to the optically diffractive structure 518 of FIG. 5B, the optically diffractive structure 528 can be a reflective field grating based structure that can include a reflective field grating structure 528-1 and a substrate 528-2. The substrate 528-2 can be a glass substrate. The reflective field grating structure 528-1 can include one or more reflective holographic gratings for one or more different colors. Different from the optically diffractive structure 518 of FIG. 5B, the reflective field grating structure 528-1 in the optically diffractive structure 528 is arranged on a back surface of the substrate 528-2. An illuminator 506 is arranged before the reflective field grating structure 528-1 and configured to illuminate light on the reflective field grating structure 528-1 at a large incident angle. The light is diffracted back (along-Z direction) to the transmissive display 524 that further diffracts the light to form a holographic light field 529. The holographic light field 529 can be similar to, or same as, the holographic light field 509 of FIG. 5A, and can include a real holographic reconstruction 529-1 (e.g., 509-1 of FIG. 5A) and a virtual holographic reconstruction 529-2 (e.g., 509-2 of FIG. 5A). In some implementations, the optically diffractive device 528 also includes a redirecting grating structure (e.g., redirecting grating structure 508-3 of FIG. 5A) for display zero order suppression.

FIG. 5D illustrates another system 530 for 3D display including a transmissive display 534 with optically diffractive illumination, e.g., using an optically diffractive device 538. The transmissive display 534 can be the same as the transmissive display 524 of FIG. 5C. Similar to the optically diffractive structure 508 of FIG. 5A, the optically diffractive structure 538 can be a transmissive field grating based structure that can include a transmissive field grating structure 538-1 and a substrate 538-2. The substrate 538-2 can be a glass substrate. The transmissive field grating structure 538-1 can include one or more transmissive holographic gratings for one or more different colors. Different from the optically diffractive structure 508 of FIG. 5A, the transmissive field grating structure 538-1 in the optically diffractive structure 538 is arranged on a front surface of the substrate 538-2. An illuminator 506 is arranged behind the transmissive field grating structure 538-1 and configured to illuminate light on the transmissive field grating structure 538-1 at a large incident angle. The light is diffracted forward (along +Z direction) to the transmissive display 534 that further diffracts the light to form a holographic light field 539. The holographic light field 539 can be similar to, or same as, the holographic light field 509 of FIG. 5A, and can include a real holographic reconstruction 539-1 (e.g., 509-1 of FIG. 5A) and a virtual holographic reconstruction 539-2 (e.g., 509-2 of FIG. 5A). In some implementations, the optically diffractive device 538 also includes a redirecting grating structure (e.g., redirecting grating structure 508-3 of FIG. 5A) for display zero order suppression.

6. Example Irregular Displays

In a display (e.g., an LCOS device), a circuit chip, e.g., a complementary metal-oxide-semiconductor (CMOS) chip or equivalent, controls the voltage on reflective metal electrodes buried below the chip surface, each controlling one phasel (or display element). A common electrode for all the phasels is supplied by a transparent conductive layer made of indium tin oxide on the cover glass. In some examples, a chip can have 1024×768 plates, each with an independently addressable voltage. The phasels can have identical sizes and same shape (e.g., square). When the phasel gap becomes comparable to the incident light wavelength, diffraction effect can appear in the periodic structure of the display, which may cause severe light loss.

In some implementations, e.g., as illustrated in FIG. 6A, a display 600 includes a number of nonuniform (or irregular) phasels 602. The nonuniform shapes of the phasels 602 can greatly reduce or eliminate diffractive aberrations, among other effects and thus improve image quality. The plurality of phasels 602 can form an irregular pattern. In some implementations, the irregular pattern includes a Voronoi pattern. In some implementations, the irregular pattern includes a HOLOCHROME® (or HOLOCHROME™) pattern. At least two phasels 602 in the display 600 have different shapes. For example, adjacent phasels 602 can have different shapes. In some examples, at least one phasel 602 has an irregular polygon shape.

In some cases, a gap between adjacent phasels of the display 600 is smaller than a wavelength of an incident light, which may mitigate light loss between the adjacent phasels. In some examples, the wavelength of the incident light is about 450 nm (e.g., for blue color), about 530 nm (e.g., for green color of light), or about 630 nm (e.g., for red color of light), while the gap can be about 200 nm. In some cases, a size distribution of the plurality of phasels 602 of the display 600 can be around a value that is identical to a spatial frequency response of the display 600, e.g., 3 µm. A size of a phasel can be referred to a maximum width of the phasel.

In some implementations, each phasel 602 encloses a corresponding spaced point 604. As illustrated in FIG. 6A, the corresponding spaced point 604 can be in a random position within a shape of the phasel 602, e.g., at a center or at an edge of the phasel 602. The phasels 602 can be designed and/or fabrication based on the spaced points 604. In some implementations, the based points 604 form an irregular pattern. The irregular pattern of the spaced points 604 can be same as or different from the irregular pattern of the phasels 602.

In some implementations, although shapes and/or areas of the phasels 602 form an irregular pattern, the spaced points 604 can form a regular shape, e.g., a square shape. A distance between centers of adjacent based points 604 can be identical among the spaced points 604. For example, the spaced points 604 can be center points of phasels of a regular display. In such a way, the display 600 can be fabricated using a same backplane for the regular display. In some implementations, the spaced points 604 are regularly spaced with a first spacing period in a first region and with a second spacing period in a second region of the display 600. The second spacing period can be different from the first spacing period. In some embodiments, the spaced points 604 correspond to conductive vias that are electrically connected to a phasel driving circuitry.

As described herein, an irregular display (e.g., the display 600 of FIG. 6A) can be used as a display (e.g., the display 150 of FIG. 1A, the display device 172 of FIG. 1B, the display 250 of FIG. 2, the reflective display 504 of FIG. 5A, the reflective display 514 of FIG. 5B, the transmissive display 524 of FIG. 5C, the transmissive display 534 of FIG. 5D). The irregular display can be used in a system for 3D display (e.g., the system 100 of FIG. 1A, the system 170 of FIG. 1B, the system 200 of FIG. 2, the system 500 of FIG. 5A, the system 510 of FIG. 5B, the system 520 of FIG. 5C, the system 530 of FIG. 5D). The irregular display can be configured to reduce or eliminate diffraction effects, diffractive aberrations, aliasing, or among other effects, and thus improve the quality of reconstructed images, objects, or scenes.

In some implementations, an irregular display or irregular phasels as described herein can be also used for image or video capturing (or sen sing). For example, a device with an array of irregular pixels(e.g., irregular phasels 602 of FIG. 6A) can be implemented as a camera (e.g., a scene acquisition device 104 of FIG. 1A) or an optical sensor (e.g., the optical sensor 214 of FIG. 2) can be configured to capture interference patterns, images, or videos. The array of irregular pixels can form a photodiode array. The device can also include one or more other components, e.g., driving circuitry, optical lens, or color filters.

The irregular pixels can form an irregular pattern, e.g., a Voronoi pattern. The device with irregular pixels can reduce or eliminate a number of potential issues. For example, aliasing is a phenomenon where a digital camera has trouble translating an intricate pattern, which can be caused when digital information is broken down into pixels and bits and can result in a number of odd visual artifacts in images(or photos) or videos. A camera with irregular pixels can be configured to remove such aliasing issues(e.g., moiré or glitch problems/effects) in captured images or videos. Additionally or alternatively, the irregular pattern of the irregular pixels of the camera can get rid of unwanted regular diffraction that may appear due to regular pixels.

FIG. 6B illustrates an example 610 of designing an irregular display 630 based on a regular display 620. The regular display 620 includes an array of phasels 622 each having a center point 624 (shown as "o" symbol in FIG. 6B). The center point 624 can be a center point of a corresponding conductive via coupled to a display element to be formed. The regular display 620 can have a square shape, and each phasel 622 can also have a square shape. The center points 624 can also form a square shape.

In comparison, the irregular display 630 can be similar to, or same as, the irregular display 600 of FIG. 6A. The irregular display 630 includes a plurality of phasels 632 (e.g., the phasels 602 of FIG. 6A). Each phasel 632 has a respective point 634 (shown as solid dot "·" symbol in FIG. 6B) within the phasel 632. A shape of the phasel 632 can be generated based on the respective point 634 according to an irregular pattern (e.g., a Voronoi pattern). The respective point 634 can be referred to as a seed point (or seed center) of the phasel 632. In some examples, the phasel 632 has a polygon shape, and the respective point 634 is a polygon centroid of the phasel 632. In some examples, the respective point 634 is different from a polygon centroid of the phasel 632.

A number of the phasels 622 of the regular display 620 is identical to a number of the phasels 632 of the irregular display 630. Each phasel 632 can also enclose a corresponding center point 624 of the regular display 620 that has an offset 636 from the respective point 634 of the phasel 632. The offsets 636 for the phasels 632 can be different from each other, e.g., as illustrated in FIG. 6B. The respective points 634 of the phasels 632 can be irregularly positioned within an area of the irregular display 630. The irregular display 630 can have a larger area than the regular display 620. An outline of the irregular display 630 can be a regular shape, e.g., a rectangular or square shape.

As discussed above, in a system for holographically capturing and displaying a live scene in real time (e.g., the system 200 of FIG. 2), an optical sensor for capturing optical holograms (e.g., the optical sensor 214 of FIG. 2) and/or a display modulated with holograms for holographic reconstruction (e.g., the display 250 of FIG. 2) can be irregular.

In some implementations, a plurality of sen sing pixels of the optical sensor is regularly arranged in an active area of the optical sensor, and a plurality of display elements is irregularly arranged in the display (e.g., as shown in FIG. 6A-6B). The central points of the plurality of sen sing pixels are regularly spaced, and the centroids of the plurality of display elements of the display are irregularly spaced, e.g., as illustrated in FIGS. 6A-6B. The plurality of display elements can form an irregular pattern (e.g., a Voronoi pattern). The irregular pattern of the display can greatly reduce or eliminate diffractive aberrations, among other effects and thus improve image quality. The computing device can be configured to resample the regularly spaced center points of the plurality of sen sing pixels to match the irregularly spaced centroids of the plurality of display elements by determining a position of each centroid of the plurality of display elements based on a weighted sum of adjacent center points around the centroid using one or more weighting algorithms(e.g., Gaussian weighting or optimized Windowed-Sync weighting).

The computing device can sample regular spaced center points of a regular grid to calculate irregular spaced centroids of an irregular grid. As an example, weighted averages of four-adjacent regular points can be used to calculate a phase at an irregular position. As another example, a weighted sum of regular points around an irregular target point with a Gaussian or optimized Windowed-Sync weighting algorithm.

In some implementations, the computing device is configured to perform the resampling based on a predetermined relationship between regular center points of a regular display (e.g., the center points 624 of the regular display 620 of FIG. 6B) and corresponding seed points of the irregular display (e.g., the points 634 of the irregular display 630 of FIG. 6C) or centroids of the irregular display.

In some implementations, the plurality of sen sing pixels of the optical sensor is irregularly arranged in the active area of the optical sensor, and the plurality of display elements is irregularly arranged in the display. The central points of the plurality of sen sing pixels are irregularly spaced, and the centroids of the plurality of display elements of the display are irregularly spaced. An irregular pattern formed by the plurality of sen sing pixels can match an irregular pattern formed by the plurality of display elements.

7. Example Holographic Cues

As noted above, real-time holography may require reconstruction of a live scene at a rate of more than 15 frames per second, which can make the live scene continuous to human eye and brain. Besides time, the real-time holography may also need to contain 3 main holographic cues: occlusion, parallax, and accommodation. Systems disclosed herein (e.g., the system 100 of FIG. 1A or the system 200 of FIG. 2) can implement real-time holography.

Figure 7A:
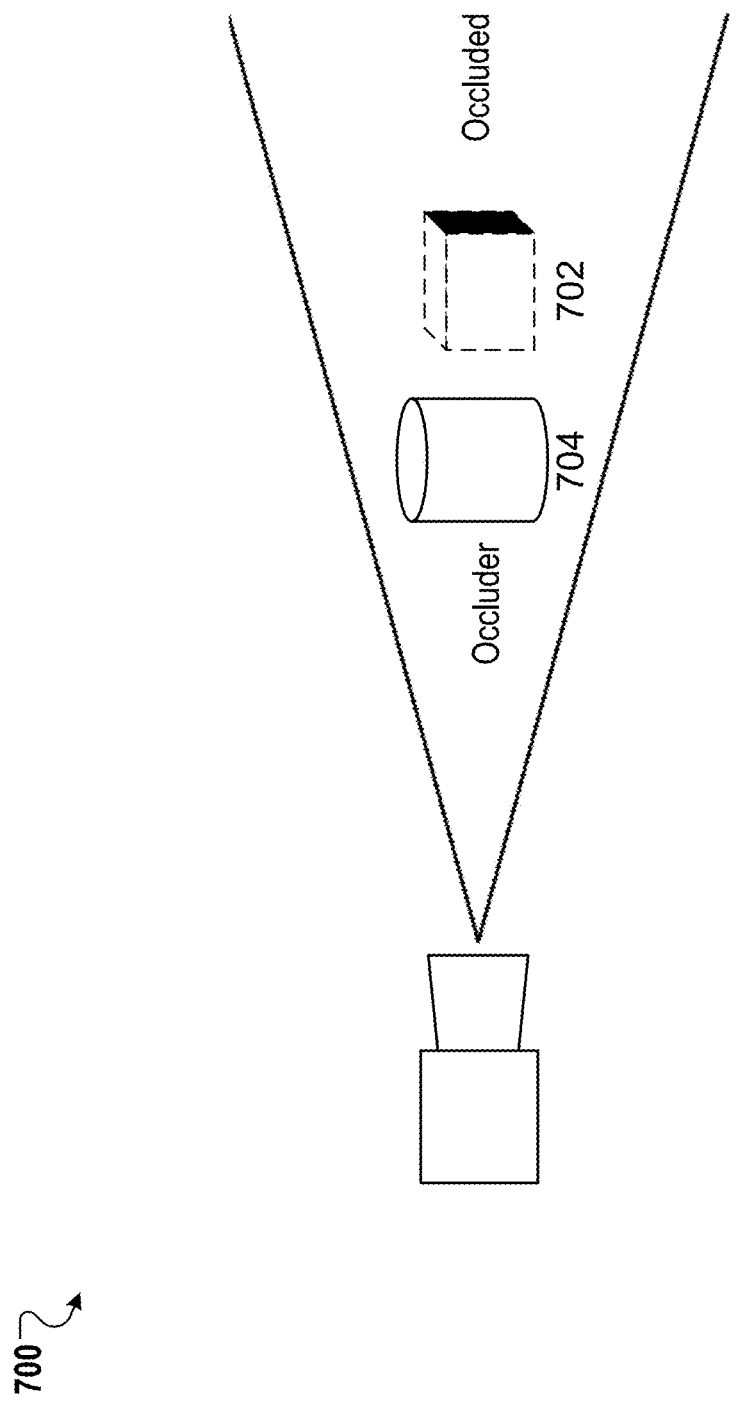
Figure 7B:
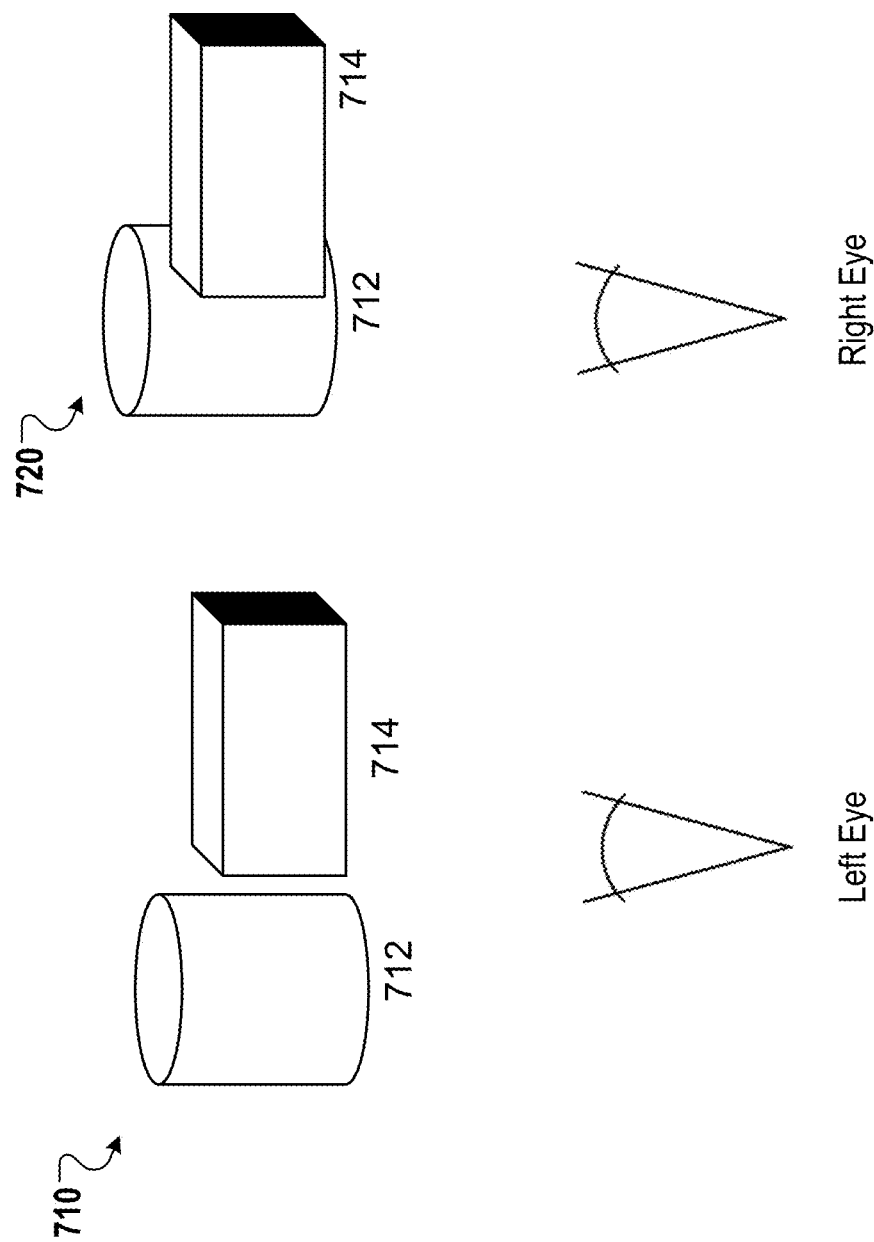

FIGS. 7A-7C illustrate example cues of holographically displaying objects, including occlusion (FIG. 7A), parallax (FIG. 7B), and accommodation (FIG. 7C).

As illustrated in diagram 700 of FIG. 7A, occlusion is a process whereby an occluded object 702 is hidden or obscured from prominence or view by an occluder 704. In holography, if a viewer changes viewing angles, the occlude object 702 may be visible from some viewing angles. In contrast, 2D screens don't have this feature, where it doesn't matter how a viewer looks at the images, a scene stays the same, and blocked objects remain blocked with changing viewing angles.

Parallax is a characteristic in which each eye sees a different perspective of objects in a scene. For example, in holography, as illustrated in FIG. 7B, a left eye sees a scene 710 where a cylinder-shaped object 712 is separated from a cuboid-shaped object 714 are separated from each other, while a right eye sees a different scene 720 where the cylinder-shaped object 712 and the cuboid-shaped object 714 overlap with each other. In contrast, in a 2D display, images are the same regardless of a viewing angle from the left eye or the right eye.

Accommodation is the feature where the eyes can feel depths of objects in a scene. For example, as illustrated in diagram 730 of FIG. 7C, a cylinder-shaped object 732 is positioned farther from an eye of a viewer than a cuboid-shaped object 734. In holography, a depth of the cylinder-shaped object 732 is greater than a depth of the cuboid-shaped object 734. In contrast, in a 2D display, the eye of the viewer stays focused on a surface of a 2D screen, and there is no depth information shown on the surface of the screen.

8. Example Processes

Figure 8A:
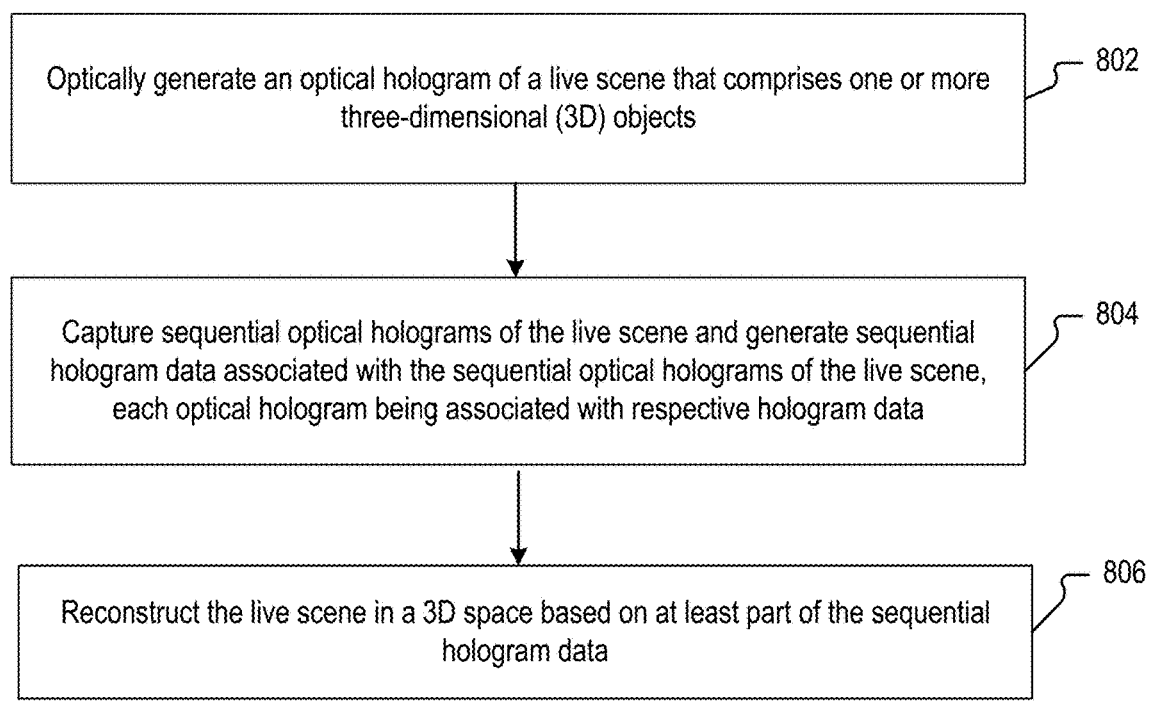
FIG. 8A is a flowchart of an example process of holographically displaying a live scene.

FIG. 8A is a flowchart of an example process 800 of holographically displaying a live scene. The process 800 can be performed by a system such as the system 200 of FIG. 2. The live scene can include one or more three-dimensional (3D) objects. The live scene can be a scene or event occurring in real world or real life, or in a physical space. The live scene can be captured and displayed by the system in real time.

In some implementations, the system includes a holographic capturing system (e.g., the holographic capturing system 210 of FIG. 2) and a holographic display system (e.g., the holographic display system 230 of FIG. 2). The holographic capturing system can include: an optical system (e.g., the optical system 212 of FIG. 2 or the holographic setup 300 of FIG. 3A, 300a of FIG. 3B, 300b of FIG. 3C, or 300c of FIG. 3D) and an optical sensor (e.g., the optical sensor 214 of FIG. 2, or 320 of FIGS. 3A-3D). In some implementations, the system further includes a computing device (e.g., the computing device 220 of FIG. 2) coupled between the holographic capturing system and the holographic display system.

At 802, the optical system optically generates an optical hologram of the live scene. At 804, the optical sensor captures sequential optical holograms of the live scene and generates sequential hologram data associated with the sequential optical holograms of the live scene. Each optical hologram can be associated with respective hologram data. At 806, the holographic display system reconstructs the live scene in a 3D space based on at least part of the sequential hologram data.

In some implementations, the computing device processes the at least part of the sequential hologram data to generate digital holograms(e.g., the hologram 226 of FIG. 2) associated with the live scene, and the holographic display system reconstructs the live scene in the 3D space based on the digital holograms. Each of the digital holograms can include an amplitude-like hologram, and the amplitude-like program can directly modulate a display (e.g., the display 250 of FIG. 2) of the holographic display system for holographic reconstruction of the live scene. The display can be phase modulated.

In some implementations, the optical sensor is a digital sensor (e.g., CCD or CMOS), and the sequential hologram data includes a stream of digital data. The digital data can include an array of data bits(e.g., 0 or 1).

In some implementations, the system includes a frame grabber (e.g., the frame grabber 216 of FIG. 2). The process 800 can further include: selecting respective hologram data of one or more optical holograms among the sequential optical holograms by the frame grabber. The computing device can generate the digital holograms associated with the live scene based on the selected respective hologram data of the one or more optical holograms.

In some implementations, the frame grabber includes a frame-buffer-based grabber configured to deposit the respective hologram data in a frame buffer of the frame grabber before transmitting for generating the digital holograms. In some implementations, the frame grabber includes a first in, first out (FIFO)-based grabber configured to transmit the respective hologram data directly for generating the digital holograms.

In some implementations, the computing device processes the at least part of the sequential hologram data to generate the digital holograms associated with the live scene based on at least one of a pitch of sen sing pixels of an optical sensor, a pitch of display elements of a display, a size of an active area of the optical sensor, or a size of the display. The pitch of the sen sing pixels can be associated with a resolution of a captured optical hologram and a capturable size of a scene, and the pitch of the display elements can be associated with an acceptable viewing angle of a reconstructed scene and the size of the display.

In some implementations, the computing device suppresses a mismatch between a captured optical hologram of the live scene and a reconstruction of the live scene. The mismatch can be associated with at least one of a difference between the pitch of the sen sing pixels and the pitch of the display elements, or a difference between the size of the active area of the optical sensor and the size of the display.

In some implementations, the computing device processes the at least part of the sequential hologram data to generate the digital holograms associated with the live scene by scaling a first digital hologram associated with a captured optical hologram based on a ratio between the pitch of the sen sing pixels and the pitch of the display elements, and/or adjusting the scaled first digital hologram to generate a second digital hologram to be modulated on the display based on the size of the display and the size of the hologram data.

In some implementations, the computing device scales the size of the first digital hologram associated with the captured optical hologram by using at least one of one or more interpolation algorithms comprising linear interpolation, nearest neighbor interpolation, cubic spline interpolation, shape-preserving interpolation, Biharomic interpolation, and thin-plate spline interpolation.

In some implementations, the computing device processes the at least part of the sequential hologram data to generate the digital holograms associated with the live scene by resampling a first digital hologram associated with a captured optical hologram to be a second digital hologram to be modulated on the display using Fourier transform and inverse Fourier transform, the first digital hologram being associated with the pitch of the sen sing pixels, the second digital hologram being associated with the pitch of the display elements.

In some implementations, e.g., as illustrated in FIG. 4B, the computing device resamples the first digital hologram associated with the captured optical hologram to be the second digital hologram to be modulated on the display by first performing the Fourier transform on the first digital hologram to generate a transformed first digital hologram. If the pitch of the sen sing pixels is smaller than the pitch of the display elements, the computing device crops the transformed first digital hologram based on a ratio between the pitch of the sen sing pixels and the pitch of the display element, then performing the inverse Fourier transform on the cropped transformed first digital hologram to obtain the second digital hologram.

In some implementations, e.g., as illustrated in FIG. 4A, the computing device resamples the first digital hologram associated with the captured optical hologram to be the second digital hologram to be modulated on the display by first performing the Fourier transform on the first digital hologram to generate a transformed first digital hologram, and if the pitch of the sen sing pixels is larger than the pitch of the display elements, performing zero-padding to the transformed first digital hologram based on a ratio between the pitch of the sen sing pixels and the pitch of the display element, then performing the inverse Fourier transform on the transformed first digital hologram with the added one or more zero-pads to obtain the second digital hologram.

In some implementations, resampling the first digital hologram associated with the captured optical hologram to be the second digital hologram to be modulated on the display includes: resampling the first digital hologram to be the second digital hologram by respectively resampling central points of the plurality of sen sing pixels of the optical sensor to match centroids of a plurality of display elements of the display.

In some implementations, the plurality of sen sing pixels of the optical sensor is regularly arranged in the active area of the optical sensor, and the plurality of display elements is regularly arranged in the display. The central points of the plurality of sen sing pixels are regularly spaced, and the centroids of the plurality of display elements of the display are regularly spaced.

In some implementations, the plurality of sen sing pixels of the optical sensor is regularly arranged in the active area of the optical sensor, and the plurality of display elements is irregularly arranged in the display (e.g., as illustrated in FIG. 6A or 6B). The central points of the plurality of sen sing pixels are regularly spaced, and the centroids of the plurality of display elements of the display are irregularly spaced. In some implementations, resampling the first digital hologram associated with the captured optical hologram to be the second digital hologram to be modulated on the display includes: resampling the regularly spaced center points of the plurality of sen sing pixels to match the irregularly spaced centroids of the plurality of display elements by determining a position of each centroid of the plurality of display elements based on a weighted sum of adjacent center points around the centroid using one or more weighting algorithms.

In some implementations, the plurality of sen sing pixels of the optical sensor is irregularly arranged in the active area of the optical sensor, and the plurality of display elements is irregularly arranged in the display. The central points of the plurality of sen sing pixels are irregularly spaced, and the centroids of the plurality of display elements of the display are irregularly spaced. An irregular pattern formed by the plurality of sen sing pixels can match an irregular pattern formed by the plurality of display elements.

In some implementations, the optical system forms an interference pattern by interfering an object beam (e.g., the object beam 303 of FIG. 3A-3D) interacting with the live scene with a reference beam (e.g., the reference beam 305 of FIG. 3A-3D). The object beam and the reference beam are coherent light beams, and the optical hologram includes the interference pattern. The optical sensor can directly capture the interference pattern on an active area of the optical sensor. The optical system can magnify or demagnify the object beam after interacting with the live scene to be compatible with the active area of the optical sensor.

In some implementations, the process 800 includes: dynamically adjusting a phase shift of one of the object beam and the reference beam before the interference pattern is formed, e.g., by a phase adjuster such as the phase adjuster 360 of FIG. 3D. The phase adjuster can include a phase shifter or a dynamic retarder. The phase adjuster can include a liquid crystal cell. The phase adjuster can be configured to dynamically adjusting the phase shift of the one of the object beam and the reference beam by sequentially adjusting the phase shift to be a series of predetermined values in a time period. The optical sensor can capture corresponding sequential optical holograms of the live scene in the time period.

The process 800 can further include: generating a digital hologram of the live scene with noise suppression based on the corresponding sequential optical holograms, e.g., by the computing device. The computing device can process the corresponding sequential optical holograms to obtain corresponding raw digital holograms, and perform one or more mathematical operations on the corresponding raw digital holograms to generate the digital hologram of the live scene. In some examples, the series of predetermined values for the phase shift comprises 0, pi/2, pi, 3pi/2, and the digital hologram is calculated based on an expression as follows: final_hologram=(hologram_0-hologram_pi)/(hologram_pi/2-hologram_3pi/2), where final_hologram represents the digital hologram, hologram_0 represents a first corresponding raw digital hologram based on a first corresponding optical hologram with 0 phase shift, hologram_pi/2 represents a second corresponding raw digital hologram based on a second corresponding optical hologram with pi/2 phase shift, hologram_pi represents a third corresponding raw digital hologram based on a third corresponding optical hologram with pi phase shift, and hologram_3pi/2 represents a fourth corresponding raw digital hologram based on a fourth corresponding optical hologram with 3pi/2 phase shift.

In some implementations, optically generating the optical hologram of the live scene includes: sequentially and alternatively emitting light with a plurality of colors to sequentially and alternatively generate optical holograms for the plurality of colors. Capturing the sequential optical holograms of the live scene can include: sequentially transmitting only light with an individual color, while blocking light with other colors.

In some implementations, optically generating the optical hologram of the live scene includes: emitting light with a plurality of colors simultaneously. Capturing the sequential optical holograms of the live scene can include: capturing the optical hologram by corresponding groups of adjacent sen sing pixels of a plurality of sen sing pixels of the optical sensor, with a color filter array (e.g., Bayer filter) arranged on the optical sensor. The color filter array can include groups of different color filters on the plurality of sen sing pixels of the optical sensor, the different color filters being associated with the plurality of colors, each group of the different color filters being arranged on a corresponding group of adjacent sen sing pixels of the plurality of sen sing pixels. Generating sequential hologram data associated with the sequential optical holograms of the live scene can include: determining hologram data for each of the plurality of colors based on the optical hologram.

In some implementations, the process 800 further includes: generating digital holograms for the plurality of colors based on the optical hologram, and reconstructing the live scene in a 3D space based on at least part of the hologram data includes: reconstructing the live scene in the 3D space based on the digital holograms.

In some implementations, reconstructing the live scene in a 3D space based on at least part of the hologram data includes: generating control signals for a plurality of display elements of the display based on a digital hologram associated with the live scene, and modulate the plurality of display elements of the display based on the control signals.

In some implementations, the process further includes: generating digital holograms associated with the live scene based on the at least part of the sequential hologram data. The digital holograms can include a series of groups of digital holograms for a plurality of colors.

In some implementations, reconstructing the live scene in a 3D space based on at least part of the hologram data includes: sequentially modulating the display with a first digital hologram for a first color during a first time period and modulating the display with a second digital hologram for a second color during a second, sequential time period, and sequentially turning on a first light emitting element to emit light with the first color during the first time period and a second light emitting element to emit light with the second color during the second, sequential time period.

Figure 8B:
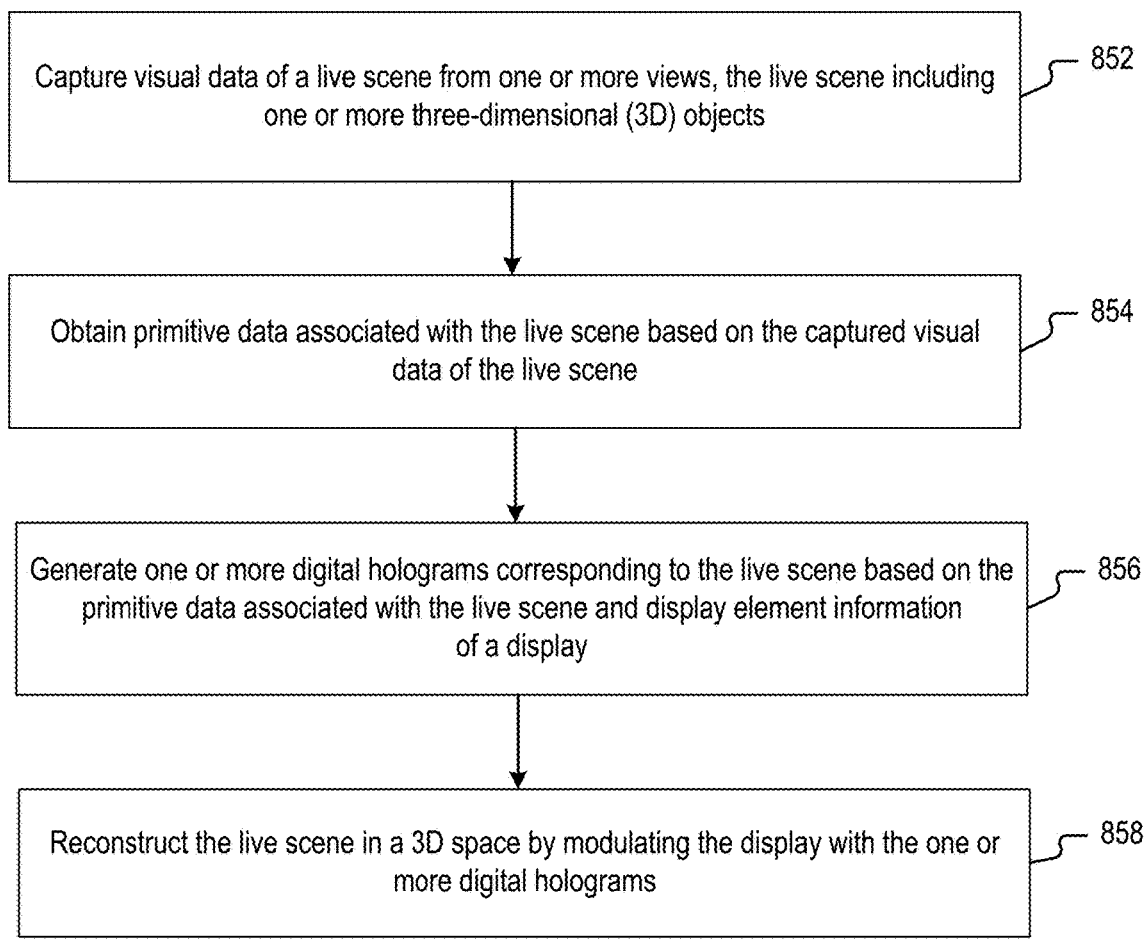
FIG. 8B is a flowchart of another example process of holographically displaying a live scene.

FIG. 8B is a flowchart of another example process 850 of holographically displaying a live scene. The process 850 can be performed by a system such as the system 100 of FIG. 1A. The live scene can include one or more three-dimensional (3D) objects. The live scene can be a scene or event occurring in real world or real life, or in a physical space. The live scene can be captured and displayed by the system in real time.

In some implementations, the system includes a hologram generation system (e.g., the hologram generation system 101 of FIG. 1A) configured to generate one or more digital holograms corresponding to the live scene and a holographic display system (e.g., the holographic display system 130 of FIG. 1A) configured to reconstruct the live scene in a 3D space based on the one or more digital holograms. The hologram generation system can include one or more scene acquisition devices(e.g., 104 of FIG. 1A) and a computing system (e.g., 103 of FIG. 1A). The computing system can include a computing device (e.g., the computing device 110 of FIG. 1A) coupled to the one or more scene acquisition devices and a processing device (e.g., the processing device 120 of FIG. 1A) coupled to the computing device.

At 852, visual data of the live scene is captured from one or more views, e.g., by the one or more scene acquisition devices. At 854, primitive data associated with the live scene is obtained based on the captured visual data of the live scene (e.g., by the computing device). At 856, a digital hologram (e.g., the hologram 127 of FIG. 1A) corresponding to the live scene is generated (e.g., by the processing device) based on the primitive data associated with the live scene and display element information of a display (e.g., the display 150 of FIG. 1A) of the holographic display system. At 858, the live scene is reconstructed in a 3D space by modulating the display with the one or more digital holograms, e.g., by the holographic display system.

In some implementations, obtaining the primitive data associated with the live scene based on the captured visual data of the live scene includes: generating a 3D representation of the live scene based on the captured visual data of the live scene, and obtaining primitive data of the 3D representation of the live scene based on the 3D representation of the live scene, e.g., by the computing device. The primitive data associated with the live scene includes the primitive data of the 3D representation of the live scene. The 3D presentation of the live scene can be generated by processing the captured visual data of the live scene using a 3D rendering algorithm (e.g., NeRF).

In some implementations, the process 850 includes: generating sequential visual data of the live scene in a time period (e.g., by the one or more scene acquisition devices), the sequential visual data including first visual data and second visual data sequential to the first visual data; generating a first 3D representation of the live scene based on the first visual data of the live scene using the 3D rendering algorithm, and generating a second 3D representation of the live scene by updating the first 3D representation of the live scene based on a difference between the first visual data and the second visual data using the 3D rendering algorithm.

In some implementations, obtaining the primitive data of the 3D representation of the live scene based on the 3D representation of the live scene includes: loading the 3D representation of the live scene into a 3D simulation application (e.g., Unity), and obtaining the primitive data of the 3D representation of the live scene based on an output of the 3D simulation application that is associated with the 3D representation of the live scene.

In some implementations, the primitive data of the 3D representation of the live scene includes: data of a plurality of primitives corresponding to the 3D representation of the live scene, the data comprising primitive data of each primitive of the plurality of primitives, a primitive comprising at least one vertex, primitive data of the primitive comprising data of the at least one vertex. The primitive data of the primitive can include at least one of: a primitive identifier of the primitive, at least one vertex identifier of the at least one vertex, coordinate information of the primitive in a 3D coordinate system, color information of the primitive, texture coordinate information of the primitive, shading information for the primitive, viewpoint dependent shading information associated with the primitive, or occlusion information of the primitive.

In some implementations, generating the one or more digital holograms corresponding to the live scene includes: for each primitive of the plurality of primitives, determining an electromagnetic (EM) field contribution to each of a plurality of display elements of the display based on primitive data of the primitive; and for each of the plurality of display elements of the display, generating a sum of the EM field contributions of the plurality of primitives to the display element. A digital hologram can include the sums of the EM field contributions for the plurality of display elements of the display.

In some implementations, the process 850 further includes: for each of a plurality of vertices of the plurality of primitives, associating a respective vertex identifier of the vertex with respective vertex data of the vertex, and storing the association between the respective vertex identifier and the respective vertex data of the vertex in a memory; and for each of the plurality of primitives, associating a respective primitive identifier of the primitive with one or more respective vertex identifiers of one or more vertices of the primitive in the memory, and storing an association between the respective primitive identifier and the one or more respective vertex identifiers for the primitive in the memory.

In some implementations, the process 850 further includes: determining primitive identifiers of multiple primitives associated with a command instruction, determining vertex identifiers associated with the primitive identifiers; and generating a command including the command instruction, the vertex identifiers associated with the primitive identifiers, and the primitive identifiers of the multiple primitives. The command indicates drawing the multiple primitives according to the command instruction and based on at least one of the primitive identifiers of the multiple primitives or the vertex identifiers associated with the primitive identifiers.

In some implementations, the process 850 includes: processing the command to obtain primitive data of the multiple primitives based on the command; calculating an electromagnetic (EM) field contribution of each of the multiple primitives to each of the plurality of display elements based on the primitive data of the multiple primitives; and accumulating EM field contributions of the multiple primitives to each of the plurality of display elements.

In some implementations, reconstructing the live scene in a 3D space by modulating the display with the one or more digital holograms includes: generating modulation control signals for a plurality of display elements of the display based on a digital hologram corresponding to the live scene. The digital hologram can be a complex-valued hologram, and the process 850 can include: converting the complex-valued hologram to a phase-only hologram, and generating the respective modulation control signals for the plurality of display elements based on the phase-only hologram.

In some implementations, reconstructing the live scene in a 3D space by modulating the display with the one or more digital holograms includes: transmitting an illumination control signal to an illuminator (e.g., the illuminator 140 of FIG. 1A) to activate the illuminator to illuminate light on the display such that the light is caused by modulated display elements of the display to form a volumetric light field corresponding to the live scene, and outputting the respective modulation control signal to each display element of the plurality of display elements, in coordination with transmitting the illumination control signal to the illuminator.

In some implementations, reconstructing the live scene in a 3D space by modulating the display with the one or more digital holograms includes: sequentially outputting a first modulation control signal to modulate the display with information associated with a first color during a first time period, and a second modulation control signal to modulate the display with information associated with a second color during a second, sequential time period; and sequentially outputting a first illumination control signal to activate the illuminator to turn on a first light emitting element to emit light with a first color during the first time period, and a second illumination control signal to activate the illuminator to turn on a second light emitting element to emit light with the second color during the second time period.

In some implementations, the process 850 includes: generating sequential digital holograms corresponding to the live scene based on captured sequential visual data of the live scene and continuously reconstructing the live scene in the 3D space based on the sequential digital holograms.

9. Example Applications

Systems, methods, and techniques implemented herein can be applied to any suitable applications.

For example, a system (e.g., the system 100 of FIG. 1A or the system 200 of FIG. 2) can be used to holographically display a live scene, for example, holographically broadcasting a live game, such as a soccer game as discussed above.

As another example, a system (e.g., the system 100 of FIG. 1A or the system 200 of FIG. 2) can be used to holographically display moving objects. One or more objects can be put on a rotating stage. As the rotating stage rotates, optical holograms or scene data of the rotating objects can be captured and then reconstructed by a holographic display simultaneously.

As another example, a system (e.g., the system 100 of FIG. 1A or the system 200 of FIG. 2) can make holographic stop-motion animations. Stop motion is an animated filmmaking technique in which objects are physically manipulated in small increments between individually photographed frames so that the objects appear to exhibit independent motion or change when the series of frames is played back.

As another example, a system (e.g., the system 100 of FIG. 1A or the system 200 of FIG. 2) can capture scenes with optical effects. One can add optical effects in the scene like introducing prisms or mirrors and create artistic holographic scenes.

As another example, systems can be implemented for precise optical measurements, e.g., for a geometry of an element such as an angle of an object (e.g., a wedge cell), a refractive index of a substance or medium, or surface roughness of an uneven surface. For example, the substance can be liquid crystal molecular cells of a display, e.g., the display 600 of FIG. 6A.

Figure 9:
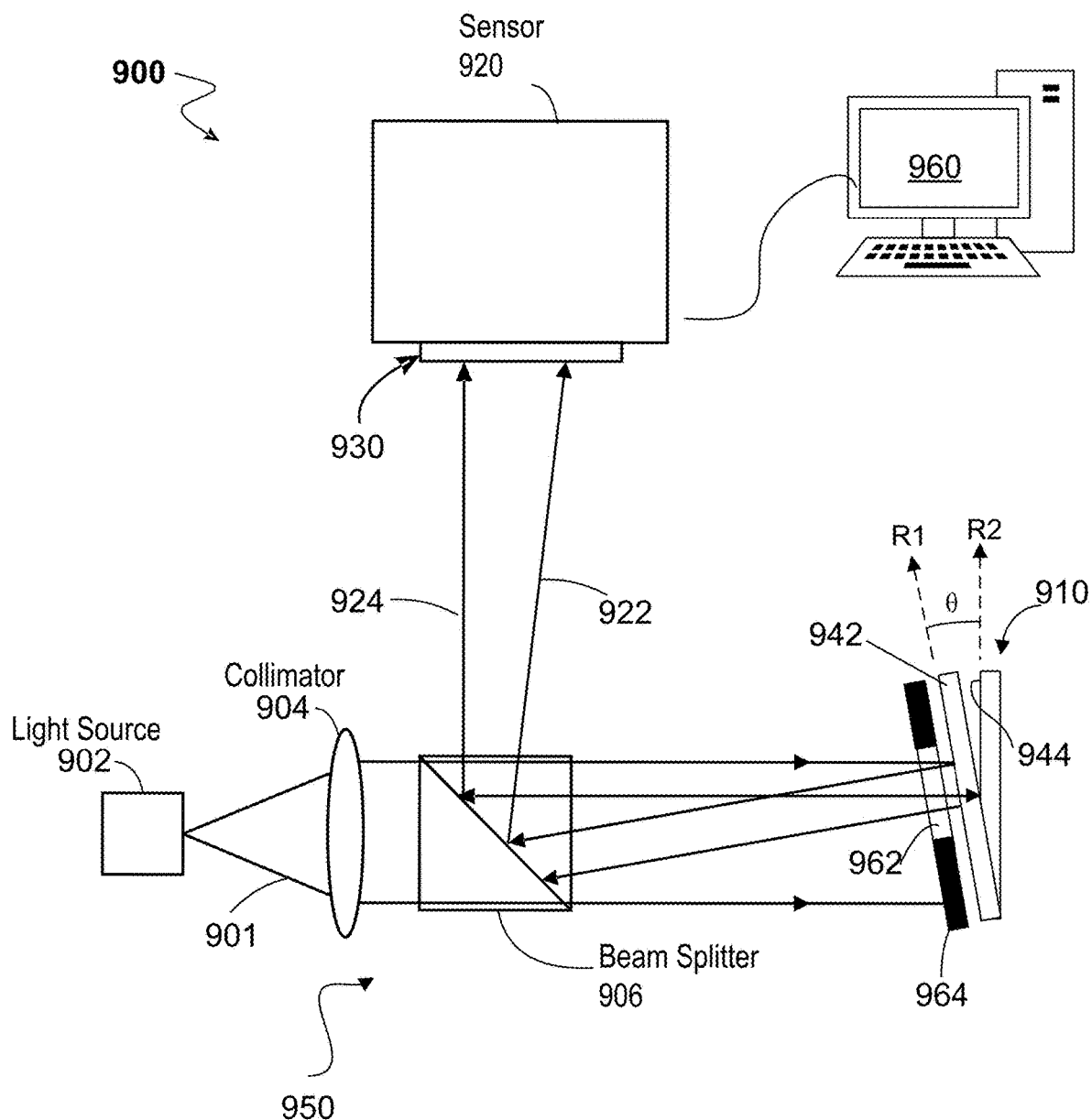
FIG. 9 illustrates an example system for measuring an angle of an object and/or a refractive index of a medium filled in the object.

FIG. 9 illustrates an example system 900 for measuring an angle of an object and/or a refractive index of a medium filled in the object. The system 900 includes an optical system 950 configured to guide light onto an object 910. The object 910 (e.g., a wedge cell) includes a first surface 942 extending along a first direction R1 and a second surface 944 extending along a second direction R2. The second direction R2 is different from the first direction R1 with an intersecting angle θ. Additional details about the object 910 are provided below with reference to FIGS. 15A and 15B.

In some implementations, the optical system 950 includes a light source 902 (e.g., a laser source), a collimator 904 and a beam splitter 906. The light source 902, can be, e.g., the light source 302 of FIGS. 3A-3D. The collimator 904 can be, e.g., the collimator 304 of FIGS. 3A-3D. The beam splitter 906 can be, e.g., the beam splitter 306 of FIGS. 3A-3D. The light source 902 can be configured to emit a coherent light beam 901. The coherent light beam 901 can be collimated using the collimator 904 (e.g., an optical lens) onto the beam splitter 906. At least a part of the collimated light beam 901 passes through the beam splitter 906 to reach the object 910.

The system 900 can further include an optical sensor 920 configured to capture an interference pattern 930 between first light 922 reflected from the first surface 942 and second light 924 reflected from the second surface 944. The beam splitter 906 is arranged in a path of the first light 922 and the second light 924 and configured to reflect at least a part of the first light 922 and the second light 924 onto the optical sensor 920. The optical sensor 920 can be similar to, or same as, the optical sensor 214 of FIG. 2, or the optical sensor 320 of FIGS. 3A-3D. In some implementations, the optical sensor 920 is configured to directly capture the interference pattern on an active area of the optical sensor 920. The optical sensor 920 can be a digital optical camera (e.g., CCD or CMOS) configured to record the interference pattern 930 as an array of data bits. In some implementations, there is no optical lens on an optical path of the first light 922 and the second light 924 between the beam splitter 906 and the optical sensor 920. An optical lens before the optical sensor 920 and/or before the interference pattern 930 may distort the angles and measurements of the interference pattern 930.

In some implementations, the optical system 950 further includes a mask 964 positioned in the path of the light between the beam splitter 906 and the object 910. The mask 964 has an aperture 962 and is configured to guide the light onto a selected portion of the object 910 through the aperture 962. In some cases, the surfaces of the object 910 are not perfectly planar, and warp slightly. This may contribute to the smearing of the peak in Fourier space (as discussed in detail below). By exposing only a portion of the object 910 using the mask 964 with the aperture 962, the angle θ between the two surfaces 942, 944 may be determined with more precision in the exposed region.

In some implementations, the system 900 includes a computing system 960 that can be coupled to the optical sensor 920 and receive data from the optical sensor 920. The data can be associated with the captured interference pattern 930. The computing system 960 is configured to process the data to determine an angle θ between the first direction R1 and the second direction R2 based on a result of Fourier transform of the captured interference pattern 930, e.g., as described with further details below in reference to FIGS. 11-14C.

FIGS. 10A-10C illustrate diagrams of various stages showing how light propagates through the example system 900 of FIG. 9. FIG. 10A illustrates that an incident light beam 1002 is emitted and collimated onto the beam splitter 906, and from there at least a part of the incident light beam 1002 passes through the beam splitter 906 and reaches the object 910. FIG. 10B illustrates that a first light beam 922 is reflected from the first surface 942 of the object 910, and a second light beam 924 is reflected from the second surface 944 of the object 910. As the first surface 942 and the second surface 944 has an intersecting angle θ, the first light beam 922 travels at an angle γ relative to the second light beam 924.

FIG. 10C illustrates an angle between the propagation directions of the first light beam 922 and the second light beam 924. The angle (e.g., γ) between the first light 922 and the second light 924 can be about twice the angle (e.g., θ) between the first surface 942 and the second surface 944 of the object 910 (also called wedge 910 as an example in the present disclosure), when the object 910 is filled with air in the space 1004 between the first surface 942 and the second surface 944. This angle γ creates an optical path difference between the first light beam 922 and the second light beam 924 when they meet at the same position or plane (e.g., at the beam splitter 906, at the optical sensor 920). As described below with further detail in reference to FIGS. 11-14C, the optical path difference is spatially dependent, leading to a fringe pattern (e.g., the interference pattern 930) on the beam splitter 906 and/or the optical sensor 920. By recording the fringe pattern (with an optical sensor 920), the fringe density may be determined. As the fringe density relates, geometrically, to the original wedge angle (e.g., θ) in the object 910, the wedge angle of the object 910 can thus be determined. In addition, the angle between the first light beam 922 and the second light beam 924 can be also dependent on a refractive index of the medium that is filled within the space 1004 of the wedge 910, thereby influencing the fringe density of the fringe pattern. By measuring the fringe pattern from the object 910 with and without a target medium (e.g., liquid crystal cells), the refractive index of the target medium can be determined, e.g., entirely using the system 900 of FIG. 9.

In some implementations, the diagonal angle α of the beam splitter 906's mirror 1010 (e.g., as illustrated in FIG. 10B) does not affect the phase difference measured on the optical sensor 920. This is because the sum of the distance to the object 910 and distance to the optical sensor 920 can be constant for all points along the diagonal mirror 1010.

Figure 11:
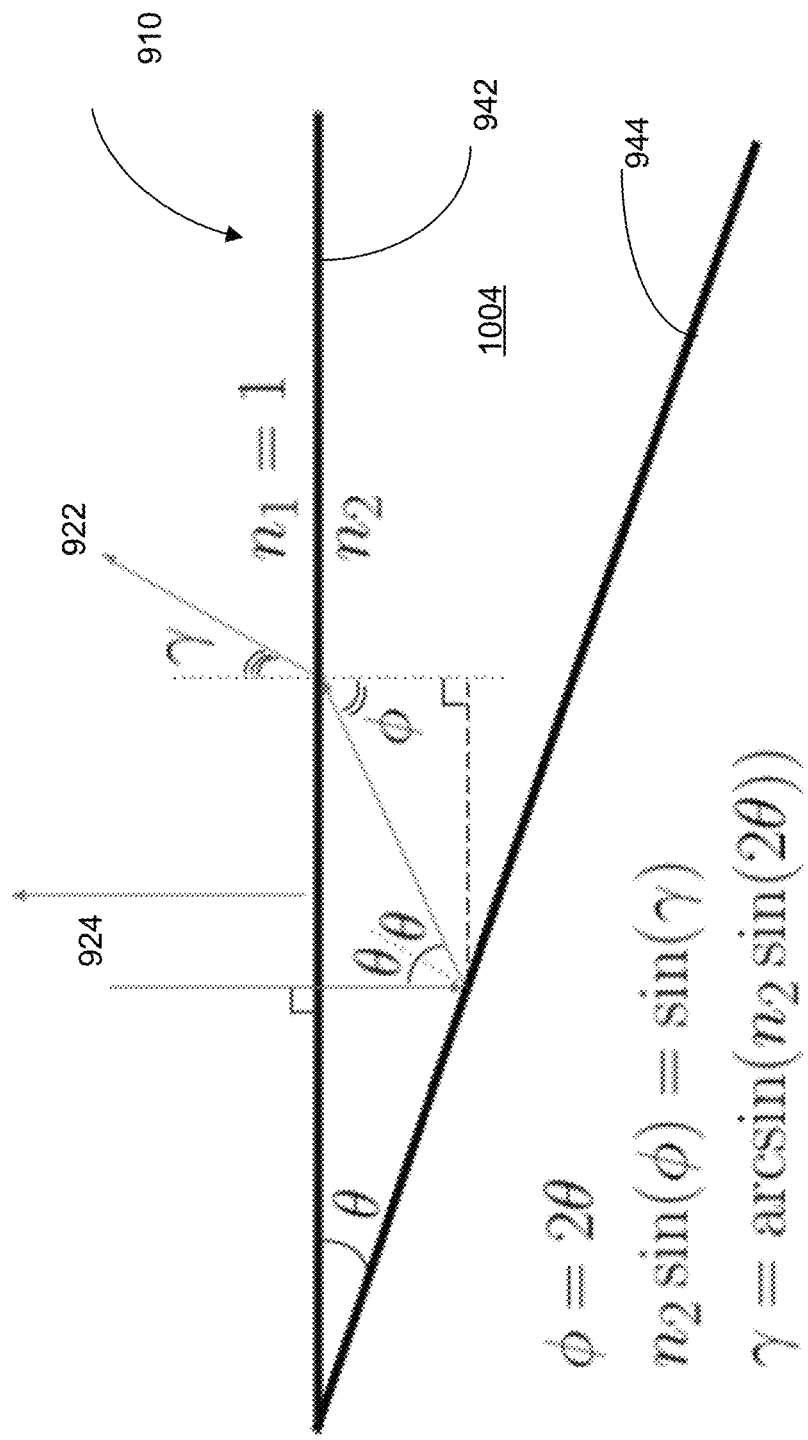
FIG. 11 illustrates an example relationship between an angle of a wedge and an angle between propagation directions of reflected lights from the wedge.

FIG. 11 illustrates a relationship between an angle of a wedge and an angle between propagation directions of reflected lights from an object. The angle of the wedge 910 is denoted as θ, and the angle between the propagation directions of the first light 922 and the second light 924 is denoted as γ in the present disclosure. As illustrated in FIG. 11, the angle γ can be given by $$\gamma = \arcsin(n_2 \sin(2\theta))$$ (Equation 1), Under small angle approximation, the angle $\gamma$ can be approximated by $$\gamma \approx n_2(2\theta) \quad \text{(Equation 2)}$$

where $n_2$ is the refractive index of the medium that is filled inside the object 910 (e.g., inside the space 1004 between the first surface 942 and the second surface 944). When the wedge 910 is filled with air (refractive index=1), the angle $\gamma_{air}$ between the first light 922 and the second light 924 is twice the angle $\theta$ of the object 910 ($\gamma \approx 2\theta$). When the same wedge 910 is filled with a medium (e.g., liquid crystal) with a refractive index different from air, the angle $\gamma_{medium}$ between the first light beam 922 and the second light beam 924 can change.

In some implementations, the refractive index $n_2$ of the medium is determined using Equation 1 based on the measured angle of the object 910 (e.g., when air is filled in the object 910 with $n_2=1$) and the measured angle $\gamma_{medium}$. In some implementations, using Equation 2, the refractive index of the medium can be approximately determined by the ratio of the angle $\gamma_{medium}$ measured with the medium (e.g., liquid crystal) to the angle $\gamma_{air}$ measured with air, e.g., as shown in Equation 3:

$$n_2 = \frac{\gamma_{medium}}{\gamma_{air}} \quad \text{(Equation 3)}$$

Figure 15A:
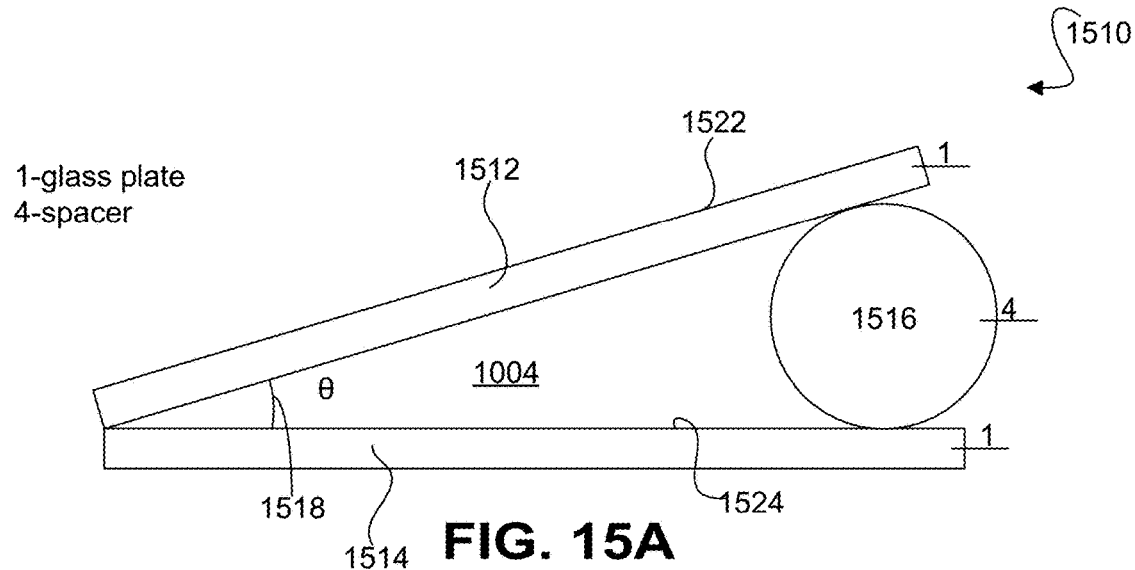
FIG. 15A illustrates a cross-section view of an example object.
Figure 15B:
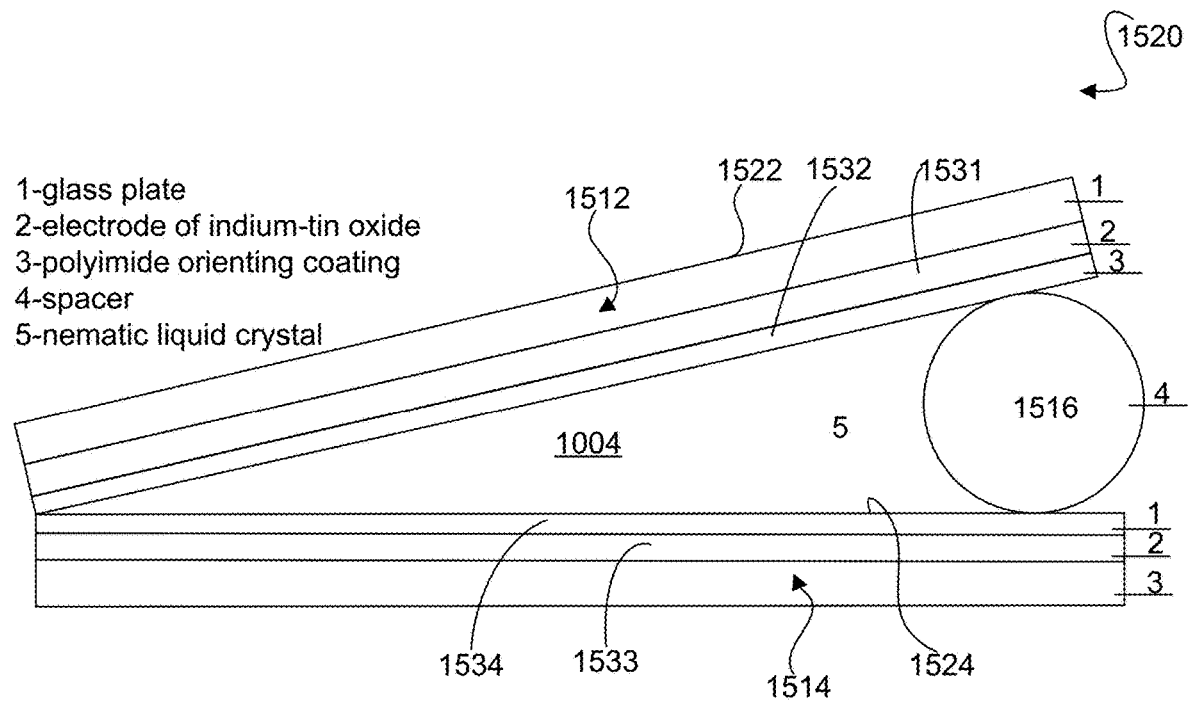
FIG. 15B illustrates a cross-section view of another example object.

In some cases, the first surface can be on a first planar layer (e.g., first glass panel) of the object and the second surface can be on a second planar layer (e.g., second glass panel) of the object (e.g., as illustrated in FIGS. 15A and 15B below). It is to be noted that FIG. 11 may assume that the glass panel of the object 910 is thin without changing the physics, and the medium that is filled between two planar layers is in direct contact with the air. In the case of the empty wedge cell (e.g., there is only air between two planar layers), there may be no refraction (e.g., at air-to-air interface), but with a different medium filled in the wedge cell, refraction may occur at the interface between air and the medium, for which Snell's law applies.

Figure 12:
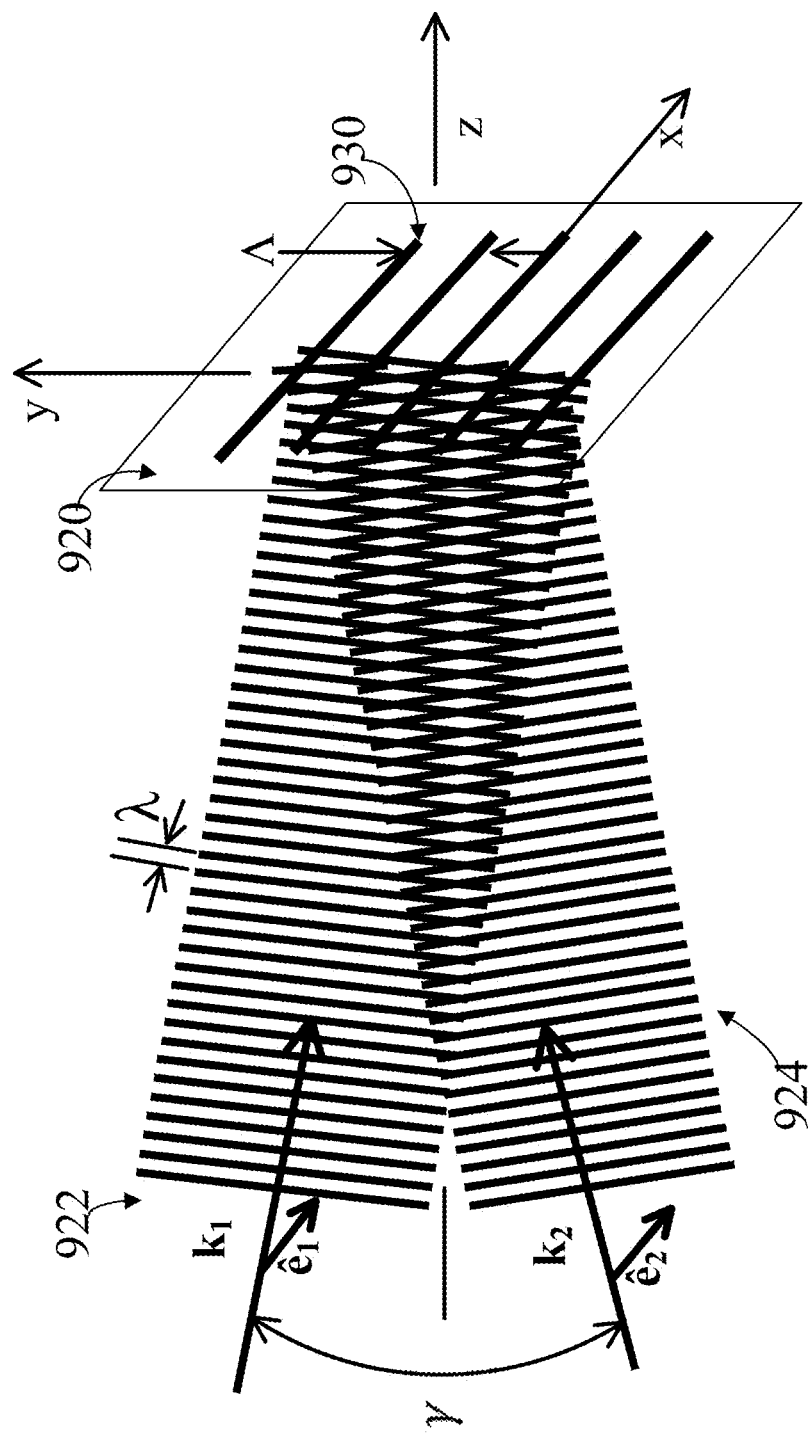
FIG. 12 illustrates a diagram of an example fringe pattern between a first light beam and a second light beam, by which an object angle can be determined.

FIG. 12 illustrates a diagram of an example fringe pattern between a first light beam 922 and a second light beam 924 by which an object angle can be determined. As illustrated in FIG. 12, the first light beam 922 and the second light beam 924 have a same wavelength 2 and an angle $\gamma$ between their propagation directions. The first light 922 and the second light 924 propagate to form an interference pattern 930 (also called a fringe pattern in the present disclosure) on an active area of the optical sensor 920. The interference pattern 930 can have a spatial period A which is given by:

$$\Lambda = \frac{\lambda}{2\sin\left(\frac{\gamma}{2}\right)} \quad \text{(Equation 4)}$$

Based on Equation 1 and Equation 4, the angle $\theta$ of the object 910 can be determined according to an expression as follows:

$$\Lambda = \lambda/(2 \sin (\text{arc sin } (n_2 \sin (2\theta))/2)) \quad \text{(Equation 5)}$$

where $\theta$ represents the angle of the object 910, A represents the spatial period of the fringes in spatial domain, $\lambda$ represents the wavelength of the first light 922 and the second light 924, and $n_2$ represents a refractive index of a medium in a space 1004 between the first surface 942 and the second surface 944.

When the medium between the first surface 942 and the second surface 944 is air ($n_2=1$), Equation 5 becomes:

$$\Lambda = \lambda/(2 \sin (\text{arc sin } (\sin (2\theta))/2)) \quad \text{(Equation 5-1)}$$

In some implementations, measuring a refractive index of the medium (e.g., liquid crystal) includes the following steps:

(1) Filling the space 1004 between the first surface 942 and the second surface 944 of the object 910 with a first medium with a known refractive index (e.g., refractive index=1 for air) and generating a first interference pattern 930 using the system 900 of FIG. 9.

(2) Determining the angle $\theta$ of the object 910 using Equation 5 above, where the spatial period $\Lambda$ is determined based on Fourier transform of the first interference pattern 930 (e.g., as described with further details below in reference to FIGS. 13A and 13B), and the wavelength $\lambda$ of the first light 922 and the second light 924 can be determined based on the light source 902.

(3) Filling the space 1004 between the first surface 942 and the second surface 944 of the object 910 with a target medium (e.g., liquid crystal) with an unknown refractive index, and obtaining a second interference pattern 930 using the system 900 of FIG. 9.

(4) Determining the refractive index of the target medium using Equation 5, where $\theta$ is obtained from step 2 above, the spatial period $\Lambda$ is determined based on Fourier transform of the second interference pattern 930, and the wavelength 2 is determined based on the light source 902.

Figure 13A:
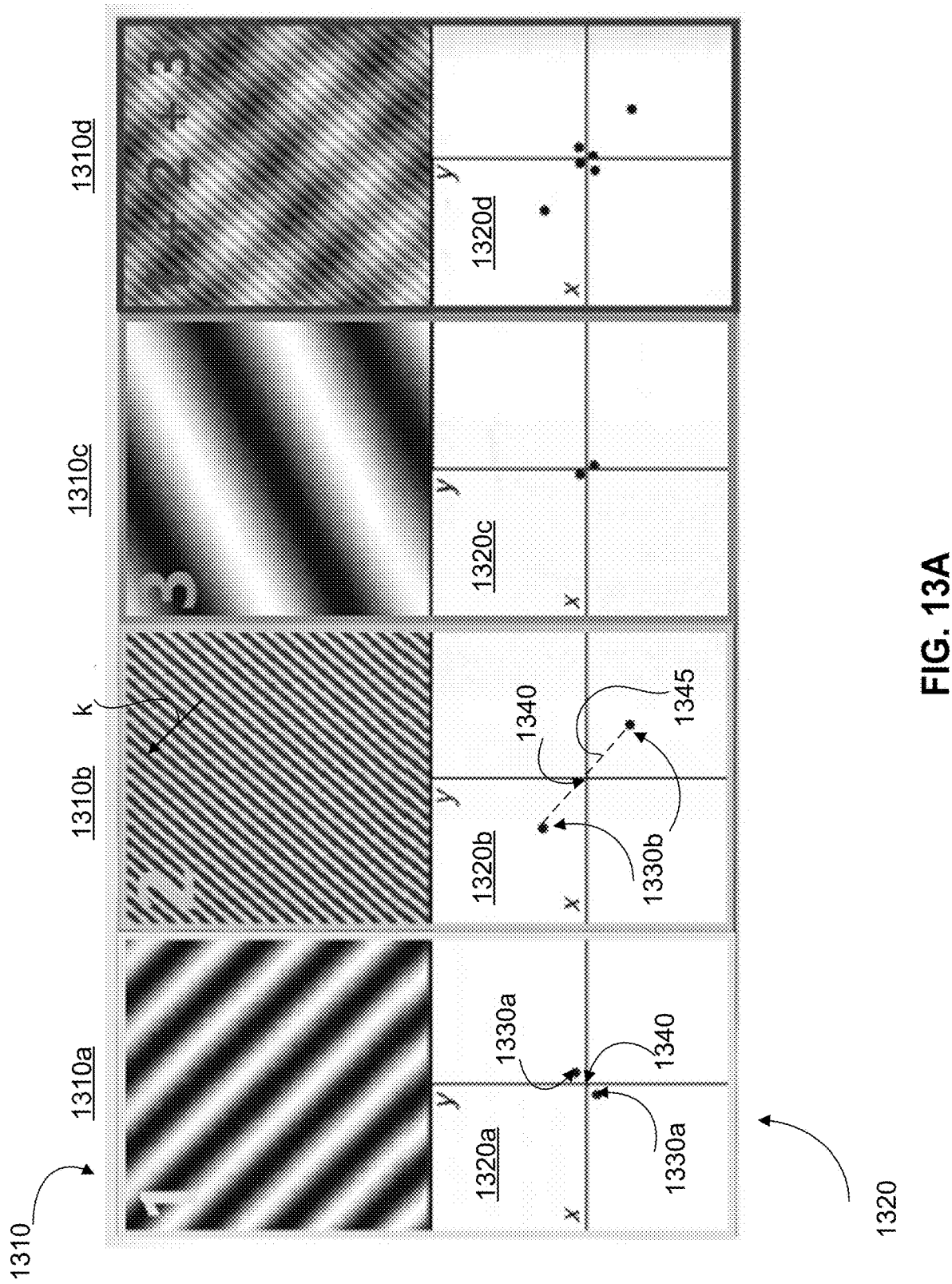
FIGS. 13A and 13B illustrate example interference patterns and corresponding Fast Fourier Transform (FFT) images that can be used to determine spatial periods of the interference patterns.
Figure 13B:
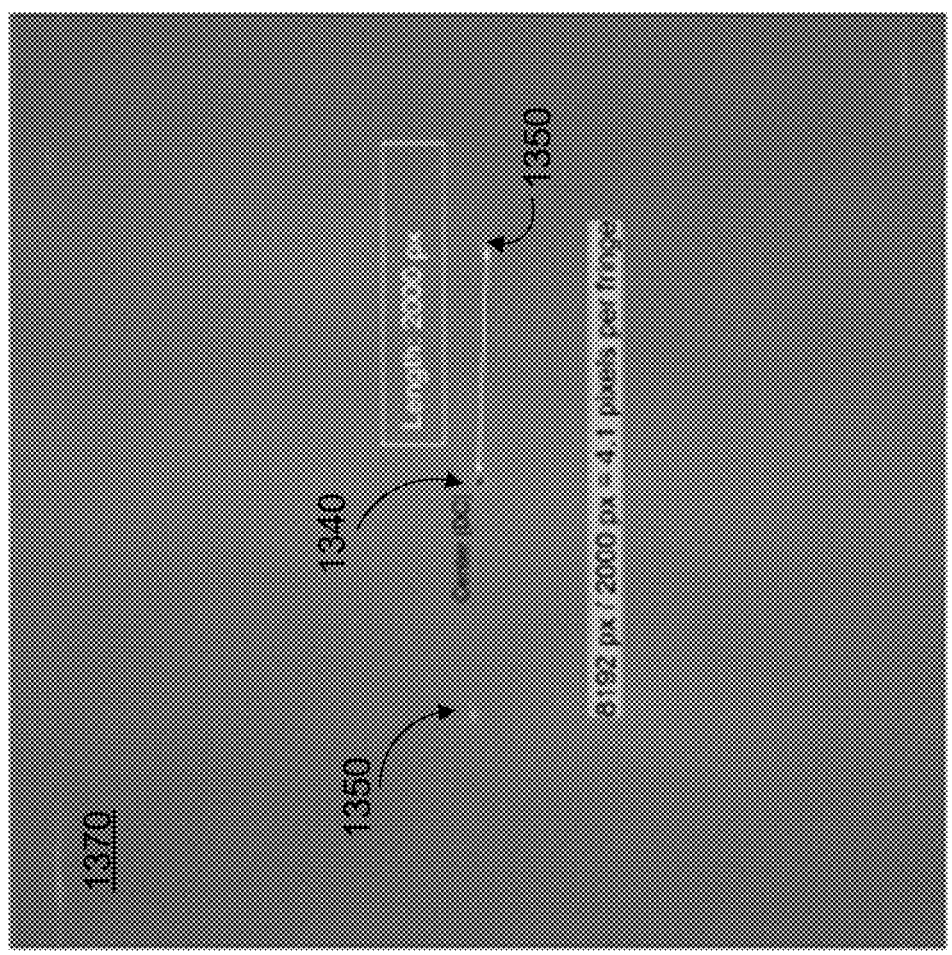

FIGS. 13A and 13B illustrate example interference patterns and corresponding Fast Fourier Transform (FFT) images that can be used to determine spatial periods of the interference patterns. As illustrated in FIG. 13A, the top row 1310 of images illustrate interference patterns 1, 2, 3 and the superposition of these three interference patterns in a spatial domain. The bottom row 1320 illustrate FFT images of corresponding interference patterns in a frequency domain.

To determine the spatial period $\Lambda$ of the interference patterns 930 in the spatial domain, an image of the interference pattern can be converted to Fourier space using FFT. This yields a Fourier space image (also called an FFT image in the present disclosure), where the sinusoidal variation of the fringes corresponds to a localized peak in brightness. The coordinate of this peak in Fourier space determines the spatial period $\Lambda$ of the fringes, and the width of the peak may determine the uncertainty of the measurement (e.g., caused by surface roughness of the object 910). For example, the first interference pattern 1310a corresponds to two localized peaks 1330a in its Fourier space image 1320a. The distance between each localized peak 1330a and the center 1340 of Fourier space image can indicate the magnitude of frequency: the greater the distance is, the higher the frequency is. Comparing the first interference pattern 1310a with the second interference pattern 1310b, the second interference pattern 1310b has a higher frequency (e.g., a smaller spatial period as illustrated), and thus the corresponding localized peaks 1330b in its Fourier space image are farther away from the center 1340. In addition, the orientation of the localized peaks relative to x axis can be indicative of a wave vector. For example, as shown in the second Fourier space image 1320b, drawing a line 1345 connecting the two localized peaks 1330b would form an angle about 135 degrees relative to x axis, and this orientation can represent the wave vector k in the spatial domain as shown in the second interference pattern 1310*b*.

If the light beams creating the interference patterns have a plurality of wavelengths, a composite interference pattern can be obtained. For example, the composite interference pattern 1310*d* combines all three individual interference patterns 1310*a*, 1310*b*, 1310*c* with three wavelengths. The Fourier transform of the composite interference pattern is the linear sum of the Fourier transforms of each individual pattern, as illustrated in the composed Fourier space image 1320*d*.

As the locations of the localized peaks in the Fourier space images relate to spatial period Λ of the interference patterns, the spatial period Λ of the interference patterns can be determined based on the distance between the localized peaks and the center of the Fourier space image. FIG. 13B illustrates an example of a Fourier space image from which a spatial period Λ of a corresponding interference pattern can be determined. In some implementations, determining the spatial period Λ of an interference pattern involves the following three steps:

(1) measuring a pixel distance (in pixels) between a localized peak and a center of the Fourier space image;

(2) determining a spatial frequency (in pixels/cycle) in Fourier space by dividing a pixel size (in pixels) of an active area of an optical sensor by the measured pixel distance (in pixels); and (3) converting the spatial frequency (in pixels/cycle) in Fourier space to a spatial period Λ in spatial domain (in SI unit, e.g., μm) by multiplying the spatial frequency in Fourier space by a pixel size (e.g., in μm/pixel).

In the present example shown in FIG. 13B, following the three steps described above, (1) the pixel distance is measured to be 2000 pixels between the localized peak 1350 and the center 1340 of the Fourier space image 1370, and the pixel size of the active area of the optical sensor 920 used in this example is 8192 pixels; (2) the spatial frequency in Fourier space is given by 8192/2000=about 4.1 pixels/cycle; (3) the spatial period Λ in the spatial domain can be calculated by multiplying spatial frequency (4.1 pixels/cycle) by a pixel size (in this example, 3.45 μm per pixel), resulting in 4.1×3.45=14.145 μm per cycle. This spatial period value Λ in SI units(e.g., 14.145 μm per cycle) can be used in Equation 5 for determining the object angle θ and/or a refractive index $n_2$, as described above in reference to FIG. 12.

In some implementations, for determining the distance d between the localized peak and the center of the Fourier space image, the coordinate of the localized peak (x, y) (in pixels) and the coordinate of the center ($x_0$, $y_0$) (in pixels) are first determined. The distance d between the localized peak and the center can then be calculated by $$d = \sqrt{(x-x_0)^2 + (y-y_0)^2}.$$

Figure 14A:
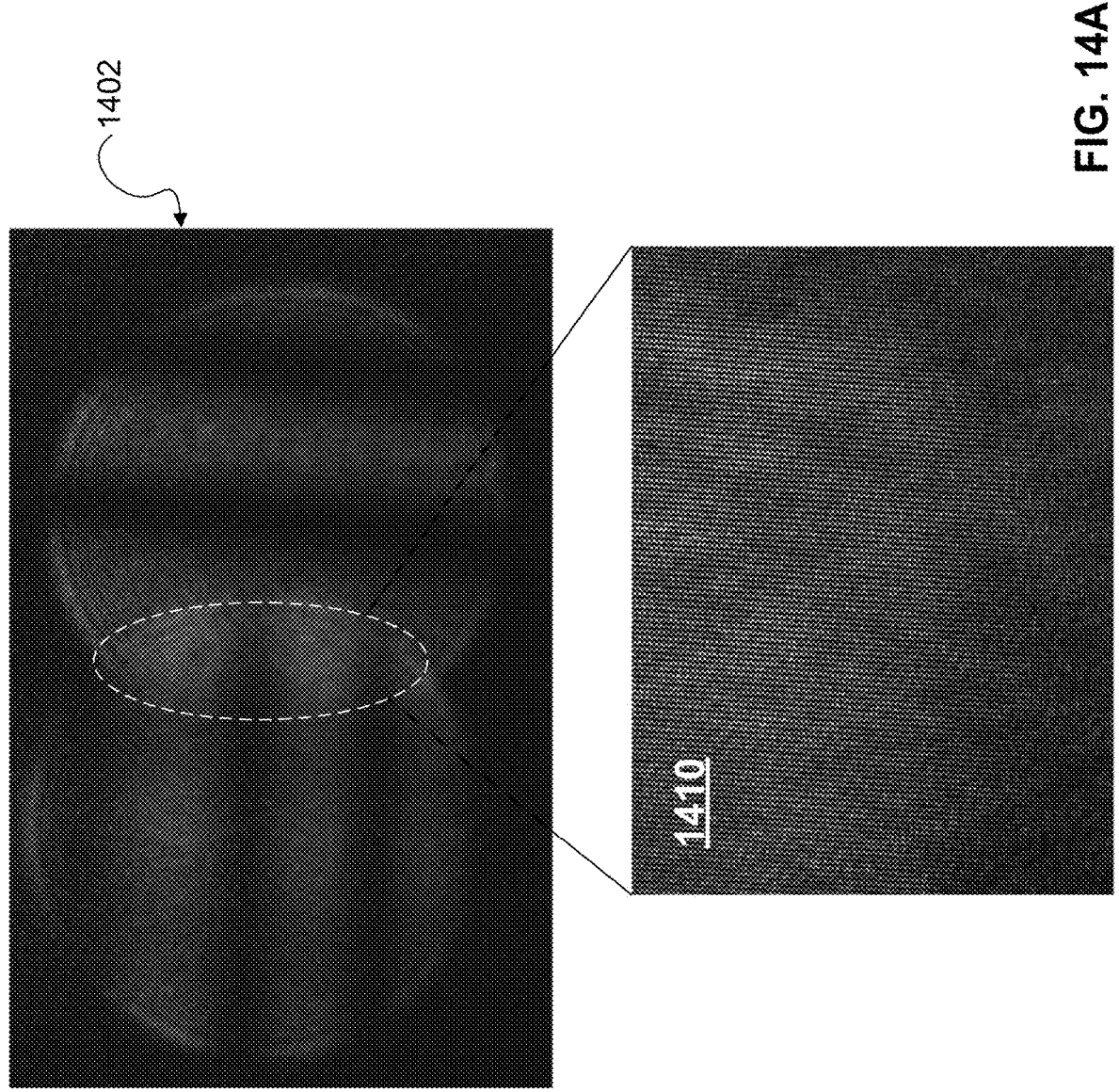
FIGS. 14A-14C illustrate example interferograms that are generated by reflected lights from an object.
Figure 14B:
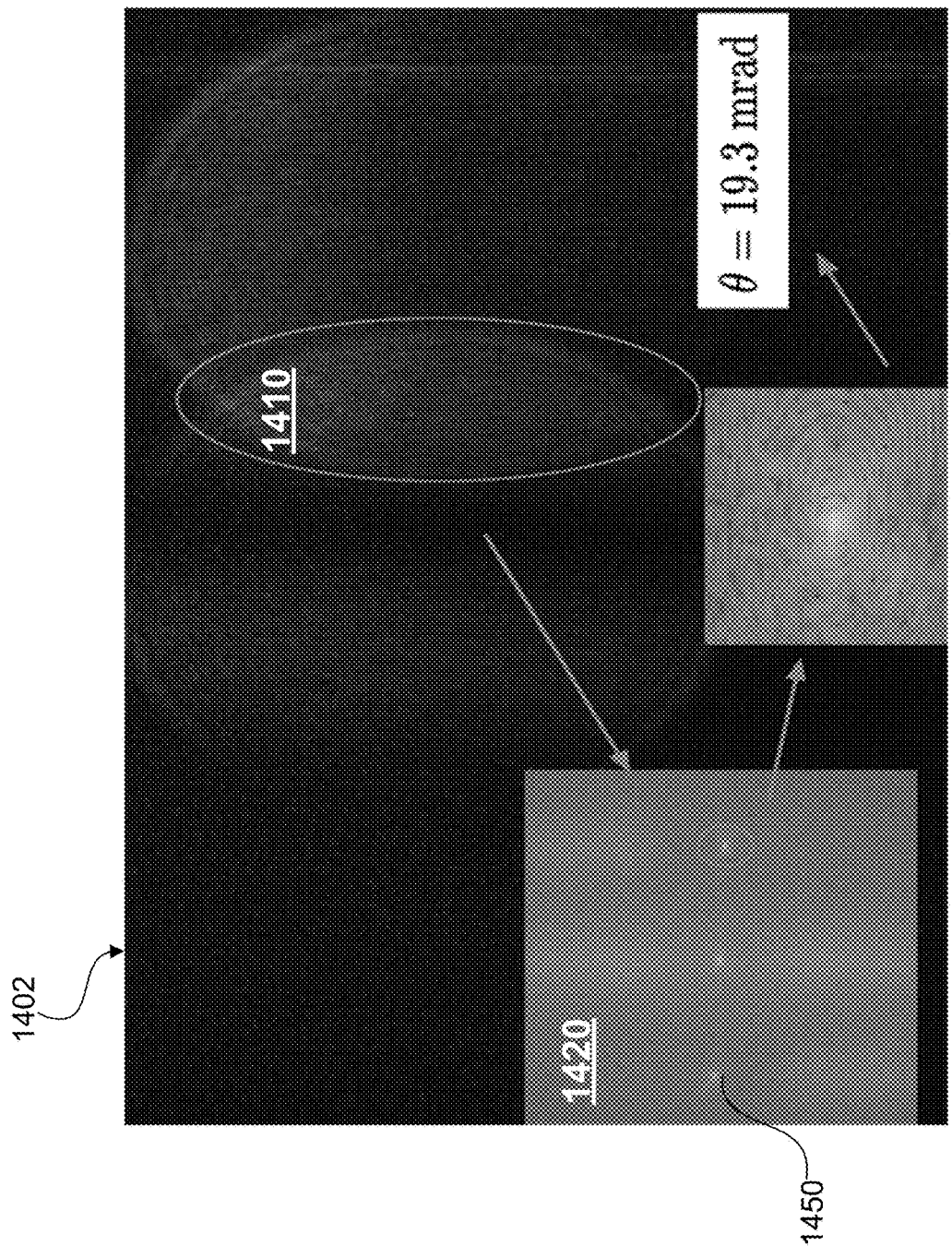
Figure 14C:
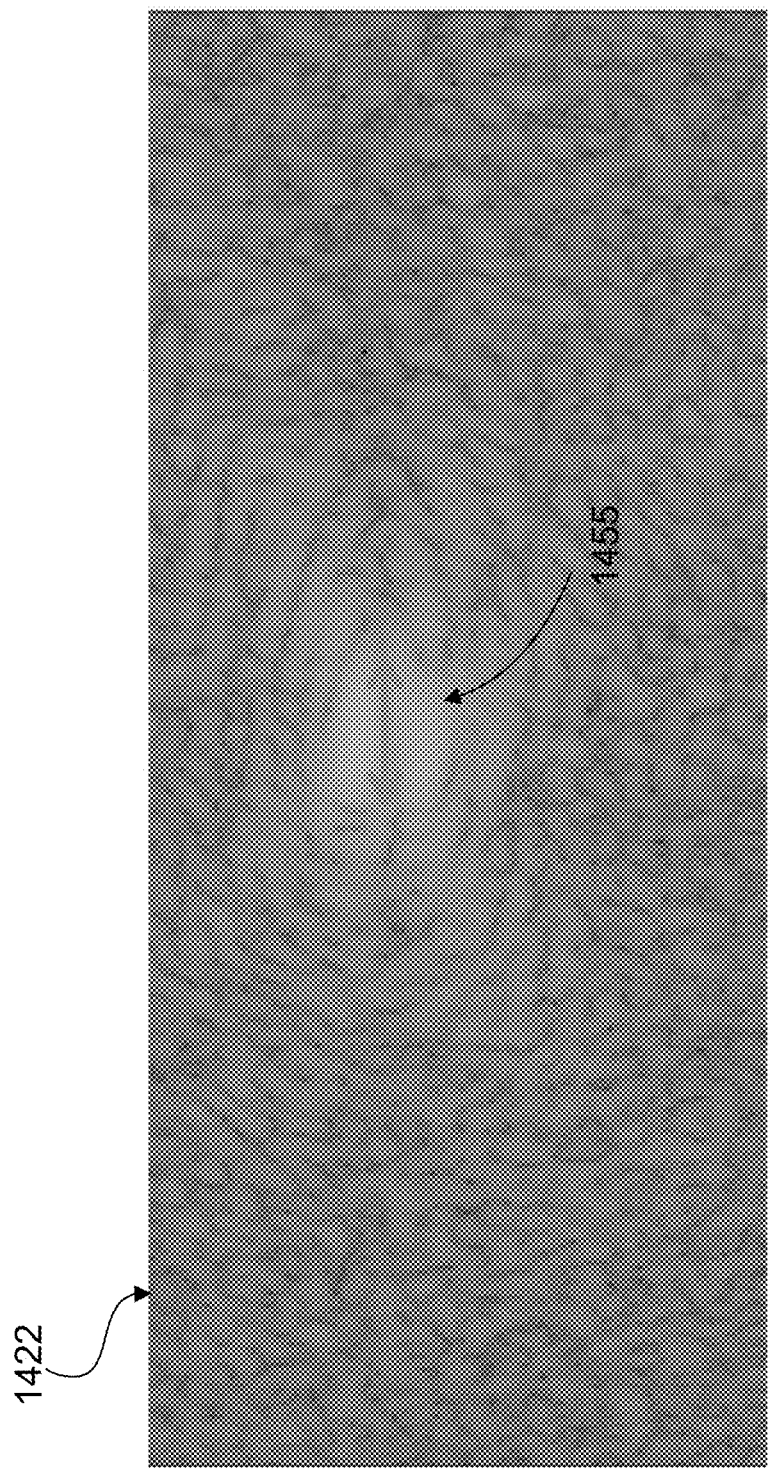

FIGS. 14A-14C illustrate example interferograms that are generated by reflected light beams from an object. In some implementations, as illustrated in FIG. 14A, the example interference pattern 1402 includes a region 1410 having the overlap of the front and back reflections(e.g., the first light beam 922 and the second light beam 924). In some cases, the FFT may be improved by only transforming the overlap region 1410 of the image. This might be especially important if the reflections are at all obstructed, e.g., by a large aperture. The overlap region 1410 shows fringes in the spatial domain. As illustrated in FIG. 14B, the fringes in the overlap region 1410 are transformed into the frequency domain by FFT where the Fourier space image 1420 is obtained with a few localized peaks 1450. From there, the spatial frequency in Fourier space is determined, which is then converted to a spatial period Λ in SI units, as described above in reference to FIGS. 13A and 13B. The spatial period Λ is related to an angle of the object 910 by Equation 5 above, and thus the angle of the object 910 can be determined based on this equation. In the example of FIG. 14B, the angle of the object 910 is determined to be 19.3 mrad or millradian, where 1 mrad is equal to 0.0573 degrees.

As mentioned above, in some cases, the surfaces of the object 910 are not perfectly planar and may warp slightly. This may contribute to the smearing of the peak in Fourier space, as illustrated in the FFT image 1422 of FIG. 14C, which provides an enlarged view of a smearing peak 1455. This broadness of the peak may reflect the uncertainty of the measurement. In some implementations, the broadness of a smearing peak is used to determine flatness of the object surfaces, as described with further detail below in reference to FIGS. 17-20.

FIG. 15A illustrates a cross-section view of an example object 1510 for measuring an angle of the object. In some implementations, e.g., as illustrated in FIG. 15A, the object 1510 has a first planar layer 1512 and a second planar layer 1514 that intersect with an intersection angle 1518 (e.g., θ). The first planar layer 1512 and the second planar layer 1514 can be made of glass. The first planar layer 1512 includes the first surface 1522, and the second planar layer 1514 includes the second surface 1524. The object 1510 can be, e.g., the object 910 of FIGS. 9-11. The first surface 1522 can be, e.g., the first surface 942 of FIGS. 9-11. The second surface 1524 can be, e.g., the second surface 944 of FIGS. 9-11. As noted above in reference to FIGS. 9 and 10, a light beam can be guided sequentially onto the first surface 1522 and the second surface 1524 to generate a first light beam 922 reflected from the first surface 1522 and a second light beam 924 reflected from the second surface 1524.

In some implementations, the object 1510 includes a spacer 1516 positioned between an end of the first planar layer 1512 and an end of the second planar layer 1514. The spacer 1516 can be made of glass. The spacer 1516 creates the angle θ between the first planar layer 1512 and the second planar layer 1514.

In some implementations, a space 1004 between the first planar layer 1512 and the second planar layer 1514 is filled with air or a medium with known refractive index. With a known refractive index, the intersection angle 1518 of the object 1510 can be determined based on Equation 5 above.

FIG. 15B illustrates a cross-section view of another object 1520 for measuring a refractive index of a medium. The object 1520 can be, e.g., the object 910 of FIGS. 9-11. In some implementations, the medium that fills the space 1004 between the first surface 1522 and the second surface 1524 is liquid crystal. As illustrated in FIG. 15B, the object 1520 includes the first planar layer 1512 and a first coating layer 1532, and the second planar layer 1514 and a second coating layer 1534 facing the first coating layer 1532. In some implementations, each of the first coating layer 1532 and the second coating layer 1534 includes a polyimide orienting coating layer. The polyimide orienting coating layer can be controlled to influence the alignment of liquid crystal molecules during the crystal growth process. In some implementations, a first electrode layer (e.g., made of indium-tin oxide (ITO)) 1531 is arranged between the first planar layer 1512 and the first coating layer 1532, and a second electrode layer (e.g., made of indium-tin oxide) 1533 is arranged between the second planar layer 1514 and the second coating layer 1534. An electric current or voltage can be applied to the first electrode layer 1531 and the second electrode layer 1533 to control or influence the alignment of liquid crystal molecules in the space 1004.

It is to be understood that the object 1510 can also be used to measure a refractive index of a medium by filling the space 1004 between the first surface 1522 and the second surface 1524 with the medium. Similarly, the object 1520 can be used to measure the object angle θ by filling the space 1004 with air or any other medium with a known refractive index.

In some cases, a refractive index of a medium can be dependent on the polarization state of the light. For example, a medium can have a first refractive index corresponding to a S-polarized light that is illuminating on the medium and a second refractive index corresponding to a P-polarized light that is illuminating on the medium. To determine both refractive indices of the medium, the system 900 of FIG. 9 can be configured to guide first polarized light and second polarized light sequentially onto the object (e.g., the object 1520) that is filled with the medium. For instance, to determine the first refractive index of the medium, the system 900 of FIG. 9 can be configured to illuminate the first polarized light (e.g., S-polarized light) on the object 1510 that is filled with the medium to generate a first interference pattern. To determine the second refractive index, the system 900 can subsequently illuminate the second polarized light (e.g., P-polarized light) on the same object 1510 to generate a second interference pattern.

In some cases, a refractive index of a medium (e.g., a dispersive medium) can be wavelength dependent. To measure the refractive indices of a dispersive medium, the system 900 of FIG. 9 can be configured to generate a plurality of light beams with a plurality of wavelengths. The object (e.g., the object 1520) can be illuminated using a plurality of wavelengths of light, resulting in multiple distinct peaks in Fourier transform. This can be used to measure the dispersion of the medium in the object.

In some implementations, in operation, the system 900 is configured to guide a single light beam with multiple wavelengths on the object that is filled with the dispersive medium (e.g., liquid crystal), capture an interference pattern 930 (e.g., a composite interference pattern 1310d of FIG. 13A) by the optical sensor 920, and transform the interference pattern 930 into Fourier space to generate an FFT image (e.g., a composite FFT image 1320d of FIG. 13A), determine refractive indices of the dispersive medium based on the FFT image by the computing system 960 of the system 900.

In some implementations, instead of guiding a single light beam with multiple wavelengths, the system 900 is configured to sequentially guide a plurality of light beams, each corresponding to a different wavelength, onto the object. For each light beam, a corresponding interference pattern is captured, and a refractive index is determined associated with the respective wavelength. The computer system 960 of the system 900 can determine a dispersion of the medium based on multiple refractive indices of the medium corresponding to the multiple wavelengths.

Figure 16:
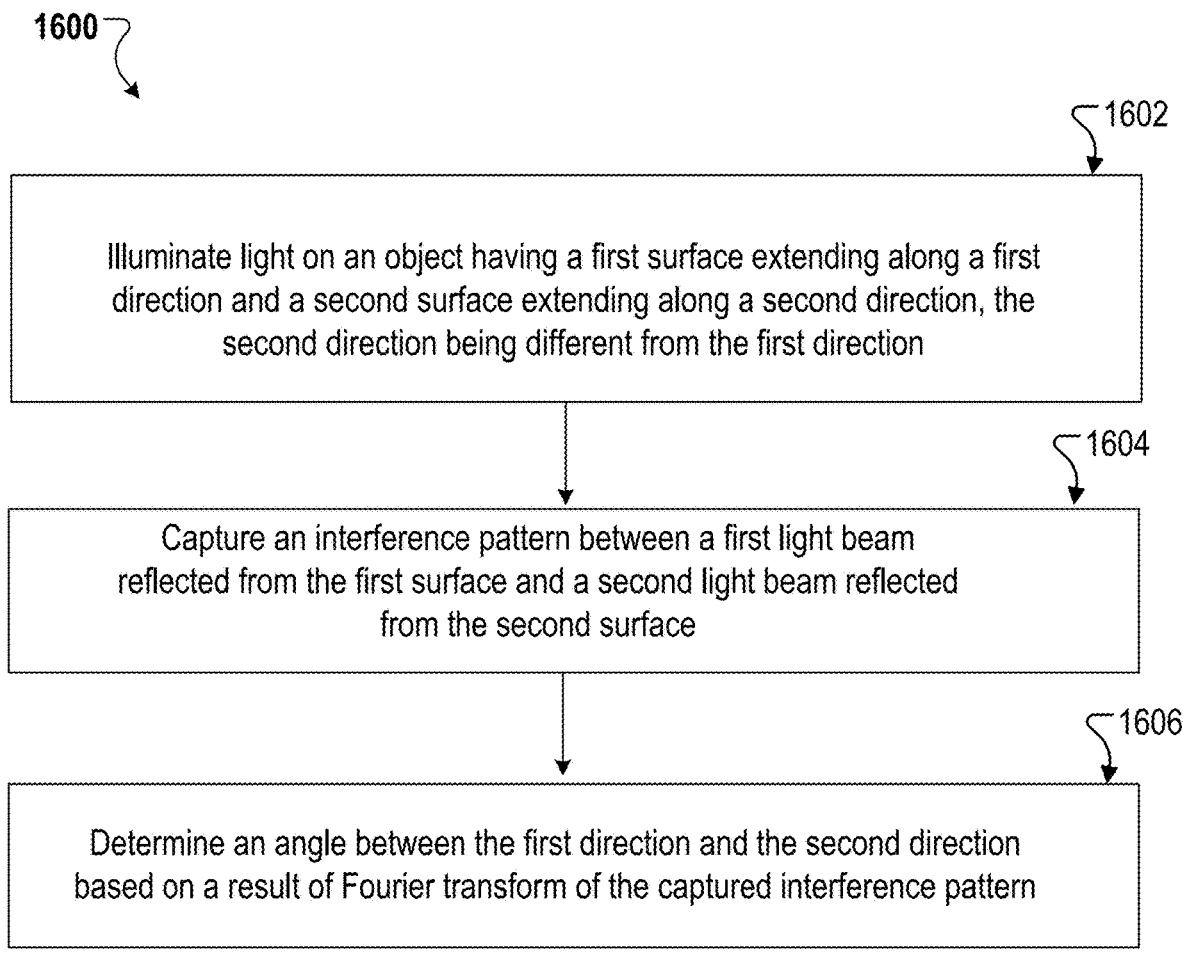
FIG. 16 is a flow chart of an example process of a method for determining an angle of an object.

FIG. 16 is a flow chart of an example process 1600 of a method for determining an angle of an object (e.g., a wedge) and/or a refractive index of a medium. The process 1600 can be performed by the system 900 of FIG. 9.

At step 1602, light is illuminated on the object having a first surface extending along a first direction and a second surface extending along a second direction, the second direction being different from the first direction. The object can be, e.g., the object 910 of FIGS. 9-11, the object 1510 of FIG. 15A, or the object 1520 of FIG. 15B. The first surface can be, e.g., the first surface 942 of FIG. 9-11, or the first surface 1522 of FIGS. 15A and 15B. The second surface can be, e.g., the second surface 944 of FIG. 9-11, or the second surface 1524 of FIGS. 15A and 15B. The first direction can be, e.g., the first direction R1 of FIG. 9. The second direction can be, e.g., the second direction R2 of FIG. 9.

At step 1604, an interference pattern between a first light beam reflected from the first surface and a second light beam reflected from the second surface is captured. The interference pattern can be, e.g., the interference pattern 930 of FIG. 9 or 12, the interference pattern 1310a, 1310b, 1310c, 1310d of FIG. 13A, or the interference pattern 1402 of FIGS. 14A and 14B. The first light beam can be, e.g., the first light beam 922 of FIGS. 9-12. The second light beam can be, e.g., the second light beam 924 of FIGS. 9-12.

At step 1606, an angle between the first direction and the second direction is determined based on a result of Fourier transform of the captured interference pattern. The angle can be, e.g., the angle θ of FIGS. 9-11, FIG. 15A, or FIG. 15B.

In some implementations, the object has a first planar layer and a second planar layer that intersect with an intersection angle. The first planar layer includes the first surface, and the second planar layer includes the second surface. The light is illuminated on the first surface and the second surface sequentially to generate the first light reflected from the first surface and the second light reflected from the second surface. The first planar layer can be, e.g., the first planar layer 1512 of FIGS. 15A and 15B. The second planar layer can be, e.g., the second planar layer 1514 of FIGS. 15A and 15B.

In some implementations, the interference pattern is directly captured on an active area of an optical sensor. The optical sensor can be, e.g., the optical sensor 214 of FIG. 2, the optical sensor 320 of FIG. 3A-3D, or the optical sensor 920 of FIGS. 9-10. The active area of an optical sensor can refer to the part of the optical sensor that is sensitive to incoming light and is responsible for detecting optical signals(e.g., light or photons).

In some implementations, a spatial period of fringes of the interference pattern is determined based on the result of Fourier transform of the captured interference pattern and a pixel size of the active area of the optical sensor. The spatial period can be, e.g., the spatial period Λ of FIG. 12, 13A, 13B, 14A, 14B, or 14C.

In some implementations, the angle between the first direction and the second direction is determined based on the spatial period of the fringes of the captured interference pattern, as described above in reference to any one of FIGS. 12-14C.

In some implementations, the result of Fourier transform of the captured interference pattern includes an image of Fourier transform of the captured interference pattern. The image of Fourier transform of the captured interference pattern can be, e.g., the FFT image 1320a, 1320b, 1320c, 1320d of FIG. 13A, the FFT image 1370 of FIG. 13B, the FFT image 1420 of FIG. 14B, or the FFT image 1422 of FIG. 14C.

In some implementations, determining the spatial period of the fringes of the captured interference pattern includes: determining coordinates of localized peaks of brightness in Fourier space, the localized peaks corresponding to sinusoidal variations of the fringes of the interference pattern, determining a distance between corresponding coordinates of two adjacent localized peaks, and determining the spatial period of the fringes based on the distance and the pixel size of the active area of the optical sensor, as described above in reference to FIGS. 12-14C.

In some implementations, the angle is determined according to an expression as follows: Λ=λ/2 sin (arc sin (n sin (2θ)/2), where θ represents the angle, Λ represents the spatial period of the fringes, λ represents a wavelength of the light, and n represents a refractive index of a medium in a space between the first surface and the second surface.

In some implementations, determining the angle between the first direction and the second direction includes determining the angle when a first medium having a first refractive index is filled in a space between the first surface and the second surface, the first refractive index being known; filling a second medium in the space between the first surface and the second surface, the second medium having a second refractive index; capturing a second interference pattern between the first light beam reflected from the first surface and the second light beam reflected from the second surface; and determining the second refractive index based on the angle between the first direction and the second direction and a second result of Fourier transform of the captured second interference pattern, as described above in reference to FIGS. 12-14C. The first medium can be, e.g., air. The second medium can be, e.g., liquid crystal.

In some implementations, the light is first polarized light having a first polarized state. The method includes: illuminating second polarized light on the object that is filled with the second medium, the second polarized light having a second polarized state different from the first polarized state, the second medium having: i) the second refractive index with the first polarized light illuminating on the second medium and ii) a third refractive index with the second polarized light illuminating on the second medium; capturing a third interference pattern between the first light reflected from the first surface and the second light reflected from the second surface; and determining the third refractive index of the second medium based on the angle between the first direction and the second direction and a third result of Fourier transform of the captured third interference pattern, as described above in reference to FIGS. 15A and 15B.

In some implementations, the second polarization state is orthogonal to the first polarization state. For example, the first polarization state and the second polarization state can be S polarization and P polarization, or P polarization and S polarization, respectively.

In some implementations, for each light beam of a plurality of light beams with a respective wavelength of a plurality of wavelengths, the light beam with the respective wavelength is illuminated on the object that is filled with the second medium. A corresponding interference pattern is captured corresponding to the light beam. A refractive index of the second medium corresponding to the respective wavelength is determined based on the angle between the first direction and the second direction and a corresponding result of Fourier transform of the captured corresponding interference pattern for the light beam. A dispersion of the second medium is determined based on refractive indices of the second medium corresponding to the plurality of wavelengths, as described above in reference to FIGS. 15A and 15B.

Figure 17A:
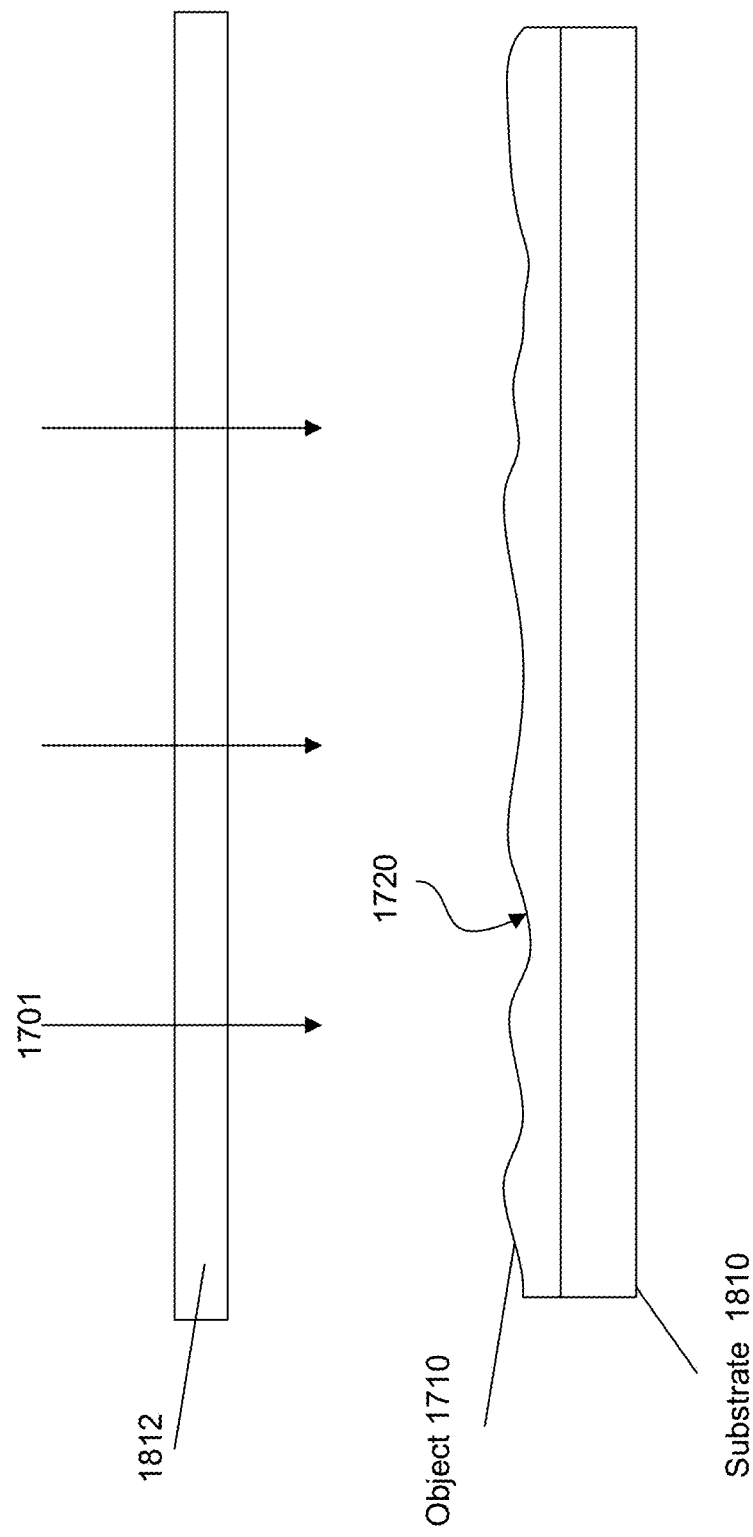
FIG. 17A illustrates an example object with an uneven surface.

FIG. 17A illustrates an example object 1710 with an uneven surface 1720. The surface profile of the uneven surface 1720 can be determined using interference patterns. Similar to the process described above to generate the interference pattern 930, an incident light beam 1701 can be illuminated on the uneven surface 1720 of the object 1710. As described below in reference to FIGS. 17B and 18, the reflected light beam from the uneven surface 1720 and a reference beam can overlap and create an interference pattern at an optical sensor 1820. The interference pattern encodes information about the surface height variations of the uneven surface 1720, as the fringe spacing and intensity can be directly influenced by the differences in optical path lengths caused by surface roughness. Particularly, given a rough surface (e.g., the uneven surface 1720), a surface height function h(x, y) that characterizes the deviations from planarity can be defined to represent the surface roughness. This surface height function h(x, y) affects the electric field s(x, y) of the reflected light from the uneven surface 1720 because the surface height changes alter the optical path length that the light travels to and from the uneven surface 1720, leading to changes in the phase of the reflected light. The phase of the reflected light further influences the interference pattern. Therefore, surface roughness profile of the uneven surface 1720 can be reconstructed using an interference pattern.

Figure 17B:
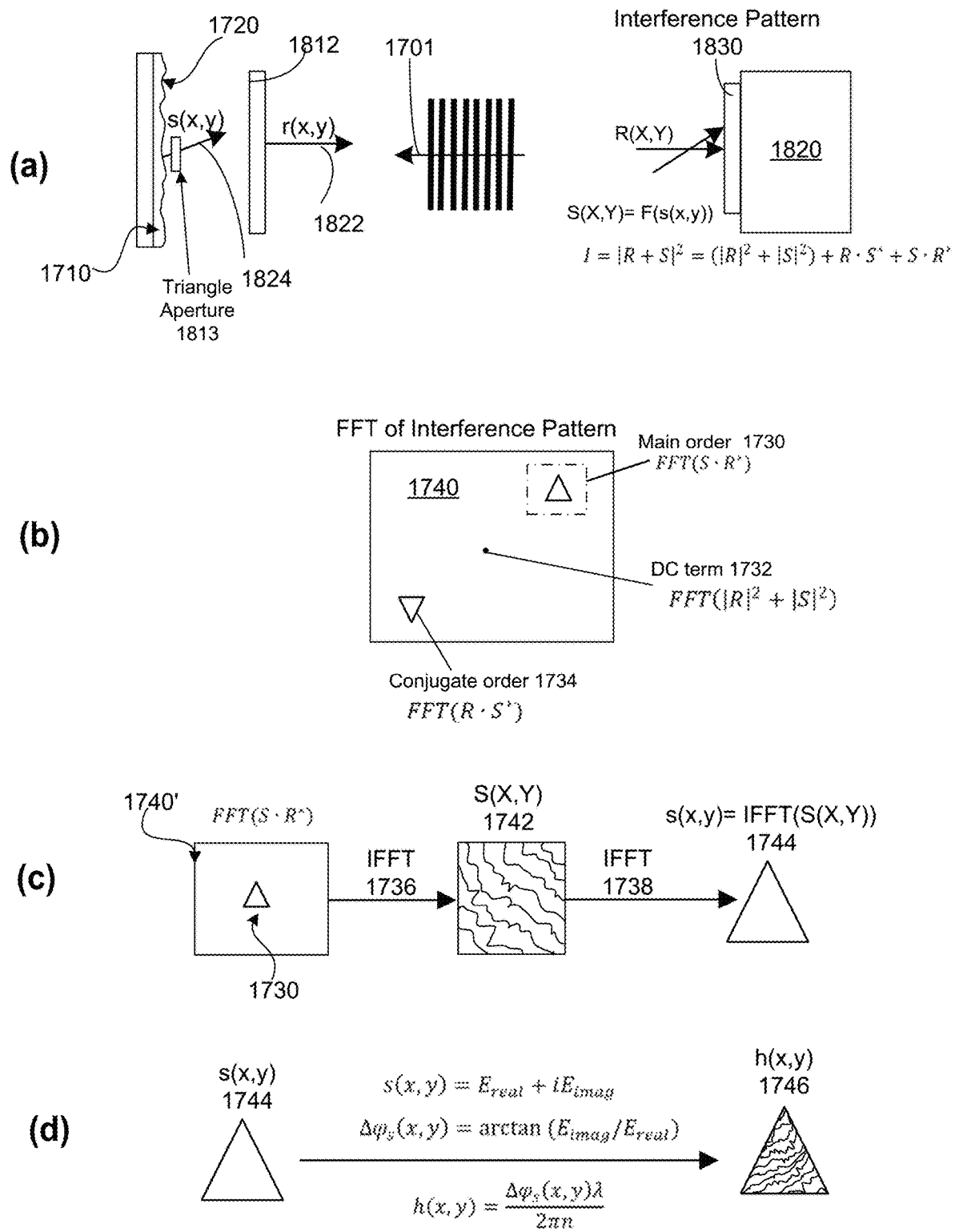
FIG. 17B illustrates an example process of measuring surface profile of an uneven surface of an object.

FIG. 17B illustrates an example process of measuring surface profile of an uneven surface 1720 of an object 1710. As illustrated in diagram (a) of FIG. 17B, the light is guided onto a portion of the uneven surface 1720 of the object 1710 through an aperture 1813. The aperture 1813 can have a shape, including without limitation to, a triangle, a circle, a square, a rectangular, an ellipse, or polygons. In the present example of FIG. 17B, the aperture 1813 can have a triangle shape. As the aperture 1813 (e.g., a triangle shape) is positioned upstream of the uneven surface 1720, due to the aperture 1813, the light beam diffracted from the uneven surface propagates through the aperture 1813 with an electric filed s(x, y). In a far field, the resulting electric field S(X, Y) is similar to Fraunhofer diffraction of the electric field s(x, y). The electric field S(X, Y) can be considered as Fourier transform of s(x, y), e.g., S(X, Y)=F{s(x, y)}. The electric field s(x, y) immediately after the aperture 1813 can be referred to as a second electric field in the present disclosure, and the electric field S(X, Y) in the far field (e.g., at the image sensor 1820) can be referred to as a first electric field in the present disclosure. Similarly, the light reflected from a reference pane 1812 (e.g., a flat and smooth pane) can be represented by a reference electric field r(x, y). In the far field, the reference electric field can be represented by R(X, Y). Without being diffracted by an aperture or an obstacle, the reference electric field R(X, Y) can be substantially similar to or the same as the reference electric field r(x, y).

With continued reference to diagram (a) of FIG. 17B, at the optical sensor 1820, an interference pattern 1830 can be formed by the first electric field S(X, Y) and the reference electric field R(X, Y). The intensity of the interference pattern 1830 can be expressed as $$I=|R+S|^2=(|R|^2+|S|^2)+R\cdot S^*+S\cdot R^* \quad \text{(Equation 6)}$$

where R represents reference electric field R(X, Y), and S represents the first electric field S(X,Y), S* represents the conjugate of the first electric field, and R* represents the conjugate of the reference electric field. $|R|^2$ and $|S|^2$ are the modulus squared of R and S, respectively. The term $(|R|^2+|S|^2)$ can be a direct current (DC) term. The term R·S* can be a conjugate order term. The term S·R* can be a main order term.

The interference pattern 1830 can be transformed to Fourier space by FFT. Diagram (b) of FIG. 17B illustrates an example FFT image 1740 of the interference pattern 1830.

In some implementations, the FFT image 1740 includes a first pattern 1730 corresponding to FFT of the main order, e.g., FFT (S·R*). The first pattern 1730 can have a shape corresponding to the shape of aperture 1813. For example, if the aperture 1813 has a triangle shape, the first pattern 1730 in the FFT image 1740 can have a triangle shape, as illustrated in diagram (b) of FIG. 17B. Further, the FFT image 1740 can include a second pattern 1732 corresponding to FFT of the DC term, e.g., FFT ($|R|^2+|S|^2$), and a third pattern 1734 corresponding to FFT of the conjugate order term, e.g., FFT (R·S*). The third pattern 1734 and the first pattern 1730 can be symmetric about the second pattern 1732. Similar to the first pattern 1730, the third pattern 1734 can have a shape that is identical or similar to that of the aperture 1813.

As illustrated in diagram (c) of FIG. 17B, the FFT image 1740 can be processed to shift the coordinate of the first pattern 1730, corresponding to FFT of the main order FFT (S·R*), to the origin of the FFT image 1740, while removing the second pattern 1732 and the third pattern 1734. Therefore, after image processing, the FFT image 1740' includes only the first pattern 1730 located in the origin of the FFT image 1740'. In some implementations, determining the surface profile h(x, y) of the uneven surface 1720 of the object 1710 based on the result of Fourier transform of the captured interference pattern 1830 includes the following steps:

(1) performing a first inverse Fourier transform (e.g., IFFT 1736) on the Fourier transform (e.g., the FFT image 1740) of the main order of the captured interference pattern 1830 to obtain information of a first electric field S(X, Y) 1742 that forms the interference pattern 1830;

(2) performing a second inverse Fourier transform (e.g., IFFT 1738) on the information of the first electric field S(X, Y) 1742 to obtain information of a second electric field s(x, y) 1744 of the light reflected from the uneven surface 1720 (e.g., s(x, y)=IFFT {S(X,Y)});

(3) determining the surface profile h(x, y) 1746 of the uneven surface 1720 of the object 1710 based on the information of the second electric field s(x, y) 1744. As illustrated in diagram (d) of FIG. 17B, the surface profile h(x, y) 1746 of the uneven surface 1720 of the object 1710 can be determined according to equations as below:

$$s(x,y)=E_{real}+iE_{imag},\qquad\text{(Equation 7)}$$

$$APs(x,y)=\arctan(E_{imag}/E_{real}),\qquad\text{(Equation 7)}$$

$$h(x, y) = \frac{\Delta\varphi_s(x, y)\lambda}{2\pi n},\qquad\text{(Equation 9)}$$

where s(x, y) represents the second electric field 1744 of the reflected light from the uneven surface 1720, $E_{real}$ and $E_{imag}$ represent a real part and an imaginary part of the electric field s(x, y), $\Delta\varphi_s(x, y)$ represents phase information of s(x, y), h(x, y) represents a surface height function of the surface profile of the uneven surface 1720, $\lambda$ represents a wavelength of the light, and n represents a refractive index of the object 1710. Therefore, for a corresponding portion of the uneven surface 1720 (e.g., the portion that reflects the light passing through the aperture 1813), the surface height function h(x, y) of the surface profile can be determined.

In some implementations, e.g., as illustrated in diagram (a) and (d) FIG. 17B, a shape (e.g., triangle) of the surface height function h(x, y) 1746 can be same as or similar to a shape (e.g., triangle) of the second electric field s(x, y), or the shape (e.g., triangle) of the aperture 1813. In some implementations, a shape of the first electric field S(X, Y) 1742 is based on a shape of the active area of the optical sensor 1820 and propagation of s(x, y). For example, on one hand, if the optical sensor 1820 is too far from the aperture 1813, the first electric field S(X, Y) 1742 is approximate to be a diffracted field of the second electric field s(x, y). The shape of the first electric field S(X, Y) 1742 can be no longer like a sharp triangle, but like a very blurry triangle. On the other hand, the shape of the active area of the optical sensor 1820 can have a rectangular shape (e.g., a square shape). As the first electric field S(X, Y) 1742 is captured directly by the optical sensor 1820, the shape of the first electric field S(X, Y) 1742 can remain like the shape of the active area of the optical sensor, e.g., as illustrated in diagram (c) of FIG. 17B.

In some implementations, to obtain the surface height function h(x, y) of the entire uneven surface 1720, the light (e.g., the incident light 1701) is guided onto different portions of the uneven surface 1720 of the object 1710 through a plurality of apertures 1813. Each of the plurality of apertures 1813 can be corresponding to a respective portion of the different portions of the uneven surface 1720. For example, the uneven surface 1720 of the object 1710 can be divided into 10 portions, with each portion corresponding to one of 10 apertures 1813. The 10 apertures can be positioned at 10 different locations above the uneven surface 1720, enabling the incident light 1701 to illuminate on the corresponding portions of the uneven surface 1720 and guiding the reflected light 1824 to diffract through the corresponding aperture 1813.

In some implementations, at least two of the plurality of apertures 1813 have different shapes. For example, an aperture can have a triangle shape, and another aperture can have a rectangular shape. In some implementations, the result of Fourier transform of the captured interference pattern includes a plurality of images(e.g., the FFT image 1740). Each image of the Fourier transform of the captured interference pattern can be corresponding to a respective aperture of the plurality of apertures and a corresponding portion of the different portions of the uneven surface associated with the respective aperture of the plurality of apertures. For example, when 10 apertures are used, 10 FFT images can be generated, with each FFT image corresponding to one of the 10 portions of the uneven surface 1720 and one of the 10 apertures. As discussed above, the Fourier transform of the main order of the interference pattern 1830 can have a shape identical or similar to that of the corresponding aperture 1813. Similarly, the electric field s(x, y) of the surface profile of the portion of the uneven surface 1720 can have a shape identical or similar to that of the corresponding aperture 1813 (e.g., as illustrated in diagram (c) of FIG. 17B). Thus, using different shapes of the multiple aperture 1813, surface roughness of different portions of the uneven surface 1720 can be separately determined.

In some implementations, a single aperture 1813 is used to guide light onto different portions of the uneven surface 1720 of the object 1710 by sequentially moving the single aperture to different positions. The surface height function h(x, y) can be determined sequentially for each portion of the uneven surface 1720, and these individual measurements can be combined and reconstructed to create the surface roughness profile for the entire uneven surface of the object 1710.

Figure 18:
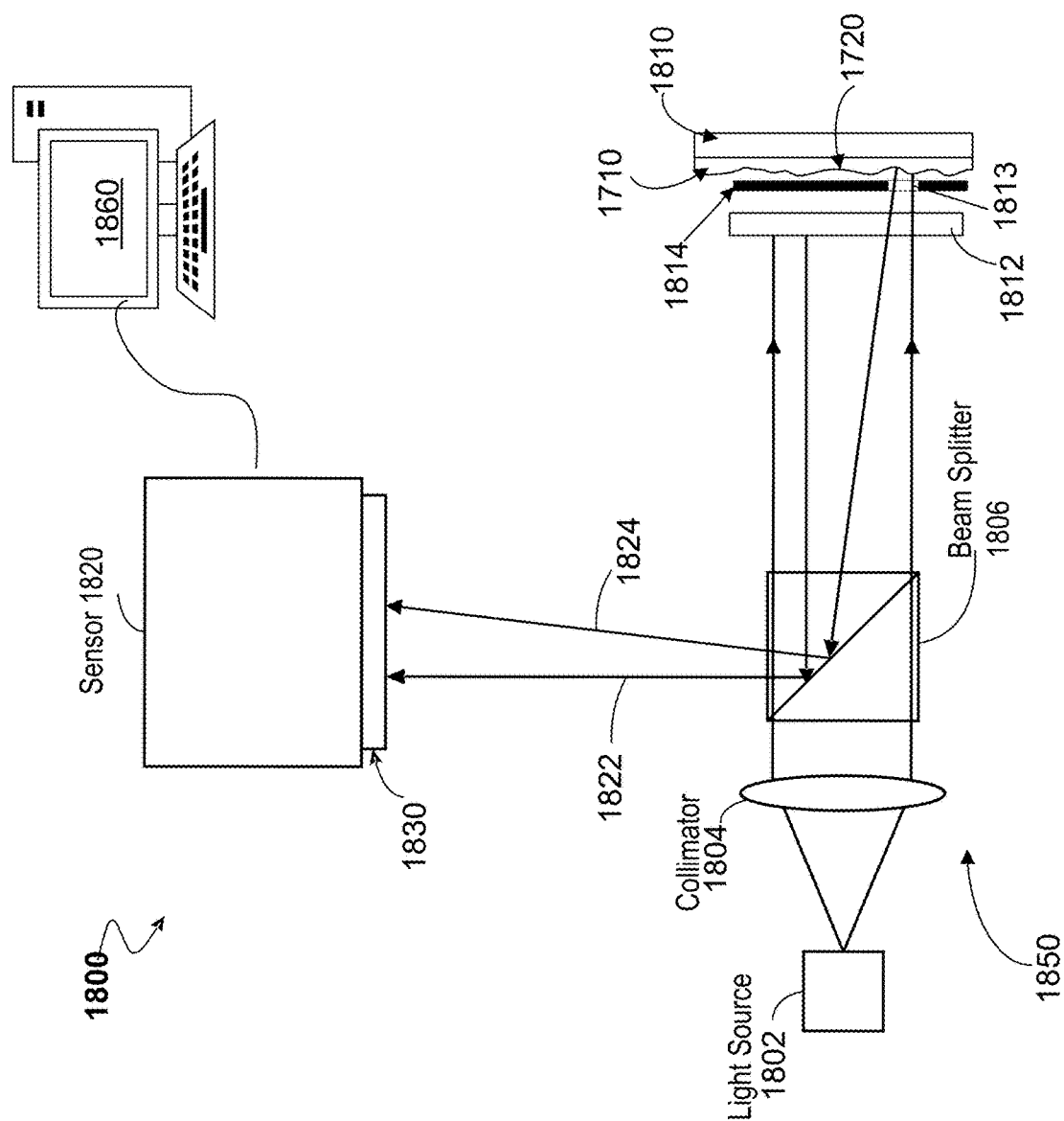
FIG. 18 illustrates an example system for surface roughness measurement.

FIG. 18 illustrates an example system 1800 for surface roughness measurement. Similar to the system 900 of FIG. 9, the system 1800 includes an optical system 1850 configured to guide light onto an object 1710 with an uneven surface 1720. Unlike the object of FIGS. 9, 10, 15A and 15B which includes two planar layers intersecting at an angle, the object 1710 can include a single planar layer with a surface 1720 that can be rough or uneven. In some implementations, the object 1710 is placed on a substrate 1810, as illustrated in FIG. 18. The substrate 1810 can have a flat surface in contact with a back of the object 1710. In some implementations, the object 1710 is an independent piece, without a substrate.

As illustrated in FIG. 18, the optical system 1850 includes a light source 1802 (e.g., a laser source), a collimator 1804, and a beam splitter 1806. In some implementations, the optical system 1850 further includes a reference pane 1812. The reference pane 1812 can be arranged upstream of the object 1710, and the reference pane 1812 can be partially transmissive. The light source 1802, can be, e.g., the light source 302 of FIG. 3A-3D, or the light source 902 of FIG. 9. The collimator 1804 can be, e.g., the collimator 304 of FIG. 3A-3D, or the collimator 904 of FIG. 9. The beam splitter 1806 can be, e.g., the beam splitter 306 of FIG. 3A-3D, or the beam splitter 906 of FIGS. 9-10B. The light source 1802 is configured to emit a light beam (e.g., a coherent light beam). The coherent light beam can be collimated using a collimator 1804 (e.g., an optical lens) onto the beam splitter 1806. From there, a part of the light beam passes through the beam splitter 1806 and is reflected by the reference pane 1812 (e.g., a glass with a flat surface). The reflected light from the reference pane 1812 can be used as a reference plane wave for an interference pattern 1830. The rest of the light beam passes through the reference pane 1812 to reach the object 1710, where it is reflected by the uneven surface 1720 of the object 1710 and can be used as an object wave to form an interference pattern with the reference plane wave.

The system 1800 can include an optical sensor 1820 configured to capture an interference pattern 1830 between a first light beam 1822 reflected from a surface of the reference pane 1812 and a second light beam 1824 reflected from the uneven surface 1720 of the object 1710. In some implementations, the optical system 1850 includes a mask 1814 (e.g., the mask 964 of FIG. 9) with one or more apertures 1813 (e.g., the aperture 962 of FIG. 9). Each aperture 1813 can correspond to a particular portion of the uneven surface 1720. Each aperture 1813 can have a respective shape, e.g., triangle, circle, square, rectangular, ellipse, or polygons. In some examples, the mask 1814 includes multiple apertures 1813 having different shapes that can be positioned upstream different portions of the uneven surface 1720. As discussed above in FIG. 17B, for a portion of the uneven surface 1720, the Fourier transform of the main order of the inference pattern can have a same or similar shape of the corresponding aperture 1813. Similarly, the electric field s(x, y) of the surface profile of the portion of the uneven surface 1720 can have a same or similar shape of the corresponding aperture 1813. Thus, using the different shapes of the multiple aperture 1813, surface roughness of different portions of the uneven surface 1720 can be separately determined. The beam splitter 1806 can be arranged in a path of the first light beam 1822 and the second light beam 1824 and configured to reflect at least a part of the first light beam 1822 and the second light beam 1824 onto the optical sensor 1820. In some implementations, the optical sensor 1820 is configured to directly capture the interference pattern 1830 on an active area of the optical sensor 1820. The optical sensor 1820 can be similar to, or same as, the optical sensor 214 of FIG. 2, the optical sensor 320 of FIG. 3A-3D, or the optical sensor 920 of FIGS. 9-10B. The optical sensor 1820 can be a digital optical camera (e.g., CCD or CMOS) configured to record the interference pattern 1830 as an array of data bits.

In some implementations, the system 1800 includes a computing system 1860 (e.g., the computing system 960 of FIG. 9) configured to determine a surface profile of the surface 1720 of the object 1710 based on a result of Fourier transform of the captured interference pattern, as described above in reference to FIGS. 17A-17B.

Figure 19A:
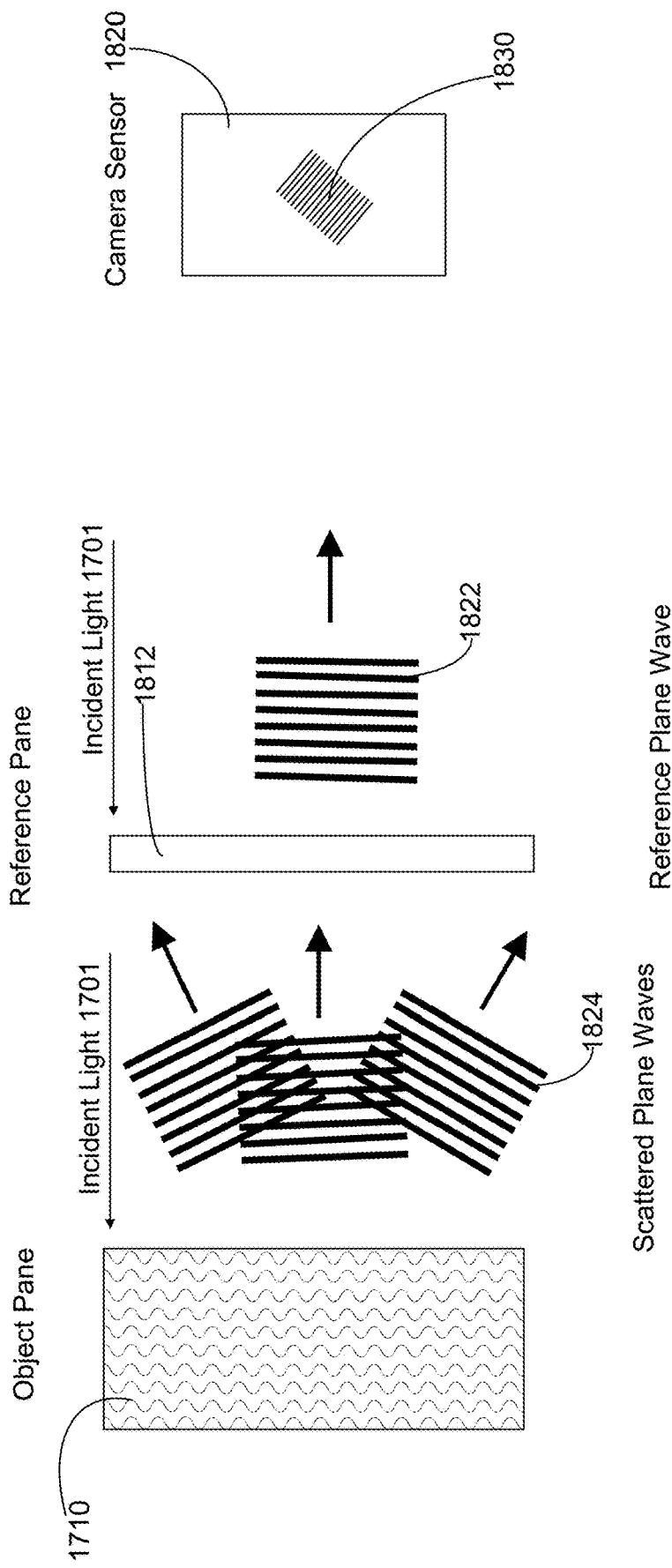
FIGS. 19A and 19B illustrate a part of the example system of FIG. 18 without and with optical lens before the optical sensor, respectively.
Figure 19B:
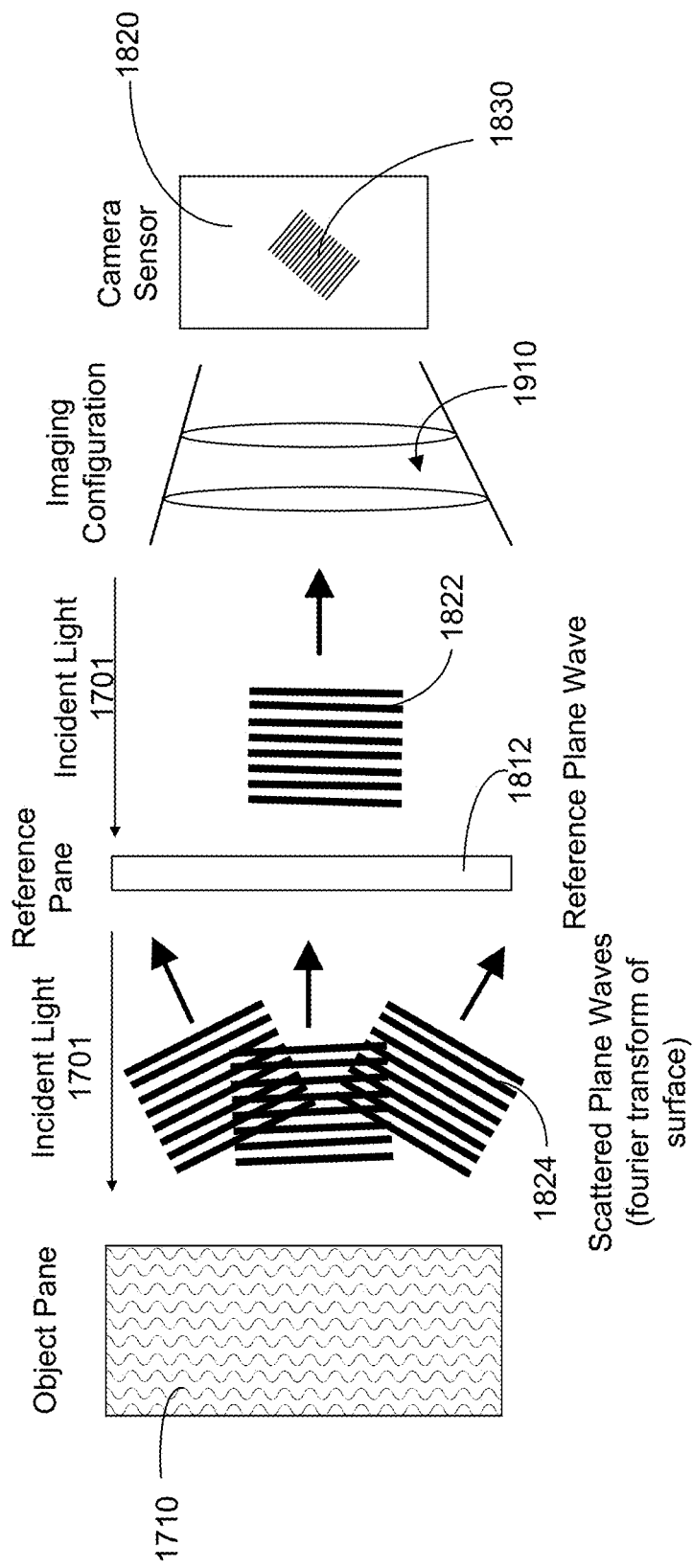

FIGS. 19A and 19B illustrate a part of the example system 1800 of FIG. 18 without and with optical lens 1910 before the optical sensor 1820, respectively. In some implementations, as illustrated in FIG. 19A, there is no optical lens on an optical path of the first light beam 1822 and the second light beam 1824 between the beam splitter 1806 (not shown) and the optical sensor 1820. In some implementations, as illustrated in FIG. 19B, the system 1800 includes one or more lens(e.g., a pair of optical lens 1910) sequentially positioned downstream the beam splitter 1806 (not shown) and upstream the optical sensor 1820 and configured to image the first light beam 1822 and the second light beam 1824 onto an active area of the optical sensor 1820 to form an interference pattern 1830.

As shown in both FIGS. 19A and 19B, the second light beam 1824 that is reflected from the surface 1720 (e.g., rough or uneven) of the object 1710 can be decomposed into a plurality of scattered plane waves with different directions, amplitudes, and/or wavelengths. Theses scattered plane waves interfere with the reference plane wave (e.g., the first light beam 1822) that is reflected from the reference pane 1812. The resulted interference pattern 1830 can be captured by the optical sensor 1820. Although not shown in FIGS. 19A and 19B, it is understood that an aperture 1813 can be used between the object 1710 and the reference pane 1812. The aperture 1813 can allow the incident light 1701 to illuminate on a selected portion of the uneven surface 1720 of the object 1710 and diffract the reflected light beam (e.g., the second light beam 1824), generating the first electric field S(X, Y) at the optical sensor 1820, as described above in reference to FIGS. 17A-18.

Figure 20:
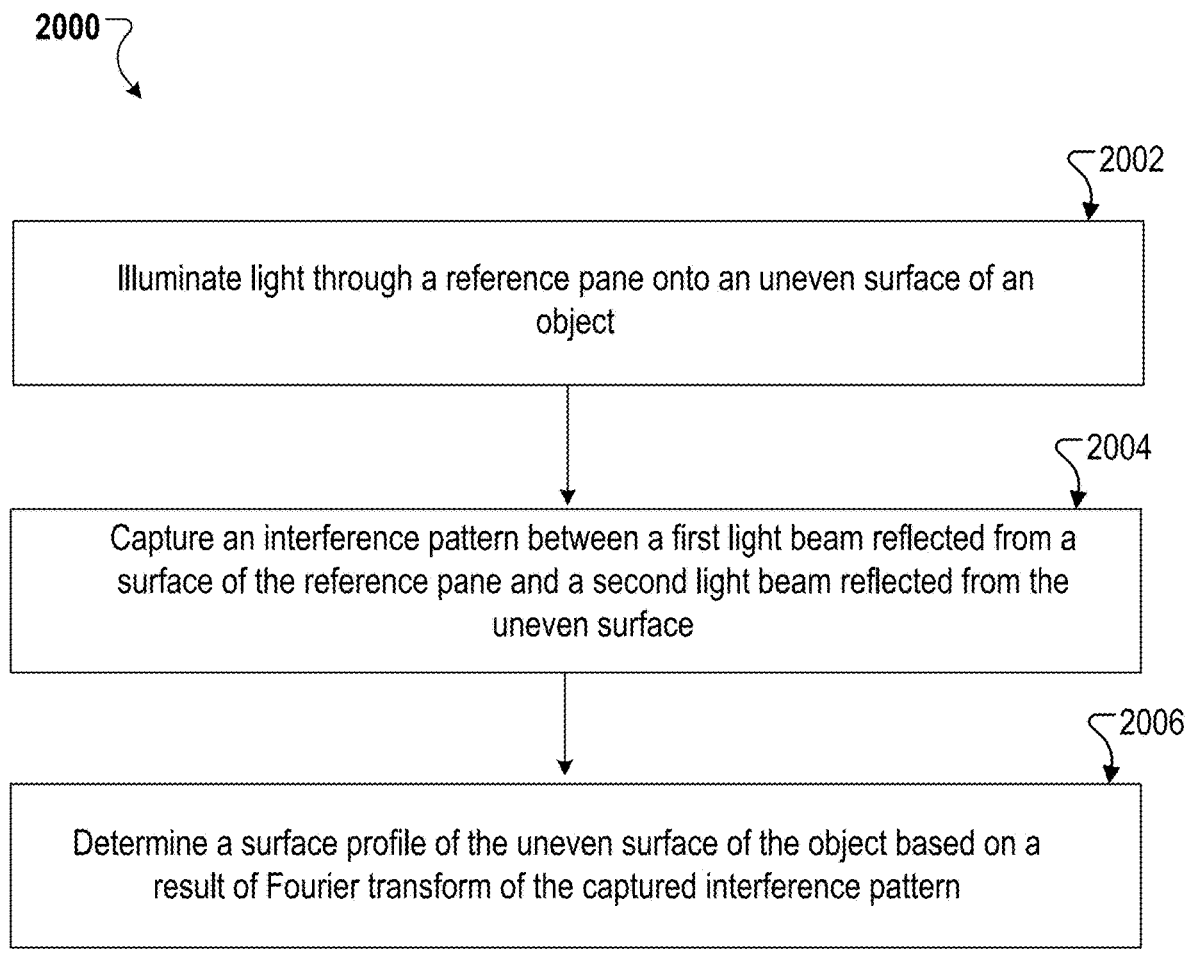
FIG. 20 is a flow chart of an example process of a method for determining surface roughness of an object.

FIG. 20 is a flow chart of an example process 2000 of a method for determining surface roughness of an object. The process 2000 can be performed by the system 1800 of FIG. 18, 19A, or 19B.

At step 2002, light is illuminated through a reference pane onto an uneven surface of an object. The reference pane can be, e.g., the reference pane 1812 of FIGS. 18-19B. The uneven surface of the object can be, e.g., the uneven surface 1720 of the object 1710 of FIGS. 17A-19B.

At step 2004, an interference pattern between a first light beam reflected from a surface of the reference pane and a second light beam reflected from the uneven surface is captured. The interference pattern can be, e.g., the interference pattern 1830 of FIGS. 18-19B. The first light beam can be, e.g., the first light beam 1822 of FIGS. 18-19B. The second light beam can be, e.g., the second light beam 1824 of FIGS. 18-19B.

At step 2006, a surface profile of the uneven surface of the object is determined based on a result of Fourier transform of the captured interference pattern, e.g., as described above in reference to FIGS. 17A-17B.

In some implementations, capturing the interference pattern between the first light and the second light includes configuring the first light beam and the second light beam by a pair of lens to form the interference pattern on an active area of an optical sensor, as shown in FIG. 19B. The pair of lens can be, e.g., the pair of lens 1910 of FIG. 19B.

In some implementations, the method includes guiding the light onto a portion of the uneven surface of the object through an aperture. The Fourier transform of the captured interference pattern corresponds to a shape of the aperture. The aperture can be, e.g., the aperture 1813 of FIGS. 17B and 18. The Fourier transform of the captured interference pattern can be, e.g., the FFT image 1740 of FIG. 17B.

In some implementations, the method includes guiding the light onto different portions of the uneven surface of the object through a plurality of apertures. Each of the plurality of apertures is corresponding to a respective portion of the different portions of the uneven surface. At least two of the plurality of apertures have different shapes, and the result of Fourier transform of the captured interference pattern includes a plurality of images. Each image of the Fourier transform of the captured interference pattern is corresponding to a respective aperture of the plurality of apertures and a corresponding portion of the different portions of the uneven surface associated with the respective aperture of the plurality of apertures, as described above in reference to FIG. 17B.

In some implementations, the result of Fourier transform of the captured interference pattern includes a Fourier transform of a main order of the captured interference pattern. Determining the surface profile of the uneven surface of the object based on the result of Fourier transform of the captured interference pattern includes: (i) performing a first inverse Fourier transform on the Fourier transform of the main order of the captured interference pattern to obtain information of a first electric field for forming the interference pattern; (ii) performing a second inverse Fourier transform on the information of the first electric field to obtain information of a second electric field of the light reflected from the uneven surface; and (iii) determining the surface profile of the uneven surface of the object based on the information of the second electric field. The main order of the captured interference pattern can be, e.g., term S. R* in Equation 6. The Fourier transform of the main order of the captured interference pattern can be, e.g., the first pattern 1730 of FIG. 17B. The first inverse Fourier transform can be, e.g., the IFFT 1736 of FIG. 17B. The first electric field can be, e.g., S(X, Y) 1742 of FIG. 17B. The second inverse Fourier transform can be, e.g., the IFFT 1738 of FIG. 17B. The second electric field can be, e.g., s(x, y) 1744 of FIG. 17B. The surface profile of the uneven surface of the object can be, e.g., the surface profile h(x, y) of FIG. 17B.

In some implementations, surface profile of the uneven surface of the object is determined according to an expression as below:

$$s(x,y)=E_{real}+iE_{imag}, \Delta\varphi_s(x,y)=\arctan(E_{imag}/E_{real}),$$

$$h(x, y) = \frac{\Delta\varphi_s(x, y)\lambda}{2\pi n},$$

where s(x, y) represents the second electric field of the reflected light from the uneven surface, $E_{real}$ and $E_{imag}$ represent a real part and an imaginary part of the electric field s(x,y), $\Delta\varphi_s(x, y)$ represents phase information of s(x, y), h(x, y) represents a surface height function of the surface profile of the uneven surface, $\lambda$ represents a wavelength of the light, and n represents a refractive index of the object.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, such as, one or more modules of computer program instructions encoded on a tangible, non-transitory computer-storage medium for execution by, or to control the operation of, data processing apparatus. Alternatively or in addition, the program instructions can be encoded on an artificially generated propagated signal, such as, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus and special purpose logic circuitry may be hardware-based and software-based. The apparatus can optionally include code that creates an execution environment for computer programs, for example, code that constitutes processor firmware, a protocol stack, a database management system, an operating system, or a combination of one or more of them. The present specification contemplates the use of data processing apparatuses with or without conventional operating systems.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various object 1710s, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as, a CPU, a GPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The main elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus(USB) flash drive, to name just a few.

Computer readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD-R, DVD-RAM, and DVD-ROM disks. The memory may store various object 1710s or data, including caches, look-up-tables, classes, frameworks, applications, backup data, jobs, web pages, web page templates, database tables, repositories storing business and dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), holographic or light field display, or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sen sing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include multiple user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), worldwide interoperability for microwave access(WIMAX), a wireless local area network (WLAN) using, for example, 602.11 a/b/g/n and 602.20, all or a portion of the Internet, and any other communication system or systems at one or more locations. The network may communicate with, for example, internet protocol (IP) packets, frame relay frames, asynchronous transfer mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and software, may interface with each other or the interface using an application programming interface (API) or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in any suitable language providing data in any suitable format. The API and service layer may be an integral or a stand-alone component in relation to other components of the computing system. Moreover, any or all parts of the service layer may be implemented as child or sub-modules of another software module, enterprise application, or hardware module without departing from the scope of this specification.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing may be advantageous and performed as deemed appropriate.

For the sake of brevity, conventional techniques for construction, use, and/or the like of holographic gratings, LCOS devices, and other optical structures and systems may not be described in detail herein. Furthermore, the connecting lines shown in various figures contained herein are intended to represent example functional relationships, signal or optical paths, and/or physical couplings between various elements. It should be noted that many alternative or additional functional relationships, signal or optical paths, or physical connections may be present in an example holographic grating, LCOS, or other optical structure or system, and/or component thereof.

The detailed description of various example embodiments herein makes reference to the accompanying drawings and pictures, which show various example embodiments by way of illustration. While these various example embodiments are described in sufficient detail to enable those skilled in the art to practice the disclosure, it should be understood that other example embodiments may be realized and that logical, optical, and mechanical changes may be made without departing from the spirit and scope of the disclosure. Thus, the detailed description herein is presented for purposes of illustration only and not of limitation. For example, the steps recited in any of the method or process descriptions may be executed in any suitable order and are not limited to the order presented unless explicitly so stated. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps.

As used in this document, "each" refers to each member of a set or each member of a subset of a set. Furthermore, any reference to singular includes plural example embodiments, and any reference to more than one component may include a singular example embodiment. Although specific advantages have been enumerated herein, various example embodiments may include some, none, or all of the enumerated advantages.

Benefits, other advantages, and solutions to problems have been described herein with regard to specific example embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an example embodiment, B alone may be present in an example embodiment, C alone may be present in an example embodiment, or that any combination of the elements A, B and C may be present in a single example embodiment; for example, A and B, A and C, B and C, or A and B and C.

Accordingly, the earlier provided description of example implementations does not define or constrain this specification. Other changes, substitutions, and alterations are also possible without departing from the spirit and scope of this specification.

The invention claimed is:

1. A method comprising:
   illuminating light on an object having a first surface extending along a first direction and a second surface extending along a second direction, the second direction being different from the first direction;
   capturing an interference pattern between a first light beam reflected from the first surface and a second light beam reflected from the second surface; and
   determining an angle between the first direction and the second direction based on a result of Fourier transform of the captured interference pattern.

2. The method of claim 1, wherein the object has a first planar layer and a second planar layer that intersect with an intersection angle, the first planar layer comprising the first surface, the second planar layer comprising the second surface, and
   wherein the light is illuminated on the first surface and the second surface sequentially to generate the first light beam reflected from the first surface and the second light beam reflected from the second surface.

3. The method of claim 1, wherein capturing the interference pattern between the first light beam and the second light beam comprises:
   directly capturing the interference pattern on an active area of an optical sensor.

4. The method of claim 3, further comprising:
   determining a spatial period of fringes of the interference pattern based on the result of Fourier transform of the captured interference pattern and a pixel size of the active area of the optical sensor.

5. The method of claim 4, wherein determining the angle between the first direction and the second direction comprises:
   determining the angle between the first direction and the second direction based on the spatial period of the fringes of the captured interference pattern.

6. The method of claim 5, wherein the result of Fourier transform of the captured interference pattern comprises an image of Fourier transform of the captured interference pattern, and
wherein determining the spatial period of the fringes of the captured interference pattern comprises:
determining coordinates of localized peaks of brightness in Fourier space, the localized peaks corresponding to sinusoidal variations of the fringes of the interference pattern,
determining a distance between corresponding coordinates of two adjacent localized peaks, and
determining the spatial period of the fringes based on the distance and the pixel size of the active area of the optical sensor.

7. The method of claim 5, wherein the angle is determined according to an expression as follows:

$$\Lambda = \lambda/2 \sin(\arcsin(n \sin(2\theta)/2)),$$

where $\theta$ represents the angle, $\Lambda$ represents the spatial period of the fringes, $\Delta$ represents a wavelength of the light, and n represents a refractive index of a medium in a space between the first surface and the second surface.

8. The method of claim 1, wherein determining the angle between the first direction and the second direction comprises:
determining the angle when a first medium having a first refractive index is filled in a space between the first surface and the second surface, the first refractive index being known, and
wherein the method further comprises:
filling a second medium in the space between the first surface and the second surface, the second medium having a second refractive index;
capturing a second interference pattern between the first light beam reflected from the first surface and the second light beam reflected from the second surface; and
determining the second refractive index based on the angle between the first direction and the second direction and a second result of Fourier transform of the captured second interference pattern.

9. The method of claim 8, wherein the light is first polarized light having a first polarized state,
wherein the method comprises:
illuminating second polarized light on the object that is filled with the second medium, the second polarized light having a second polarized state different from the first polarized state, the second medium having: i) the second refractive index with the first polarized light illuminating on the second medium and ii) a third refractive index with the second polarized light illuminating on the second medium;
capturing a third interference pattern between the first light reflected from the first surface and the second light reflected from the second surface; and
determining the third refractive index of the second medium based on the angle between the first direction and the second direction and a third result of Fourier transform of the captured third interference pattern.

10. The method of claim 8, comprising:
for each light beam of a plurality of light beams with a respective wavelength of a plurality of wavelengths,
illuminating the light beam with the respective wavelength on the object that is filled with the second medium,
capturing a corresponding interference pattern corresponding to the light beam; and
determining a refractive index of the second medium corresponding to the respective wavelength based on the angle between the first direction and the second direction and a corresponding result of Fourier transform of the captured corresponding interference pattern for the light beam, and
determining a dispersion of the second medium based on refractive indices of the second medium corresponding to the plurality of wavelengths.

11. A system comprising:
an optical system configured to guide light onto an object having a first surface extending along a first direction and a second surface extending along a second direction, the second direction being different from the first direction;
an optical sensor configured to capture an interference pattern between a first light beam reflected from the first surface and a second light beam reflected from the second surface; and
a computing system configured to determine an angle between the first direction and the second direction based on a result of Fourier transform of the captured interference pattern.

12. The system of claim 11, wherein the object has a first planar layer and a second planar layer that intersect with an intersection angle, the first planar layer comprising the first surface, the second planar layer comprising the second surface, and
wherein the light is guided on the first surface and the second surface sequentially to generate the first light beam reflected from the first surface and the second light beam reflected from the second surface.

13. The system of claim 11, wherein the optical system comprises:
a beam splitter;
a light source configured to emit the light; and
a collimator configured to collimate the light from the light source and guide the light onto the beam splitter,
wherein the beam splitter is arranged in a path of the first light beam and the second light beam and configured to reflect the first light beam and the second light beam onto the optical sensor.

14. The system of claim 13, wherein the optical system further comprises a mask having an aperture and positioned in the path of the light between the beam splitter and the object, the mask being configured to guide the light onto a selected portion of the object through the aperture.

15. The system of claim 11, wherein the computing system is configured to:
determine a spatial period of fringes of the interference pattern based on the result of Fourier transform of the captured interference pattern and a pixel size of an active area of the optical sensor, and
determine the angle between the first direction and the second direction based on the spatial period of the fringes of the captured interference pattern.

16. The system of claim 15, wherein the result of Fourier transform of the captured interference pattern comprises an image of Fourier transform of the captured interference pattern, and
wherein the computing system is configured to:
determine coordinates of localized peaks of brightness in Fourier space, the localized peaks corresponding to sinusoidal variations of the fringes of the interference pattern, determine a distance between corresponding coordinates of two adjacent localized peaks, and
determine the spatial period of the fringes based on the distance and the pixel size of the active area of the optical sensor.

17. The system of claim 16, wherein the angle is determined according to an expression as follows:

$$\Lambda = \lambda/2 \sin(\arcsin(n \sin(2\theta)/2)),$$

where $\theta$ represents the angle, $\Lambda$ represents the spatial period of the fringes, $\lambda$ represents a wavelength of the light, and n represents a refractive index of a medium in a space between the first surface and the second surface.

18. The system of claim 11, wherein the system is configured to determine the angle of the object when the object is filled with a first medium having a first refractive index in a space between the first surface and the second surface, the first refractive index being known,
wherein the optical sensor is configured to capture a second interference pattern when the object is filled with a second medium in the space between the first surface and the second surface, the second medium having a second refractive index, and
wherein the computing system is configured to determine the second refractive index of the second medium based on the angle between the first direction and the second direction and a second result of Fourier transform of the captured second interference pattern.

19. The system of claim 18, wherein the light is first polarized light having a first polarized state,
wherein the optical system is configured to guide second polarized light on the object that is filled with the second medium, the second polarized light having a second polarized state different from the first polarized state, the second medium having: i) the second refractive index with the first polarized light illuminating on the second medium and ii) a third refractive index with the second polarized light illuminating on the second medium,
wherein the optical sensor is configured to capture a third interference pattern between the first light reflected from the first surface and the second light reflected from the second surface, and
wherein the computing system is configured to determine the third refractive index of the second medium based on the angle between the first direction and the second direction and a third result of Fourier transform of the captured third interference pattern.

20. The system of claim 18, wherein, for each light beam of a plurality of light beams with a respective wavelength of a plurality of wavelengths,
the optical system is configured to guide the light beam with the respective wavelength on the object that is filled with the second medium,
the optical sensor is configured to capturing a corresponding interference pattern corresponding to the light beam, and
the computing system is configured to determine a refractive index of the second medium corresponding to the respective wavelength based on the angle between the first direction and the second direction and a corresponding result of Fourier transform of the captured corresponding interference pattern for the light beam, and wherein the computing system is configured to determine a dispersion of the second medium based on refractive indices of the second medium corresponding to the plurality of wavelengths.

21. A method comprising:
illuminating light through a reference pane onto an uneven surface of an object;
capturing an interference pattern between first light beam reflected from a surface of the reference pane and second light beam reflected from the uneven surface; and
determining a surface profile of the uneven surface of the object based on a result of Fourier transform of the captured interference pattern.

22. The method of claim 21, further comprising:
guiding the light onto a portion of the uneven surface of the object through an aperture,
wherein the Fourier transform of the captured interference pattern corresponds to a shape of the aperture.

23. The method of claim 21, further comprising:
guiding the light onto different portions of the uneven surface of the object through a plurality of apertures, each of the plurality of apertures corresponding to a respective portion of the different portions of the uneven surface,
wherein at least two of the plurality of apertures have different shapes, and the result of Fourier transform of the captured interference pattern comprises a plurality of images, each image of the Fourier transform of the captured interference pattern corresponding to a respective aperture of the plurality of apertures and a corresponding portion of the different portions of the uneven surface associated with the respective aperture of the plurality of apertures.

24. The method of claim 21, wherein the result of Fourier transform of the captured interference pattern comprises a Fourier transform of a main order of the captured interference pattern, and
wherein determining the surface profile of the uneven surface of the object based on the result of Fourier transform of the captured interference pattern comprises:
performing a first inverse Fourier transform on the Fourier transform of the main order of the captured interference pattern to obtain information of a first electric field for forming the interference pattern;
performing a second inverse Fourier transform on the information of the first electric field to obtain information of a second electric field of the light reflected from the uneven surface; and
determining the surface profile of the uneven surface of the object based on the information of the second electric field.

25. The method of claim 24, wherein the surface profile of the uneven surface of the object is determined according to an expression as below:

$$s(x,y) = E_{real} + iE_{imag}, \Delta\varphi_s(x,y) = \arctan(E_{imag}/E_{real}),$$

$$h(x, y) = \frac{\Delta\varphi_s(x, y)\lambda}{2\pi n},$$

where $s(x, y)$ represents the second electric field of the second light reflected from the uneven surface, $E_{real}$ and $E_{imag}$ represent a real part and an imaginary part of the electric field $s(x, y)$, $\Delta\varphi_s(x, y)$ represents phase information of s(x, y), h(x, y) represents a surface height function of the surface profile of the uneven surface, λ represents a wavelength of the light, and n represents a refractive index of the object.

26. A system comprising:
   an optical system configured to guide light through a reference pane onto an uneven surface of an object;
   an optical sensor configured to capture an interference pattern between a first light beam reflected from a surface of the reference pane and a second light beam reflected from the uneven surface; and
   a computing system configured to determine a surface profile of the uneven surface of the object based on a result of Fourier transform of the captured interference pattern.

27. The system of claim 26, wherein the optical system comprises:
   a beam splitter;
   a light source configured to emit the light; and
   a collimator configured to collimate the light from the light source and guide the light onto the beam splitter,
   wherein the beam splitter is arranged in a path of the first light beam and the second light beam and configured to guide the first light beam and the second light beam to the optical sensor, and
   wherein the reference pane is arranged between the beam splitter and the object.

28. The system of claim 27, wherein the optical system further comprises a pair of lenses sequentially positioned downstream the beam splitter and upstream the optical sensor, and the pair of lenses are configured to configure the first light beam and the second light beam to form the interference pattern on the optical sensor.

29. The system of claim 26, wherein the optical system further comprises a mask having one or more apertures arranged between the reference pane and the uneven surface of the object, and wherein each of the one or more apertures corresponds to a respective portion of the uneven surface.

30. The system of claim 26, wherein the result of Fourier transform of the captured interference pattern comprises a Fourier transform of a main order of the captured interference pattern, and
   wherein the computing system is configured to:
      perform a first inverse Fourier transform on the Fourier transform of the main order of the captured interference pattern to obtain information of a first electric field for forming the interference pattern,
      perform a second inverse Fourier transform on the information of the first electric field to obtain information of a second electric field of the light reflected from the uneven surface, and
      determine the surface profile of the uneven surface of the object based on the information of the second electric field.

* * * * *